United States Patent [19]
Kushi et al.

[11] Patent Number: 5,641,209
[45] Date of Patent: Jun. 24, 1997

[54] VEHICLE BRAKING SYSTEM DISTRIBUTION OF FRONT AND REAR BRAKING FORCES IS CONTROLLED ACCORDING TO TWO DIFFERENT DISTRIBUTION PATTERNS DEPENDING UPON VEHICLE LOAD

[75] Inventors: Naoto Kushi, Toyota; Tatsuo Sugitani, Mishima; Kiyoyuki Uchida, Konan; Kenji Ito, Toyota; Takashi Kondo, Toyota; Yoshinori Kadowaki, Toyota, all of Japan

[73] Assignee: Toyota Jidosha Kabushiki Kaisha, Toyota, Japan

[21] Appl. No.: 404,697

[22] Filed: Mar. 15, 1995

[30] Foreign Application Priority Data

Mar. 15, 1994 [JP] Japan ................... 6-043825

[51] Int. Cl.$^6$ ................... B60T 8/26; B60T 8/30
[52] U.S. Cl. ................ 303/9.71; 303/9.69; 303/198; 303/186
[58] Field of Search .................. 303/9.62, 9.69, 303/9.71, 155, 186–88, 198, 22.1, 901, DIG. 1, DIG. 2, 113.1, 116.1, 116.2, 119.1

[56] References Cited

U.S. PATENT DOCUMENTS 4,560,210  12/1985  Tani et al. ................... 303/22.1
5,178,442  1/1993   Toda et al. ................... 303/901 X

FOREIGN PATENT DOCUMENTS

| 4036940 | 8/1991 | European Pat. Off. . |
| 4224971 | 2/1994 | European Pat. Off. . |
| 4226646 | 2/1994 | European Pat. Off. . |
| 60-47750 | 3/1985 | Japan . |
| 63-2760 | 1/1988 | Japan . |
| 2-130870 | 10/1990 | Japan . |
| 5-39012 | 2/1993 | Japan . |

*Primary Examiner*—Josie Ballato
*Attorney, Agent, or Firm*—Kenyon & Kenyon

[57] ABSTRACT

A braking system for braking a motor vehicle by the front and rear brakes of the vehicle's front and rear wheels, respectively, including a distribution control device for controlling a distribution of front and rear wheel braking force produced by the respective front and rear brakes, according to a selected one of a first and a second distribution pattern, each of which represents the front and rear wheel braking forces in relation to each other wherein the rear wheel braking force defined by the second distribution pattern is larger than that defined by the first distribution pattern at least when the front and rear wheel braking forces are smaller than respective predetermined values. The selection of the two distribution patterns may be dependent on vehicle load.

19 Claims, 26 Drawing Sheets

DURING NORMAL BRAKING

DURING ANTI-LOCK BRAKING

VEHICLE BRAKING SYSTEM DISTRIBUTION OF FRONT AND REAR BRAKING FORCES IS CONTROLLED ACCORDING TO TWO DIFFERENT DISTRIBUTION PATTERNS DEPENDING UPON VEHICLE LOAD

BACKGROUND OF THE INVENTION

1. Field of the Invention

The present invention relates generally to a braking system, and more particularly to techniques for improving braking performance of a motor vehicle's braking system by optimizing the distribution of braking forces between the front and rear wheels of the vehicle.

2. Discussion of the Related Art

FIG. 1 illustrates the braking forces of a motor vehicle's front and rear wheels as an upwardly convex curve where the front and rear wheels begin to lock simultaneously on a road surface. In FIG. 1 the braking force of the rear wheel is plotted on the vertical axis while the braking force of the front wheel is plotted on the horizontal axis. This curve, referred to as an "ideal distribution curve," represents an ideal distribution of the braking forces applied to the front and rear wheels. To improve the braking capacity or performance of the braking system, the specifications of the braking system should be optimized so that an actual distribution curve, representing the actual distribution of the front and rear wheel braking forces, is as close as possible to the ideal distribution curve. The specifications of the braking system include, for example, diameters of the front and rear wheel brake cylinders, effective radii of the front and rear disc brake rotors, and inside diameters of the front and rear wheel brake drums.

While the ideal distribution is represented by a curve as described above, the actual distribution of the front and rear wheel braking forces, as established by the basic arrangement of a braking system, is represented by a straight line, as indicated in FIG. 1. The basic arrangement is not provided with a load-sensing proportioning valve (LSP valve). It should be noted that the rear wheel braking force is not constant, but increases as the amount of load acting on the vehicle increases with respect to the minimum load (i.e., a load acting on the vehicle during a minimum-load run of the vehicle). A "minimum-load run" means a run of the vehicle with only the driver (without any passengers, in the case of a passenger car, or without any cargo, luggage or load, in the case of an industrial vehicle). FIG. 1 further illustrates that the ideal distribution curves during a minimum-load run of the vehicle differs from that during a full-load run of the vehicle. The "full-load run" means a run of the vehicle with the nominal number of passengers (including the driver), in the case of the passenger car, or the nominal maximum load, in the case of the industrial vehicle.

Further, upon braking of the vehicle the braking system is generally designed to avoid locking of the rear wheels prior to locking of the front wheels to prevent the vehicle from losing control in the running direction. The braking system is also designed to prevent locking of the rear wheels prior to front wheels during the minimum-load run where the load acting on the rear wheels is the smallest, and corresponding to the highest locking tendency of the rear wheels. Described in greater detail, the braking system is usually adapted to minimize a deviation of the actual distribution of the front and rear wheel braking forces (i.e., a deviation of the basic distribution line as determined by the specifications of the most basic braking arrangement indicated above) from the ideal distribution curve in a direction that causes an increase in the rear wheel braking force.

In practice, however, it is difficult to design a braking system with an actual distribution line of the front and rear wheel braking forces that is sufficiently close to the ideal distribution line. As shown in FIG. 1, the actual distribution line has a larger amount of deviation from the ideal distribution curve during the full-load run of the vehicle than during the minimum-load run. The deviation is attributable to the difference between the ideal and basic rear wheel braking force values. In other words, designing braking systems to accurately follow the ideal distribution curve is limited since the actual basic distribution is generally represented by a straight line and the ideal distribution curve varies as a function of vehicle load.

While the basic arrangement of the braking system has the drawback as described above, an improved arrangement also exists where a proportioning valve is disposed between the hydraulic pressure source and a rear wheel brake cylinder. This arrangement results in an actual distribution line which is closer to the ideal distribution curve. As indicated in FIG. 1, the actual distribution lines of the proportioning valve (load-sensing proportioning or LSP valve) are bent straight lines which are closer to the ideal distribution curve than the basic distribution lines. As disclosed in laid-open Publication No. 2-130870 (published in 1990) of unexamined Japanese Utility Model Application, the proportioning valve is a pressure reducing valve that is adapted to reduce the hydraulic pressure generated by the hydraulic pressure source at a predetermined ratio and apply the reduced hydraulic pressure as the braking pressure to the rear wheel brake cylinder after the generated hydraulic pressure has exceeded a predetermined threshold level. Until the generated hydraulic pressure reaches the threshold level (indicated by dots in FIG. 1 at the points of bending of the actual distribution lines of the proportioning valve), the proportioning valve does not function as the pressure reducing valve, and the hydraulic pressure generated by the pressure source is applied to the rear wheel brake cylinder.

In industrial vehicles, such as trucks where the load acting on the rear wheels varies considerably as the amount of cargo varies, the braking capacity or performance is insufficient when the load on the rear wheels is relatively large and the threshold level indicated above is fixed (i.e., if the level of the generated hydraulic pressure at which the proportioning valves begins to function as the pressure reducing valve is fixed). In view of this drawback, the braking system for such industrial vehicles is equipped with a load-sensing proportioning valve also known in the art. In the load-sensing proportioning valve (generally referred to as "LSP valve", or "LSPV"), the threshold level which corresponds to the point of bending of the distribution line of the valve varies as a function of in the amount of load on the vehicle. There are two types of load-sensing proportioning valve: linkage and ball. The linkage LSPV utilizes the fact that the amount of relative displacement between portions of a sprung member and an unsprung member the rear wheel assembly increases with the load that acts on the rear wheels. Thus, the linkage LSPV is adapted to detect the vehicle load in the form of the relative displacement amount of the sprung and unsprung members. The ball LSPV utilizes the fact that the rear portion of the vehicle body is raised in relation to the front portion as the load on the rear wheels decreases. The ball LSPV uses a ball adapted to roll on an inclined surface wherein the inclination angle changes with the inclination angle of the vehicle body, so that the ball is seated on a valve seat as a result of rolling. In the ball LSPV, the difficulty of rolling of the ball on the inclined surface indicates vehicle load.

However, the degree of approximation of the distribution line of the load-sensing proportioning valve to the ideal distribution curve is limited. That is, it has been difficult to sufficiently solve the undesirable tendency that the actual distribution line of the load-sensing proportioning valve deviates from the ideal distribution curve, in the direction that causes the rear wheel braking force to be smaller than the ideal value. This is particularly problematic when the vehicle is in the full-load run. As illustrated in FIG. 1, the hatched area is an area of deviation of the actual rear wheel braking force from the ideal value. Therefore, during the full-load run of the vehicle, the actual braking forces applied to the rear wheels are considerably lower than the ideal value, or cannot be increased to the optimum value. Thus, the use of load-sensing proportioning valves still suffers from insufficient rear wheel braking forces, although rear wheel locking is prevented.

The above-identified problem of increasing the rear wheel braking force to the ideal or optimum value during the full-load vehicle run also exists in known anti-lock braking systems adapted to control wheel braking pressures. The anti-lock control of braking forces will be described below in detail.

Braking systems are classified into two types: independent front-rear braking force control and diagonal or X-crossing. In the independent front-rear braking force control type, the first pressure application sub-system, including the front right and left wheel brakes, is independent of the second pressure application sub-system, including of the rear right and left wheel brakes. In the X-crossing type, the first pressure application sub-system, including the front left wheel brake and the rear right wheel brake, is independent of the second pressure application sub-system, including the front right wheel brake and the rear left wheel brake.

In an anti-lock braking system of the independent front-rear braking force control type, the front and rear wheel braking pressures are usually regulated independently of each other during anti-lock braking pressures control. In this case, the actual front-rear distribution of the braking forces is not bound by the basic distribution line determined by the specifications of the braking system, but can be changed with a high degree of freedom from the basic distribution line. Accordingly, the actual distribution line can be made sufficiently close to the ideal distribution curve. Therefore, the braking system of the independent front-rear braking force control type does not suffer from the above-identified problem that the rear braking forces cannot be increased sufficiently during the full-load run of the vehicle.

In an anti-lock braking system of the X-crossing type, several arrangements are available for anti-lock control of the braking forces. One example of such arrangements is illustrated in FIG. 2, wherein a normally-open master cylinder cut-off valve 306 is provided in a front brake cylinder passage 304 connecting a master cylinder 300 (hydraulic pressure source) and a front wheel brake cylinder 302, while a rear brake cylinder passage 308 is connected at one end thereto to a portion of the front brake cylinder passage 304 between the cut-off valve 306 and the front wheel brake cylinder 302. The rear brake cylinder passage is connected at the other end to a rear wheel brake cylinder 307. A normally-closed shut-off valve in the form of a pressure reducing valve 312 is provided in a reservoir passage 310, which is connected at one end thereto to the rear brake cylinder passage 308 and at the other end to a reservoir 316. The reservoir 316 which receives the brake fluid discharged from the wheel brake cylinders 302, 307 through the shut-off valve 312. A pump 318 is connected to the reservoir 316 to return the brake fluid to the master cylinder 300. According to this braking arrangement, the braking pressures in the front and rear wheel brake cylinders 302, 307 are increased by the pressure generated by the master cylinder 300.

The assignee of the present application proposed another braking arrangement of the X-crossing type, as shown in FIG. 3. Unlike the braking arrangement of FIG. 2, the present braking arrangement of FIG. 3 is adapted to increase the braking pressures in the front and rear wheel brake cylinders by operation of the pump 318. That is, the master cylinder cut-off valve 306 is held closed during an anti-lock control of the braking pressures and the pump 318 is connected to a portion of the front brake cylinder passage 304 which is downstream of the cut-off valve 306. Correspondingly, the pressurized fluid from the pump 318 is not returned to the master cylinder 300 but is returned to the wheel brake cylinders 302, 307, whereby the braking pressures in the wheel brake cylinders are increased by operation of the pump 318 during the anti-lock control of the braking system.

In either of the two arrangements of the anti-lock braking system of the X-crossing type, the braking pressures in the front and rear wheel brake cylinders 302, 307 cannot be regulated independently of each other, but are regulated such that the braking pressure in the front wheel brake cylinder 302 is equal to that in the rear wheel brake cylinder 307. Therefore, unlike the braking system of the independent front-rear braking force control type, the braking system of the X-crossing type is not capable of establishing the actual distribution line which is shifted from the basic distribution line in the direction that causes an increase in the braking pressure in the rear wheel brake cylinder during the anti-lock control. Thus, like the ordinary braking system incapable of effecting the anti-lock control of the braking forces, the braking system of the X-crossing type suffers from the problem of insufficient rear wheel braking force during the full-load run of the vehicle.

Further arrangements of the anti-lock braking system of the X-crossing type are illustrated in FIGS. 4 and 5. In the arrangement of FIG. 4, two 3-position valves 320 each having a pressure-increase position, a pressure-hold position and a pressure-decrease position are provided for the front and rear wheel brake cylinders 302, 307, respectively. In the arrangement of FIG. 5, a series connection of two shut-off valves 322, 324 is provided for each of the front and rear wheel brake cylinders 302, 307, in place of the 3-position valve 320 used in the arrangement of FIG. 4. Although these arrangements of FIGS. 4 and 5 permit the actual distribution of the front and rear wheel braking forces to be controlled without restriction by the basic distribution line, these arrangements suffer from the separate problem inevitably complicated construction, which corresponds to increased manufacturing cost.

SUMMARY OF THE INVENTION

It is therefore a principal object of the present invention to provide a braking system for a motor vehicle, which is improved in braking performance over the prior art braking systems. In particular, in its ability to increase the rear wheel braking force during the full-load run of the vehicle by selectively using two distribution patterns which represent front and rear wheel braking forces such that the rear wheel braking force defined by one of the patterns is larger than that defined by the other pattern. Correspondingly, the actual distribution is as close as possible to the ideal distribution curve.

It is a first optional object of the present invention to provide a braking system wherein the two different distribution patterns are established by a device which is simple in construction.

It is a second optional object of the present invention to provide a braking system which permits optimum distribution of the front and rear wheel braking forces by selective use of the two different distribution patterns that correspond to ideal distribution value of a relatively small and large values of the vehicle load respectively.

It is a third object of the present invention to provide an anti-lock braking system of a diagonal or X-crossing type having two pressure application sub-systems each basically designed to effect simultaneous control of the front and rear wheel braking pressures. The corresponding braking system permits improved anti-lock control of the braking pressures during a full-load run of the vehicle, in particular, the rear wheel braking forces are larger than the front wheel braking forces, while avoiding complicated construction of pressure control valve device.

It is a fourth optional object of the present invention to provide an anti-lock braking system of a diagonal or X-crossing type having two pressure application sub-systems each having a fluid recirculating pump operated to increase the front and rear wheel braking pressures in an anti-lock pressure control mode and an intermediate valve for permitting only the front wheel braking pressure to be increased. This assures optimum distribution of the front and rear wheel braking forces.

It is a fifth optional object of the present invention to provide an anti-lock braking system of the X-crossing type where only the front wheel braking pressure can be increased, and that uses a simply constructed check valve device.

It is a sixth optional object of the present invention to provide an anti-lock braking system of the X-crossing type where only the front wheel braking pressure can be increased, and that has a duty-cycle control mode wherein an intermediate valve is alternately closed and opened to control the front and rear wheel braking pressures, with an increased freedom of control.

It is a seventh optional object of the present invention to provide an anti-lock braking system wherein the duty cycle of the intermediate valve can be changed to thereby further improve the freedom of control of the braking pressures.

It is an eighth optional object of the present invention to provide an anti-lock braking system wherein the duty cycle of the intermediate valve can be optimally controlled on the basis of the pressure reducing tendencies during the anti-lock pressure control operation.

The above-identified principal object may be achieved according to the principle of the present invention, which provides a braking system as schematically illustrated in FIG. 6, for braking a motor vehicle by operation of a front brake 202 and a rear brake 204 for respective front and rear wheels of the vehicle. The braking system includes a distribution control device 210 adapted to control a distribution of braking forces applied to the front and rear wheels and that is produced by the front and rear brakes 202, 204, respectively. The distribution control device 210 controls the distribution according to a selected one of either a first distribution pattern or a second distribution pattern. Both the first and second distribution patterns each represent the front and rear wheel braking forces with respect to each other. In particular, the rear wheel braking force defined by the second distribution pattern is larger than that defined by the first distribution pattern at least when the front and rear wheel braking forces are smaller than respective predetermined values. Namely, the first and second distribution patterns are formulated so that the rear wheel braking force according to the second distribution pattern is smaller than that according to the first distribution pattern, at least when the vehicle is braked with the relatively small braking forces applied to the front and rear wheels.

The braking system of the present invention applies to friction front and rear brakes, as well as other types of brakes such as electromagnetic brakes, rheostatic brakes, electro-regenerative brakes, and pneumatic brakes.

The distribution control device 210 used in the present braking system may take various forms. In the braking system equipped with hydraulically operated friction brakes, for example, the front and rear braking forces may be controlled by regulating the hydraulic braking pressures (pressures of the brake fluid) applied to the friction brakes, or by controlling pressure-receiving areas of pistons that receive the hydraulic braking pressures to force friction members onto rotors rotating with the vehicle wheels. In the latter case, the number of the pistons required for each of the rotors to effectively operate may be individually selected.

In one form of the distribution control device adapted to regulate the hydraulic braking pressures, the front wheel braking pressure and the rear wheel braking pressure are controlled to have the same level according to the first distribution pattern, while the front wheel braking pressure is reduced with respect to the rear wheel braking pressure according to the second distribution pattern. The ratio of the reduction of the front braking pressure with respect to the rear wheel braking pressure may be constant. The amount of the reduction of the front wheel braking pressure may be the same over the entire range in which the front wheel braking pressure varies, and under all running conditions of the vehicle. Alternatively, the reduction amount of the front wheel braking pressure may vary depending upon the vehicle running condition. For instance, the reduction amount of the front wheel braking pressure may be increased with an increase in the friction coefficient of the road surface on which the vehicle runs.

The "predetermined value" of the front and rear braking pressures may be selected to substantially correspond to a threshold value of a proportioning valve above which the rear braking force is reduced with respect to the front braking force during a minimum-load run of the vehicle. The "predetermined value" may be smaller than the above-indicated value. Alternatively, the "predetermined value" may be selected to substantially correspond to a threshold value of the proportioning valve during a full-load run of the vehicle. The "predetermined value" may correspond to a value intermediate between the threshold values of the proportioning valve during the minimum-load and full-load runs of the vehicle.

As indicated above, the principle of the present invention can be satisfied if the distribution control device operates according to the first and second distribution patterns, which are formulated such that the rear wheel braking force defined by the second distribution pattern is larger than that defined by the first distribution pattern in the range where the front and rear wheel braking forces are smaller than the respective predetermined values. Namely, the principle of the present invention requires the first and second distribution patterns to be formulated such that the rear wheel braking force according to the second distribution pattern is smaller than that according to the first distribution pattern when the vehicle is braked with the relatively small braking forces applied to the front and rear wheels. However, the first and second distribution patterns may be formulated such that the rear wheel braking force defined by the second distribution pattern is larger than that defined by the first distribution pattern over the entire range of the front and rear braking forces. Namely, the first and second distribution patterns may be formulated such that the rear wheel braking force according to the second distribution pattern is smaller than that according to the first distribution pattern, irrespective of the levels of the braking forces to be applied to the front and rear wheels.

The present braking system is not limited to 4-wheel motor vehicles but also to 2-wheel motor vehicles, and applicable equally to both passenger and industrial vehicles such as trucks.

In conventional braking systems that use a load-sensing proportioning valve, the distribution line of the proportioning valve considerably deviates from the ideal distribution curve in the direction that causes the rear wheel braking force to be smaller than the ideal or optimum value, particularly when the vehicle running in the full-load condition is braked with relatively small braking forces applied to the front and rear wheels, as indicated in the graph of FIG. 1. The braking forces applied to the front and rear wheels are relatively small during the initial period of operation of the brake pedal, or during braking on a road surface having a low friction coefficient. Therefore, the conventional braking system is incapable of increasing the rear wheel braking force to a sufficiently high level even where the risk of locking of the rear wheel is nonexistent. This drawback arises because the distribution line of the proportioning valve used in the conventional system is the same for both the minimum-load run and the full-load run of the vehicle, as long as the breaking forces are relatively small. In this respect, it is noted that the distribution lines for the minimum-load run and the full-load run as shown in FIG. 1 coincide with each other at the braking force values approach zero. Further, the conventional braking system is adapted to prevent locking of the rear wheel prior to the locking of the front wheel.

To solve the above-identified drawback, the present braking system is provided with the distribution control device which operates according to the selection of one of two distribution patterns which are formulated such that the rear wheel braking force according to the second distribution pattern is larger than that according to the first distribution pattern, at least when the front and rear braking forces are relatively small (i.e., smaller than the respective predetermined values). For example, the first and second distribution patterns may be determined such that the first distribution pattern is close or similar to the ideal distribution curve for the minimum-load run of the vehicle while the second distribution pattern is close or similar to the ideal distribution curve for the full-load run of the vehicle. As described above, the minimum-load and full-load runs of the vehicle are the two extreme running conditions of the vehicle in terms of the load acting thereon, which govern the formulation of, in the above case, the first and second distribution patterns of the front and rear wheel braking forces. These running conditions are effective extremes because the vehicle is usually braked under a load condition between those two extreme load conditions.

In summary, the present invention wherein the distribution control device operates according to the two different distribution patterns permits a sufficient increase in the rear wheel braking force without locking of the rear wheel, at least when the braking forces applied to the front and rear wheels are relatively small (i.e., smaller than the respective predetermined values). Accordingly, the present braking system is capable of reducing the required braking distance of the vehicle while avoiding prior locking of the rear wheel.

The first optional object indicated above may be achieved according to a first preferred form of the present invention, wherein the braking system further comprises a hydraulic pressure source 200 for pressurizing a working fluid, and the front and rear brakes 202, 204 include a front wheel and a rear brake cylinder 206, 208, respectively, as shown in FIG. 7. The front and rear wheel brake cylinders 206, 208 are supplied with the working fluid pressurized by the hydraulic pressure source 200. The distribution control device 212 comprises (a) a check valve 214 disposed between the front wheel brake cylinder 206 and the hydraulic pressure source 200, and (b) selective disabling means 216 for selectively disabling the check valve 214. The check valve 214 permits a flow of the fluid in a first direction from the hydraulic pressure source 200 toward the front wheel brake cylinder 206 after the pressure generated by the pressure source becomes higher than the pressure in the front wheel brake cylinder 206 by more than a predetermined difference, whereby the pressure of the fluid to be applied to the front wheel brake cylinder 206 through the check valve 214 is reduced with respect to the pressure generated by said hydraulic pressure source 200. The check valve 214 inhibits flow of the fluid in a second direction opposite to the first direction. The selective disabling means 216 disables the check valve 214, as needed, to prevent functioning of the check valve 214 to reduce the pressure to be applied to the front wheel brake cylinder 206.

The selective disabling means 216 may include, for example, (a) a by-pass passage which is in parallel connection with the check valve 214 and which by-passes the check valve 214, and (b) a shut-off valve disposed in the by-pass passage. This shut-off valve is opened to substantially disable the check valve 214 to prevent its pressure reducing function when the distribution of the front and rear wheel braking forces is controlled according to the first distribution pattern. The shut-off valve is closed to enable the check valve 214 to perform its pressure reducing function when the distribution is controlled according to the second distribution pattern. The shut-off valve may be a solenoid-operated shut-off valve which is energized by application of an electric current, or a pilot-operated shut-off valve which is operated by application of an external pilot force such as a force produced by a suitable displaceable member, which is displaced with a change in the vehicle load. The displaceable member may be a load-sensing member of a load-sensing proportioning valve of a linkage-type used in the braking system to sense the vehicle load. The check valve 214 may comprise a valve seat, a valving member, and biasing means in the form of a spring, which biases the valving member to thereby hold the valving member seated on the valve seat. In this case, the selective disabling means 216 may include (a) a valve opening member for moving the valving member apart from the valve seat against a biasing force of the spring, and (b) a control device for operating the valve opening member to an operated position for moving the valving member apart from the valve seat when the distribution control device should control the distribution of the front and rear wheel braking forces according to the first distribution pattern, and for operating the valve opening member to a non-operated position to permit the valve member to be seated on the valve seat by the biasing force of the spring when the distribution control device should control the distribution according to the second distribution pattern.

The hydraulic pressure source 200 may principally consist of a master cylinder which mechanically generates a hydraulic pressure commensurate with an operating force acting on a brake operating member. Alternatively, the hydraulic pressure source 200 may be an electrically operated pressure source which electrically generates a hydraulic pressure commensurate with the operating force or operating valve of the brake operating member. The electrically operated pressure source may be principally consist of a pump and a solenoid-operated pressure control valve which regulates the delivery pressure of the pump. Alternatively, the electrically operated pressure source may use an electric motor. The electric motor's rotary motion is converted by a ball screw into a linear piston motion that generates a hydraulic pressure. In this case, a controller controls a motor that regulates hydraulic pressure generated by the linear motion of the piston.

In the above-identified first preferred form of the invention wherein the distribution control device comprises the check valve 214 and the selective disabling means 216, the pressure of the working fluid to be applied to the front wheel brake cylinder 206 is reduced with respect to the pressure generated by the pressure source 200 by an amount corresponding to the predetermined level of the check valve 214, while the pressure as generated by the pressure source 200 is applied to the rear wheel brake cylinders 200, unless the selective disabling means disables the check valve 214 to prevent its pressure reducing function. Thus, the distribution of the front and rear wheel braking forces is controlled according to the second distribution curve. Namely, the front wheel braking pressure is controlled to be lower than the rear wheel braking pressure by an amount corresponding to the predetermined level at which the check valve is opened permitting the flow of the fluid therethrough toward the front wheel brake cylinder. Consequently, the second distribution pattern is established by the distribution control device so as to control the rear wheel braking force to be larger than the front wheel braking force as long as the disabling means is placed in its non-operated position.

The braking system according to the above first preferred embodiment of the invention wherein the distribution control device uses the check valve 214 as described above can be easily constructed and is relatively inexpensive.

The second optional object indicated above may be achieved according to a second preferred form of the invention, wherein the distribution control device controls the distribution of the front and rear wheel braking forces according to the first distribution pattern when a load acting on the vehicle is smaller than a predetermined load value, and according to the second distribution pattern when the load is not smaller than the predetermined load value.

The above second preferred form of the invention directly utilizes the known relationship of the ideal distribution of the front and rear wheel braking forces that vary as a function of the load currently acting on the vehicle. The distribution control device uses the first distribution pattern when the vehicle load is relatively small, and uses the second distribution pattern when the vehicle load is relatively large, so that the rear wheel braking force is controlled to be larger when the vehicle load is relatively large than when it is relatively small.

In the above second preferred form of the invention, the actual distribution of the front and rear wheel braking forces can always be controlled in relation to vehicle load, and the required vehicle braking distance can be reduced even when the vehicle load is relatively large. The actual distributions of the front and rear wheel braking forces during the minimum-load and full-load runs of the vehicle are illustrated in the graphs of FIG. 10, in which BF and BR represent the front and rear wheel braking forces, respectively.

In the present second preferred form of the invention, the first distribution pattern is formulated to more effectively avoid the prior locking of the rear wheel than the second distribution pattern. While the vehicle load is relatively small, the load acting on the rear wheel is also relatively small and is likely to have a locking tendency. In such small-load condition, however, the distribution control device controls the distribution of the front and rear wheel braking forces according to the first distribution pattern, so as to effectively avoid the prior locking of the rear wheel, and effectively prevent undesirable reduction in the steering or directional stability of the vehicle due to reduction in the cornering force of the rear wheel, which would arise from the locking of the rear wheel. On the other hand, the second distribution pattern is formulated to more effectively reduce the required vehicle braking distance, than the first distribution pattern. Since the second distribution pattern is used while the vehicle load is relatively large, the rear wheel can effectively utilize the friction coefficient of the road surface, to reduce the required braking distance.

In an anti-lock braking system, the braking pressures are regulated in an anti-lock manner so as to prevent locking of the wheels, even if the non-anti-lock control distribution pattern of the front and rear wheel braking forces, which will be normally established without the anti-lock control, deviates from the ideal distribution pattern which corresponds to the actual vehicle load. Therefore, the actual distribution pattern can accurately coincide with the ideal distribution pattern corresponding to the actual vehicle load, irrespective of whether the vehicle is in the minimum-load run or full-load run, even if the rear wheel braking force according to the non-anti-lock control distribution pattern is relatively large.

Based on the above finding, the braking system according to the principle of the present invention may be adapted to effect an anti-lock control of the braking forces according to a third preferred form of this invention, which is suitable for achieving the third optional object indicated above. In this third preferred form of the invention, the braking system is an anti-lock braking system of a diagonal or X-crossing type for a four-wheel motor vehicle, as shown in a hydraulic circuit diagram of FIG. 8. The present braking system has two pressure application sub-systems which are connected to respective two mutually independent pressurizing chambers of a master cylinder 224, each of the two pressure application sub-systems including (a) a front brake cylinder passage 226 connecting a corresponding one of the two pressurizing chambers of the master cylinder and a front wheel brake cylinder 206 of the front brake, (b) a rear brake cylinder passage 228 connecting the front brake cylinder passage 226 and a rear wheel brake cylinder 208 of the rear brake, (c) a master cylinder cut valve 230 in the form of a normally-open shut-off valve disposed in a portion of the front brake cylinder passage 226 between the master cylinder 224 and a point of connection of the front and rear brake cylinder passages 226, 228, (d) a reservoir passage 234 connected at one of opposite ends thereof to the rear brake cylinder passage 228, (e) a reservoir 232 connected to the other end of the reservoir passage, (f) a pressure reducing valve 236 in the form of a normally-closed shut-off valve disposed in the reservoir passage 234, (g) a pump passage 238 connected at one of opposite ends thereof to the reservoir 232 and at the other end to at least one of the front and rear brake cylinder passages 226, 228, (h) a pump 240 disposed in the pump passage 238 for delivering a working fluid from the reservoir to a portion of each pressure application sub-system, and (i) a controller 241 operable in an anti-lock pressure control mode for controlling the master cylinder cut valve 230, the pressure reducing valve 236 and the pump to effect an anti-lock pressure control operation for controlling pressures of the fluid in the front and rear wheel brake cylinders 206, 208 in an anti-lock manner, and wherein the distribution control device comprises the controller 241, and a pressure reduction control device 242 disposed in a portion of each pressure application sub-system which is other than the portion between the master cylinder and the connection of the front and rear brake cylinder passages. The pressure reduction control device is adapted to apply to the front wheel brake cylinder 206 the pressure as generated by a first hydraulic pressure source in the form of the master cylinder 224, to thereby establish the first distribution pattern, when the controller 241 is not placed in the anti-lock pressure control mode. The controller 241 and the pressure reduction control device 242 cooperate to establish the second distribution pattern such that the pressure generated by a second hydraulic pressure source which consists of at least one of the master cylinder 224 and the pump 240 is reduced by the pressure reduction control device 242 and is then applied to the front wheel brake cylinder 208, when the controller 241 is placed in the anti-lock pressure control mode.

The anti-lock braking system constructed as described above may be desirably provided with a proportioning valve adapted to reduce the pressure in the rear wheel brake cylinder 208 with respect to the pressure in the front wheel brake cylinder 205 after the pressure generated by the hydraulic source (master cylinder or pump) becomes higher than the front wheel brake cylinder 205 by more than a predetermined difference, which may be either fixed or variable. In this instance, the proportioning valve may be disposed in a portion of the rear brake cylinder passage 228 between the rear wheel brake cylinder 208 and the point of connection of the rear brake cylinder passage 228 and the pump passage 238. In this case, means are provided to disable the proportioning valve during an operation of the pump 240 to increase the rear wheel brake cylinder pressure. This disabling means prevents the proportioning valve from operating to reduce the rear wheel brake cylinder pressure while increasing the rear wheel brake cylinder pressure by operation of the pump 240.

In the anti-lock braking system illustrated in FIG. 8, the pump 240 functions as the hydraulic pressure source during the anti-lock pressure control of the front and rear wheel brake cylinders 206, 208. However, the master cylinder 224 may be used as the hydraulic pressure source when the pump 240 is required to increase the front and rear wheel brake cylinder pressures while no working or brake fluid is stored in the reservoir 232. In this exceptional case, the master cylinder cut valve 230 is opened, to permit the fluid pressurized by the master cylinder 224 to be supplied to the front and rear wheel brake cylinders 206, 208 to thereby increase the pressures in these brake cylinders. In the present third preferred form of the invention, therefore, at least one master cylinder 224 and pump 240 are used as the hydraulic pressure source during the anti-lock pressure control of the front and rear wheel brake cylinders 206, 208.

Although the braking system of FIG. 8 is adapted such that the delivery or output end of the pump passage 238 is connected to the rear brake cylinder passage 228, which is downstream of the master cylinder cut valve 230, the output end of the pump passage 238 may be connected to a portion of the front brake cylinder passage 226 which is upstream or downstream of the master cylinder cut valve 230.

While the pressure reduction control device 242 is disposed in the rear brake cylinder passage 228 in the braking system of FIG. 8, the pressure reduction control device 242 may be disposed in the front brake cylinder passage 226.

In the braking system of FIG. 8, a by-pass passage is provided to by-pass the master cylinder cut valve 230, and a check valve 250 is disposed in this by-pass passage, so as to inhibit a flow of the fluid from the master cylinder 224 toward the front and rear wheel brake cylinders 206, 208. The check valve 250 permits fluid to flow in the opposite direction, with the valve opening pressure difference being substantially zero. This check valve 250 functions not only as a valve for permitting a rapid return of the fluid to the master cylinder 224 upon releasing of the brake operating member, but also as a release valve for preventing an excessive rise of the pressure in the front wheel brake cylinder 206 above the pressure level of the master cylinder 200 during an operation of the pump 240 to increase the front wheel brake cylinder pressure. Reference numeral 252 also denotes a check valve for the rear wheel brake cylinder 208. The check valve 252 has the same function as the check valve 250 for the front wheel brake cylinder 206.

In the anti-lock braking system of the diagonal or X-crossing type having the two pressure application sub-systems according to the third preferred form of the invention, each pressure application sub-system is basically designed to effect simultaneous control of the front and rear wheel braking pressures. During normal operation of the system without anti-lock pressure control, the pressure as generated by the pressure source is applied to the front wheel brake cylinder, whereby the front and rear wheel braking forces are controlled according to the first distribution pattern. During the anti-lock pressure control, the pressure generated by the pressure source is reduced by the pressure reduction control device before it is applied to the front wheel brake cylinder. Thus, the controller and the pressure reduction control device cooperate to establish the second distribution pattern so that the pressure in the front wheel brake cylinder is higher than that in the rear wheel brake cylinder.

The anti-lock braking system according to the above third preferred form of the invention has an advantage as described below by reference to the graphs of FIG. 11.

While the present anti-lock braking system is in the normal pressure control mode, the distribution of the front and rear wheel braking forces is controlled according to the first distribution pattern, regardless of whether the vehicle is in the minimum-load run or in the full-load run. As a result, the actual distribution pattern or curve during the full-load run deviates from the ideal distribution curve such that the rear wheel braking force BR is smaller than the optimum or ideal value, as indicated at right in FIG. 11(a).

While the braking system is in the anti-lock pressure control mode, the actual distribution curve established as a result of the anti-lock pressure control is sufficiently close and similar to the ideal distribution curve during the minimum-load run, even if the non-anti-lock control distribution curve deviates from the ideal distribution curve such that the rear wheel braking force BR is larger than the ideal value. During the full-load run, on the other hand, the non-anti-lock control distribution curve is sufficiently close and similar to the ideal distribution curve for the full-load run, namely, does not deviates from the ideal distribution curve such that the rear wheel braking force BR is larger than the ideal value. Accordingly, the actual distribution curve is sufficiently close and similar to the non-anti-lock control distribution curve. Thus, the actual distribution curve substantially coincides with the ideal distribution curve for the full-load run, as indicated in FIG. 11(b), irrespective of the minimum-load run or full-load run of the vehicle, owing to the anti-lock pressure control operation during the minimum-load run, and owing to the non-anti-lock control distribution which is utilized during the full-load run.

In the present third preferred form of the invention, the first distribution pattern is established in the normal pressure control mode irrespective of the minimum-load or full-load run of the vehicle, and during the minimum-load run in the anti-lock pressure control mode, while the second distribution pattern is established during the full-load run in the anti-lock pressure control mode.

The present third preferred form may be suitably combined with the second preferred form indicated above. In this instance, the first distribution pattern is established during the minimum-load run in both the normal pressure control mode and the anti-lock pressure control mode, while the second distribution pattern is established during the full-load run in both of the normal and anti-lock pressure control modes.

It will be understood from the above description that the anti-lock braking system according to the third preferred form of the invention assures the actual distribution pattern of the front and rear wheel braking forces which is as close as possible to the ideal distribution curve or pattern in the anti-lock pressure control mode, whereby the required braking distance of the vehicle in the anti-lock pressure control mode can be significantly reduced.

The fourth optional object indicated above may be achieved according to a fourth preferred form of the present invention, wherein the braking system is an anti-lock braking system of a diagonal or X-crossing type for a four-wheel motor vehicle, as illustrated in FIG. 9. Each pressure application sub-system has two pressure application sub-systems which are connected respectively to two mutually independent pressurizing chambers of a master cylinder 224, each of the two pressure application sub-systems including (a) a front brake cylinder passage 226 connecting a corresponding one of the two pressurizing chambers of the master cylinder 224 and a front wheel brake cylinder 206 of the front brake, (b) a rear brake cylinder passage 228 connecting the front brake cylinder passage 226 and a rear wheel brake cylinder 208 of the rear brake, (c) a master cylinder cut valve 230 in the form of a normally-open shut-off valve disposed in a portion of the front brake cylinder passage 226 between the master cylinder 224 and a point of connection of the front and rear brake cylinder passages 226, 228, the master cylinder cut valve 230 being closed when the braking system is in an anti-lock pressure control mode, and opened when the braking system is not in the anti-lock pressure control mode, (d) an intermediate valve 254 in the form of a normally-open shut-off valve disposed in the rear brake cylinder passage 228, (e) a reservoir passage 234 connected at one of opposite ends thereof to a portion of the rear brake cylinder passage 228 between the intermediate valve 254 and the rear wheel brake cylinder 228, (f) a reservoir 232 connected to the other end of the reservoir passage 234, (g) a pressure reducing valve 236 in the form of a normally-closed shut-off valve disposed in the reservoir passage 234, (h) a pump passage 238 connected at one of opposite ends thereof to the reservoir 232 and at the other end to a portion of the rear brake cylinder passage 228 between the intermediate valve 254 and a point of connection of the front and rear brake cylinder passages 226, 228, (i) a pump 240 disposed in the pump passage 238 for delivering a working fluid from the reservoir 232 to a portion of the each pressure application sub-system, and (j) a controller 241 operable in the anti-lock pressure control mode for controlling the master cylinder cut valve 230, the intermediate valve 254, the pressure reducing valve 236 and the pump 240 to effect an anti-lock pressure control operation for controlling pressures of the fluid in the front and rear wheel brake cylinders 206, 208 in an anti-lock manner, and wherein the distribution control device comprises the controller 241, and a check valve device 256 disposed in a portion of the rear brake cylinder passage 228 between the point of connection of the front and rear brake cylinder passages 226, 228 and a point of connection of the rear brake cylinder passage 228 and the pump passage 238, the check valve device comprising a first check valve 258, and a second check valve 260, the first check valve permitting a flow of the fluid therethrough in a first direction from the pump 240 toward the front wheel brake cylinder 206 after the pressure generated by the pump becomes higher than the pressure in the front wheel brake cylinder 206 by more than a predetermined difference, and inhibiting a flow of the fluid therethrough in a second direction opposite to the first direction, the second check valve 260 permitting a flow of the fluid therethrough in the second direction and inhibiting a flow of the fluid therethrough in the first direction.

The check valve device used in the fourth preferred form of the invention can be considered one example of the pressure reduction control device.

In the above form of the anti-lock braking system, the master cylinder cut valve 230, pressure reducing valve 236 and intermediate valve 254 are provided to control the pressures in the front and rear wheel brake cylinders. As shown in FIG. 9, the intermediate valve 254 is disposed between the front and rear wheel brake cylinders 206, 208, to partially introduce independent pressure control of the front and rear wheel brake cylinder pressures into the basic arrangement to simultaneously control these brake cylinder pressures. In the absence of the intermediate valve 254, the front and rear wheel brake cylinder pressures would always be controlled in the same pressure control manner or mode, and these pressures would have the same relationship. In the presence of the intermediate valve 254, the front and rear wheel brake cylinder pressures can be regulated independently of each other, depending upon the locking tendencies of the corresponding front and rear wheels. For example, the front wheel brake cylinder pressure can be increased while the rear wheel brake cylinder pressure can be reduced.

The present anti-lock braking system is adapted such that the output end of the pump passage 238 is connected to a portion of the rear brake cylinder passage 228, which is upstream of the intermediate valve 254. In this arrangement, the front wheel brake cylinder pressure is increased while the rear wheel brake cylinder pressure is reduced or held constant, when the pump 240 is operated to deliver the pressurized fluid while the intermediate valve 254 is held closed. Thus, the front wheel brake cylinder pressure can be increased independently of the rear wheel brake cylinder pressure. Therefore, this arrangement is effective to reduce the required braking distance where the vehicle is braked when the front and rear wheels lie on respective areas of the road surface which have relatively high and low friction coefficient values, respectively. Namely, the present arrangement makes it possible to maximize the front wheel brake cylinder pressure to take advantage of the relatively high friction coefficient of the road surface area underneath the front wheel.

In the above anti-lock braking system of FIG. 9, the check valve device 256 of the distribution control device is disposed in the portion of the rear brake cylinder passage 228 between the points of connection to the front brake cylinder passage 226 and the pump passage 238. Further, the check valve device 256 comprises the first and second check valves 258, 260 which are arranged in parallel to each other, such that the first check 258 permits the fluid flow in the first direction from the pump 240 toward the front wheel brake cylinder 206 only after the delivery pressure of the pump 240 becomes higher than the pressure in the front wheel brake cylinder 206 by more than the predetermined difference, while the second check valve 260 permits the fluid flow in the second direction opposite to the first direction, with the valve opening pressure difference being substantially zero.

While the braking system of FIG. 9, or its controller 241, is not placed in the anti-lock pressure control mode (i.e., placed in the normal pressure control mode) the fluid as pressurized by the master cylinder 224 is supplied to the front wheel brake cylinder 206 through the open master cylinder cut valve 230, and to the rear wheel brake cylinder 208 through the second check valve 260 and the normally-open intermediate valve 254, without pressure reduction by the check valve device 256. Thus, the pressure applied to the rear wheel brake cylinder 208 is not reduced with respect to the master cylinder pressure, whereby the distribution of the front and rear wheel braking forces is controlled according to the first distribution pattern which causes the front and rear wheel brake cylinder pressures to be equal to each other.

While the controller 241 is placed in the anti-lock pressure control mode, the master cylinder cut valve 230 is closed and the pump 240 is operated, so that the fluid delivered from the pump 240 is applied to the front wheel brake cylinder 206 through the first check valve 258. Since the fluid is permitted to flow through the first check valve 258 in the first direction only after the delivery pressure of the pump 240 has been raised to the predetermined valve opening threshold level, the pressure to be applied to the front wheel brake cylinder 206 is reduced to the delivery pressure of the pump 240 by an amount corresponding to the opening pressure difference of the first check valve 258. However, the fluid as delivered from the pump 240, is applied to the rear wheel brake cylinder 208, without pressure reduction by the first check valve 258. Accordingly, the pressure in the front wheel brake cylinder 206 is controlled to be lower than that in the rear wheel brake cylinder 208 by the amount corresponding to the opening pressure difference of the first check valve 258, while the front and rear wheel brake cylinder pressures are increased in the anti-lock pressure control mode with the pump 240 being operated. Therefore, the distribution of the front and rear wheel braking forces in the anti-lock pressure control mode is controlled according to the second distribution pattern, which is substantially the same as the non-anti-lock control distribution pattern which is established in the normal pressure control mode (i.e., the pattern that causes the rear wheel braking force to be relatively high).

The distribution control device constructed according to the fourth preferred form of the invention may also be used in the third preferred form of the invention described above.

In the anti-lock braking system of the X-crossing type according to the present fourth preferred form of the invention, the intermediate valve permits the front and rear wheel brake cylinder pressures to be controlled independently of each other in each pressure application sub-system, which is basically designed for simultaneous control of the front and rear wheel brake cylinder pressures. Thus, the intermediate valve permits a greater amount of flexibility to control the anti-lock pressures of front and rear wheel brake cylinders as running condition of the vehicle.

The fifth optional object indicated above can be achieved according to one advantageous arrangement of the above fourth preferred form of the present invention which includes the check valve device. In this arrangement, at least a part of the portion of the rear brake cylinder passage 228 between the point of connection of the front and rear brake cylinder passages 226, 228 and the point of connection of the rear brake cylinder passage 228 and the pump passage 238 consists of a first and a second passage which are concentric with and mutually independent of each other and which have a circular and an annular cross sectional shape, respectively. The first check valve 256 is disposed in one of these first and second passages while the second check valve 260 is disposed in the other of the first and second passages.

The first check valve 258 may include a valving member in the form of a ball which is seated on a valve seat under a biasing action of suitable biasing means. The second check valve 260 may be a valve which includes an annular one-way sealing member made of an elastic material.

In the above advantageous arrangement, the first and second check valves 258, 260 are disposed in the one and the other of the first and second passages which have the circular and annular cross sectional shapes and which are disposed concentrically with each other such that one of the circular and annular passages is located within the other passage. Namely, the circular and annular passages are not arranged in parallel in the diametric direction thereof. This arrangement is effective to minimize the maximum dimension of the check valve device 256 in the diametric direction of those first circular and second annular passages, whereby the overall size of the check valve device 256 can be effectively reduced. Accordingly, the braking system incorporating the check valve device can be manufactured without a considerable increase in required installation space.

The sixth optional object indicated above may be achieved according to another advantageous arrangement of the above fourth preferred form of this invention, wherein the controller 241 has a plurality of pressure control modes which are selectively established to control the master cylinder cut valve 230, the intermediate valve 254 and the pressure reducing valve 236 in the anti-lock manner. The pressure control modes include (1) a mode in which the intermediate valve and the pressure reducing valve are both open while the master cylinder cut valve is closed, to reduce the pressures in both of the front and rear wheel brake cylinders 206, 208, (2) a mode in which the master cylinder cut valve and the intermediate valve are both closed while the reducing valve is open, to increase the pressure in the front wheel brake cylinder and reduce the pressure in the rear wheel brake cylinder, by operation of the pump 240, and (3) a duty-cycle pressure control mode in which the master cylinder cut valve and the pressure reducing valves are both closed while the intermediate valve is alternately closed and opened to increase the pressures in the front and rear wheel brake cylinders by operation of the pump 240.

In the above advantageous arrangement, the controller 241 has the duty-cycle control mode in which the intermediate valve 254 is alternately closed and opened to increase the pressures in the front and rear wheel brake cylinders by operation of the pump 240. In the anti-lock pressure control mode, the fluid delivered from the pump 240 is supplied to only the front wheel brake cylinder 206 while the intermediate valve 254 is in the closed state, and is supplied to not only the front wheel brake cylinder 206 but also the rear wheel brake cylinder 208 while the intermediate valve 254 is in the open state. Accordingly, the repetition of the alternate closing and opening of the intermediate valve 254 makes it possible to increase the pressure in each of the front and rear wheel brake cylinders at a rate which is intermediate between a rate when the intermediate valve is kept open and a rate when the intermediate valve is kept closed. The duty-cycle control mode improves the freedom of control of the front and rear wheel braking pressures.

The seventh optional object indicated above may be achieved if the controller 241 is adapted to comprise means for changing a duty cycle of the intermediate valve 254 in the duty-cycle pressure control mode. Although the duty cycle may be fixed, it is desirable to vary the duty cycle as a function of the specific running condition of the vehicle. This allows the braking pressures to be controlled with a higher degree of freedom and thereby enhances braking performance. This arrangement permits the front and rear wheel braking pressures to be increased at optimum rates with the duty cycle of the intermediate valve being suitably controlled in the anti-lock pressure control mode, which is a function of the running condition of the vehicle.

The duty cycle of the intermediate valve 254 may be changed by modifying the ratio of the time period when the intermediate valve is open to the time period when the intermediate valve is closed.

The rates of increase of the wheel braking pressures may be changed by some mechanical means, for instance, flow restrictions such as orifices, which are disposed in the front and rear brake cylinder passages and which possess variable cross sectional areas of fluid flow. In the desirable arrangement indicated above, such mechanical means are replaced by the means for changing the duty cycle of the intermediate valve as described above, said means are constituted by a control program or electronic circuitry provided in the controller. Thus, the present arrangement permits the rates of increase of the brake cylinder pressures while avoiding an increase in the cost of the braking system.

Generally, individual vehicles have different optimum increase rates of the wheel brake cylinder pressures. Optimum increase rates assure adequate anti-lock control of the wheel braking forces. These optimum increase rates depend on the specific characteristics of the braking system, such as the ratio of the diameters of the front and rear wheel brake cylinders, and to the specific braking conditions of the vehicle, such as the actual braking effect and load distribution of the vehicle on the front and rear wheels. In the above arrangement, the rate of pressure increase of the front and rear wheel brake cylinders can be easily controlled without a costly mechanism. In doing so the duty cycle of the intermediate valve is controlled by the controller, which meets the specific characteristics of the braking system of the particular vehicle.

The eighth optional object indicated above may be achieved if the above-indicated means for changing the duty cycle of the intermediate valve is adapted to change the duty cycle on the basis of either the of pressure reducing tendency of the front wheel brake cylinder or the pressure reducing tendency of the rear wheel brake cylinder, or both. These tendencies are observed during control of the anti-lock pressures by said controller. For example, the pressure reducing tendencies, or hystereses, are expressed by the number or frequency of observed pressure reductions of the front and rear wheel brake cylinders, the pressure reducing time periods of these cylinders, or the rates at which the pressure have been reduced.

Such previous and present pressure reducing tendencies directly reflect the locking tendencies of the front and rear wheels. Accordingly, the locking tendencies of the wheels can be detected by monitoring the pressure reducing tendencies in the anti-lock pressure control mode. If the pressure in the rear wheel brake cylinder has been reduced more frequently than that in the front wheel brake cylinder, it is possible to determine that the rear wheel has a higher locking tendency that the front wheel. In this case, it is desirable to reduce the rear brake cylinder pressure and increase the front wheel brake cylinder pressure. In other words, it is desirable to determine the duty cycle of the intermediate valve, so as to establish a distribution of the pressures of the front and rear wheel braking cylinders which causes a higher rate of increase in the pressure of the front wheel brake cylinder and a lower rate of increase in the rear wheel brake cylinder when the rear wheel brake cylinder has exhibited a higher tendency of pressure reduction that the front wheel brake cylinder.

In the above arrangement in which the duty cycle is changed on the basis of the pressure reducing tendencies of the front and rear wheel brake cylinders, the braking capacities of the wheels can be maximized with the locking tendency of each wheel taken into consideration. In this respect, it is noted that the locking tendencies of the wheels are dependent on various factors such as the friction coefficients of the road surface areas beneath the wheels, and from the wheel braking torques and loads acting on the wheels. Therefore, the rates of increase of the brake cylinder pressures which are determined by the controlled duty cycle of the intermediate valve can be adequately controlled with high precision more accurately to reflect the actual braking or locking tendencies of the wheels.

The pressure reducing tendencies of the front and rear wheel brake cylinders can be detected by monitoring the signals generated to energize or de-energize the solenoids of the master cylinder cut-off valve, intermediate valve and pressure reducing valve. Thus, the above arrangement does not require an exclusive sensor for detecting the pressure reducing tendencies of the wheel brake cylinders, and is therefore available at a relatively low cost while it is capable of adequately controlling the duty cycle of the intermediate valve, namely, the pressure increase rates of the wheel brake cylinders.

The means for changing the duty cycle of the intermediate valve may be adapted to vary the duty cycle as a function of an amount of shift of a vehicle load in a running direction of the vehicle. The load shift may be detected on the basis of the deceleration of the vehicle in the running direction. Specifically, upon braking of the vehicle, the load acting on the front wheels increases while the load acting on the rear wheels decreases because the vehicle load in the vehicle running direction shifts. This means that the front wheel brake cylinder pressure should be increased to increase the braking force on the front wheel while the rear wheel brake cylinder pressure should be reduced to prevent the rear wheel from locking. To this end, it is preferable to determine the duty cycle of the intermediate valve, so as to establish a distribution of the pressures of the front and rear wheel brake cylinders which causes a higher rate of increase in the pressure of the front wheel brake cylinder and a lower rate of increase in the rear wheel brake cylinder when the amount of shift of the load to a front wheel for which the front wheel brake cylinder is provided is relatively large than when the amount of shift of the load to the front wheel is relative small.

Alternatively, the means for changing the duty cycle of the intermediate valve may be adapted to vary the duty cycle as a function of an amount of shift of a vehicle load in the lateral direction of the vehicle, which may be detected on the basis of the lateral acceleration of the vehicle. In pressure application sub-systems, in which the front and rear wheels are braked by the front and rear wheel brake cylinders are respectively located on the outer and inner sides of the vehicle turning line along which the vehicle is turning, the load acting on the front wheel increases while the load acting on the rear wheel decreases, due to a shift of the vehicle load in the lateral direction (i.e., perpendicular to the running direction). In this case as well, it is desirable to increase the front wheel brake cylinder pressure to increase the braking force of the front wheel and decrease the rear wheel brake cylinder pressure to prevent the locking of the rear wheel. In this respect, it is preferable to determine the duty cycle of the intermediate valve, to establish a distribution of the pressures of the front and rear wheel brake cylinders. This preferable duty cycle causes a higher rate of increase in the pressure in the front wheel brake cylinder and a lower rate of increase in the rear wheel brake cylinder when the amount of shift of the load is relatively large than when the amount of shift of the load is relatively small. This results in the pressure application sub-system in which the front and rear wheels are located on the outer and inner sides of the vehicle turning line respectively.

BRIEF DESCRIPTION OF THE DRAWINGS

The above-identified optional objects, features, and advantages of the present invention will be better understood by reading the following detailed description of the preferred embodiments of the present invention in combination with the accompanying drawings, in which.

DETAILED DESCRIPTION OF THE PREFERRED EMBODIMENTS

Figure 12:
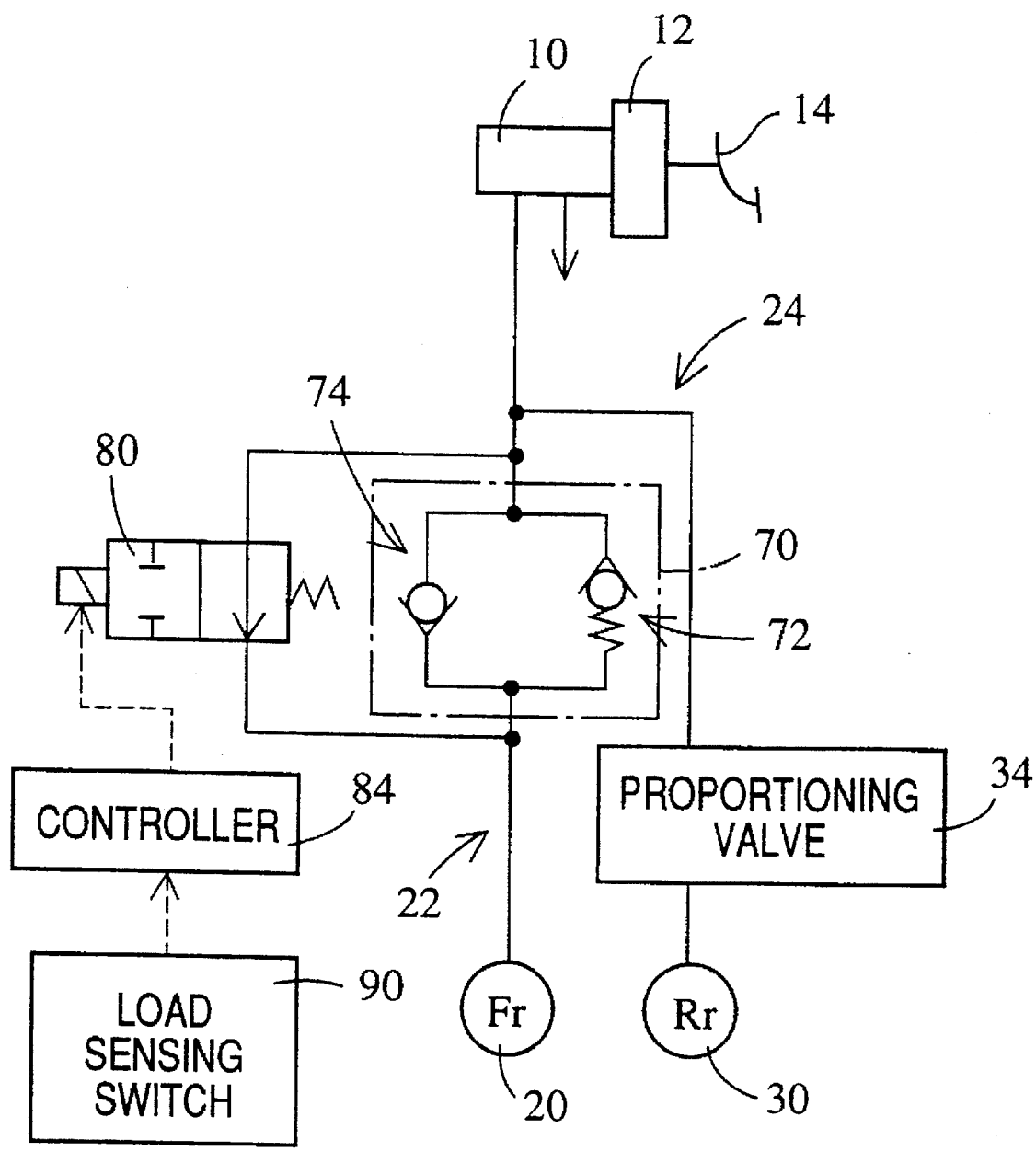
FIG. 12 is a schematic view of one embodiment of the braking system of the present invention.

Referring first to FIG. 12, there will be described one embodiment of the present invention for a braking system of the diagonal or X-crossing type motor vehicle's.

In FIG. 12, reference numeral 10 denotes a master cylinder which functions as a hydraulic pressure source. The master cylinder 10 is of a tandem type in which two mutually independent fluid pressurizing chambers are disposed in series. The master cylinder 10 is linked with a brake operating member in the form of a brake pedal 14 through a booster 12. Upon operation or depression of the brake pedal 14 by the driver or operator of the motor vehicle, equal fluid pressures are mechanically generated in the two pressurizing chambers of the master cylinder 10.

Figure 1:
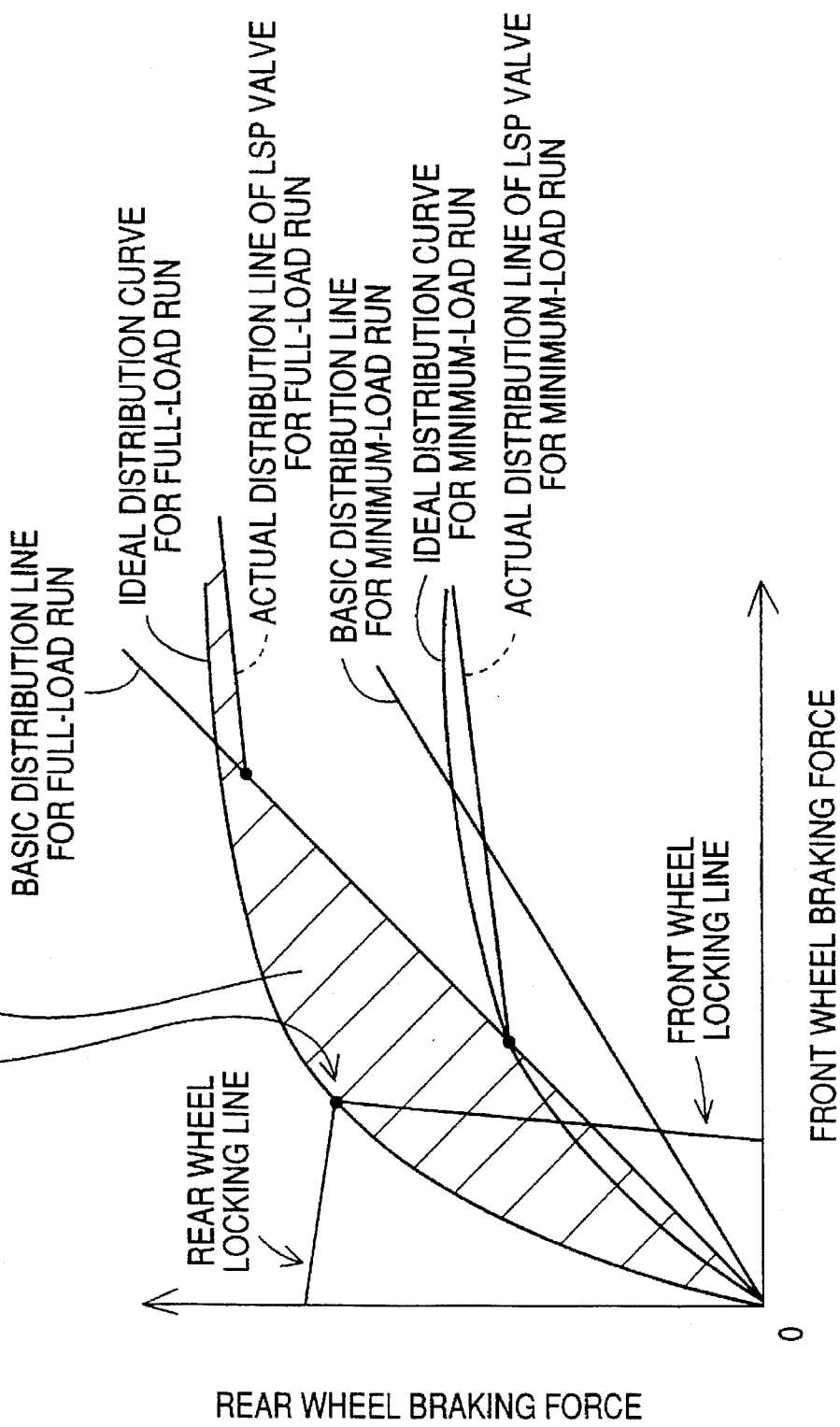
FIG. 1 is a graph explaining a relationship between braking forces of front and rear wheels in a known braking system of a motor vehicle.
Figure 2:
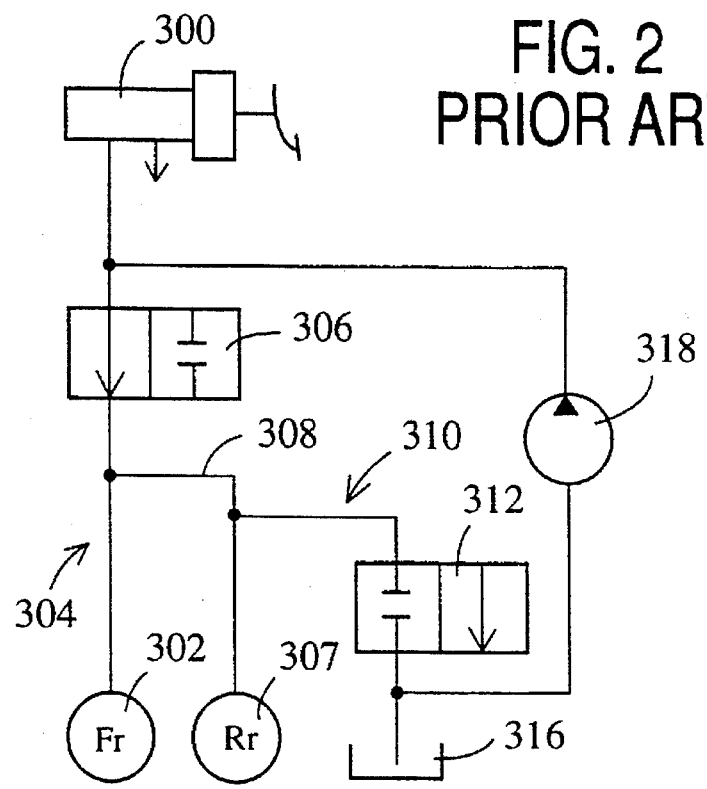
FIG. 2 is a schematic view of one example of a known anti-lock braking system of diagonal or X-crossing type.
Figure 3:
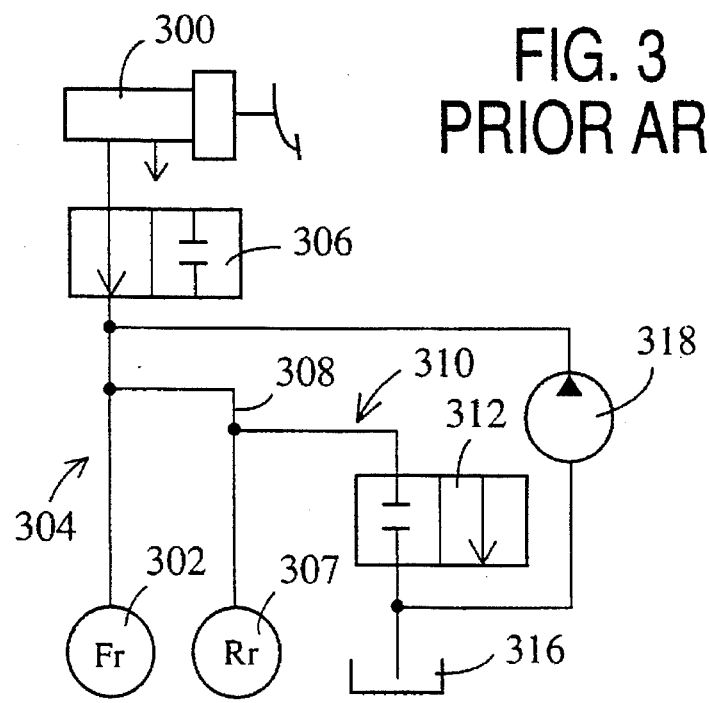
FIG. 3 is a schematic view of another example of a known anti-lock braking system of the same type as that of FIG. 2.
Figure 4:
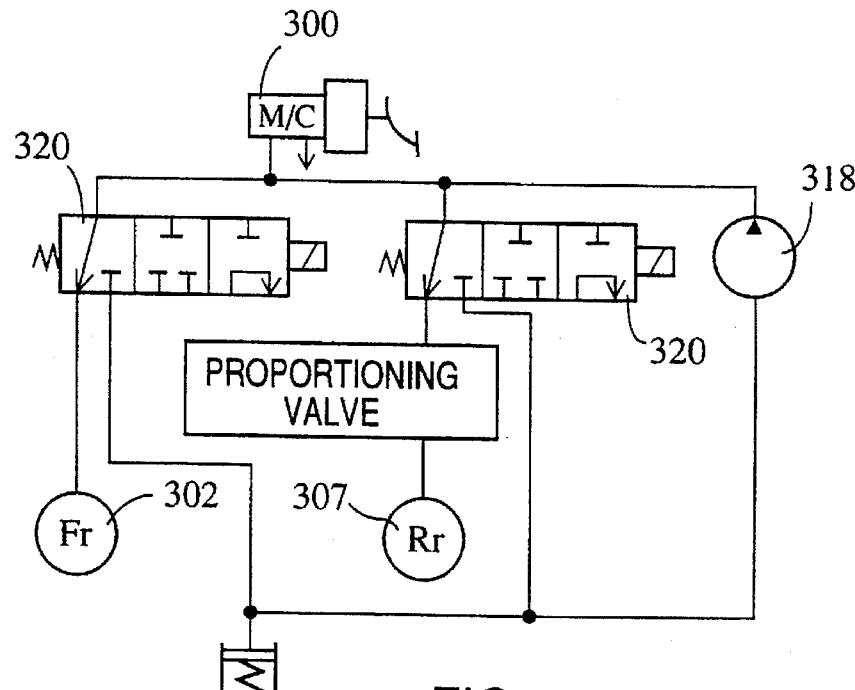
FIG. 4 is a schematic view of one example of a known anti-lock braking system of independent front-rear braking force control type.
Figure 5:
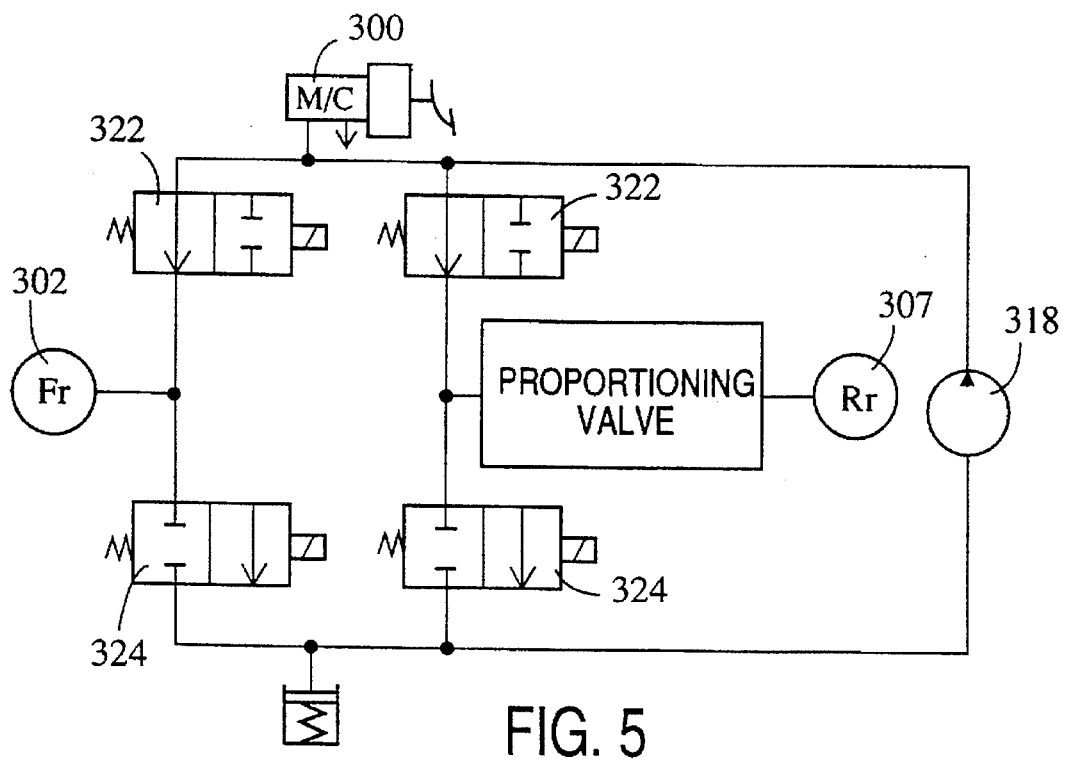
FIG. 5 is a schematic view of another example of the known anti-lock braking system of the same type as that of FIG. 4.
Figure 6:
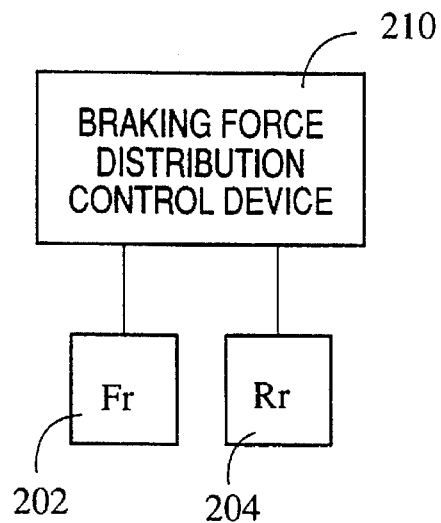
FIG. 6 is a block diagram illustrating a principle of the present invention.
Figure 7:
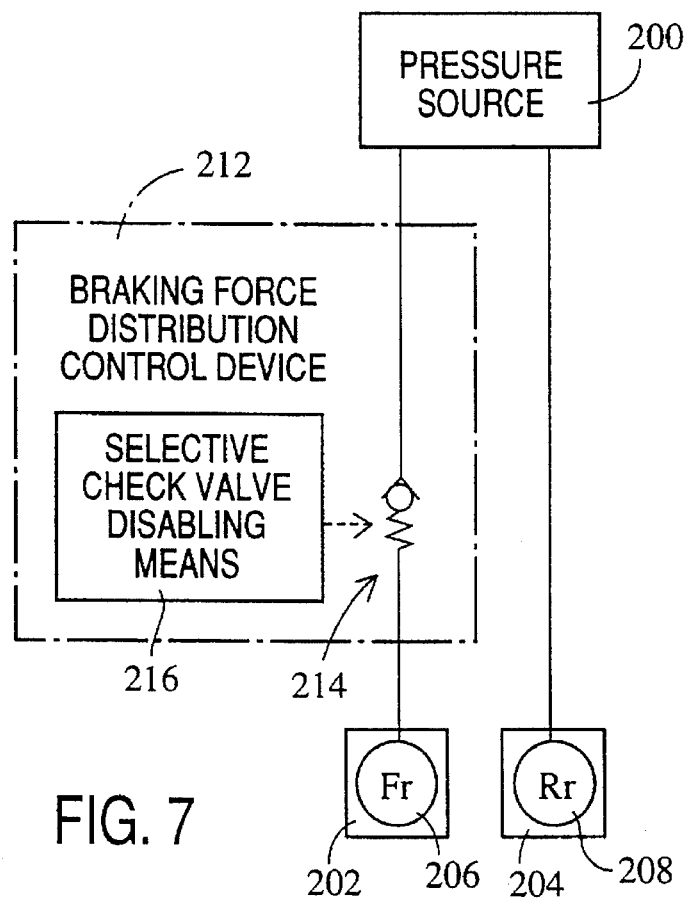
FIG. 7 is a block diagram illustrating one preferred form of the present invention.
Figure 8:
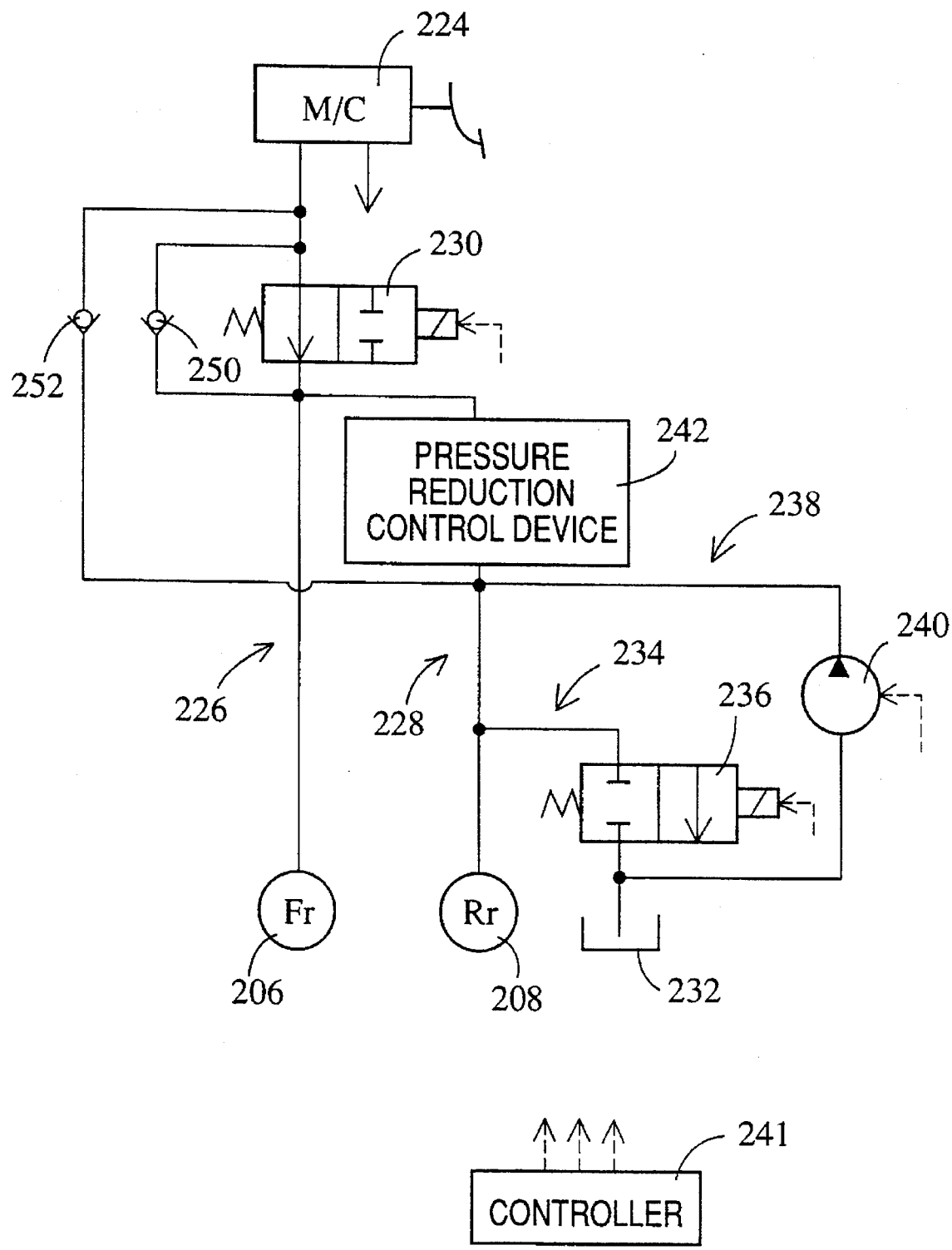
FIG. 8 is a hydraulic circuit diagram schematically showing a further preferred form of this invention.
Figure 9:
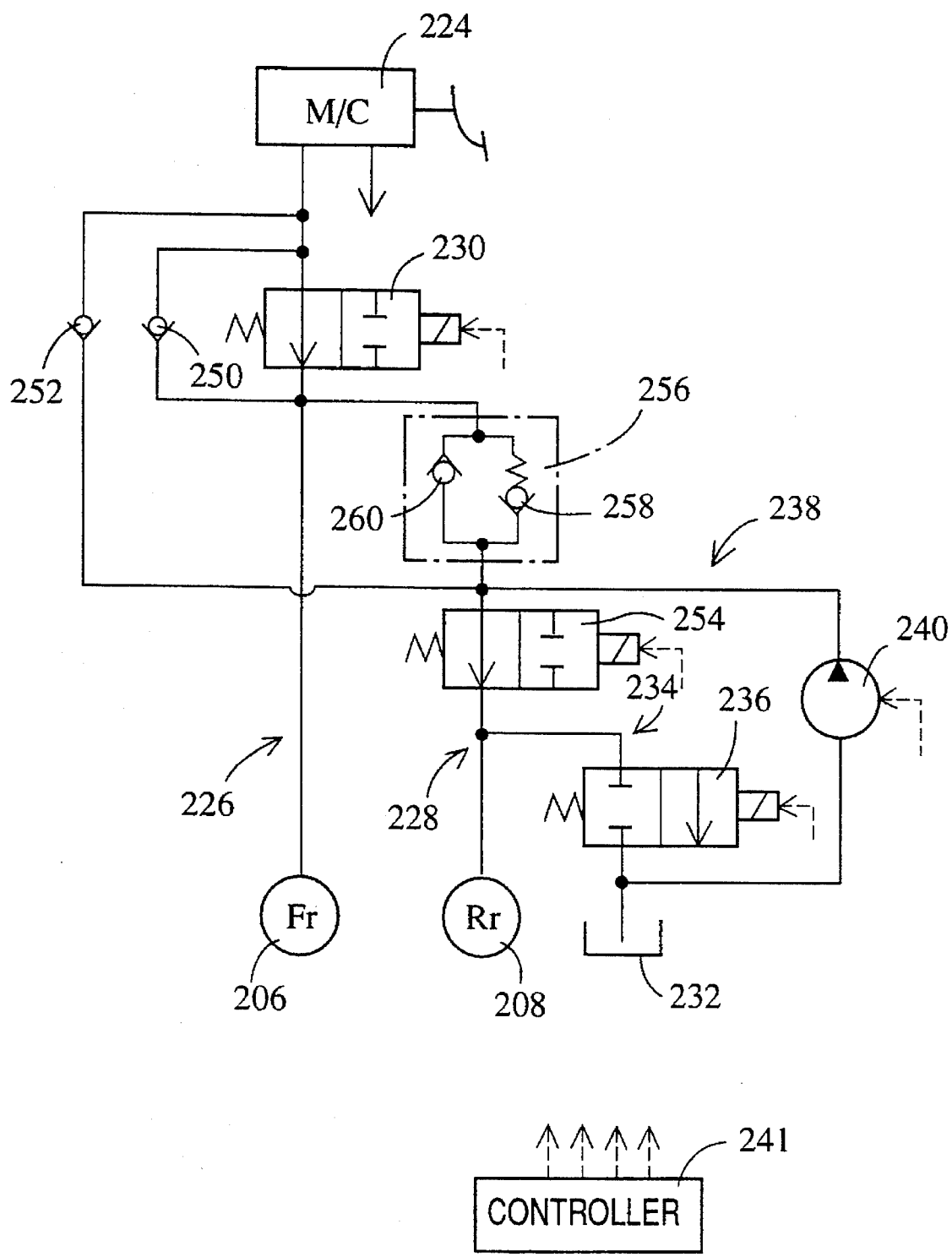
FIG. 9 is a hydraulic circuit diagram schematically showing a still further preferred form of the invention.
Figure 10:
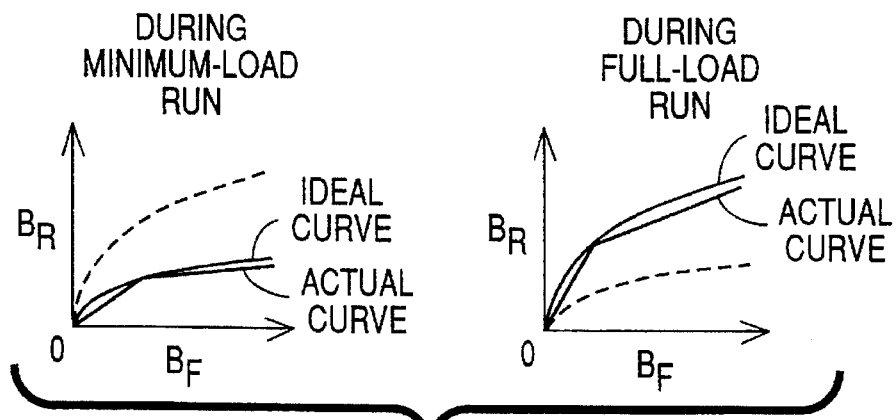
FIG. 10 is a graph explaining an advantage of the preferred form of the invention of FIG. 7.
Figure 11A:
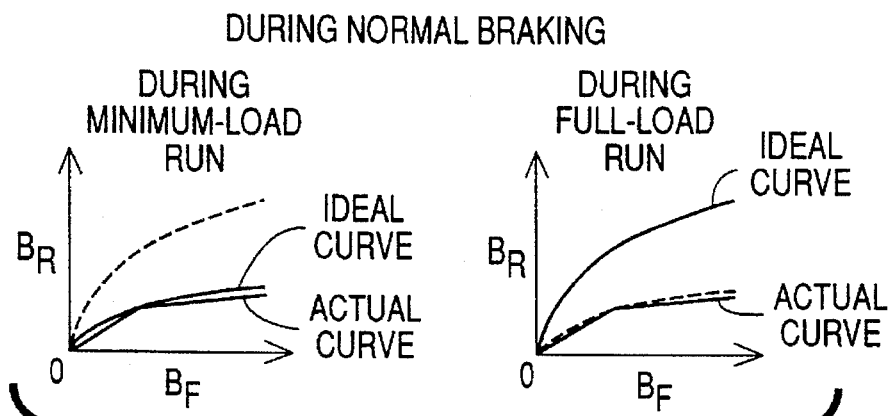
FIGS. 11a and 11b are graphs explaining an advantage of the preferred form of the invention of FIG. 8.
Figure 11B:
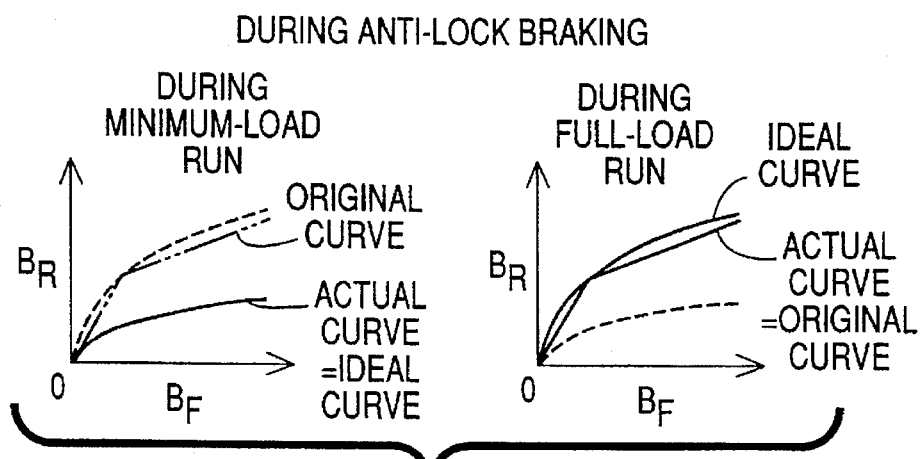

One of the pressurizing chambers of the master cylinder 10 is connected to brake cylinders of hydraulically operated brakes for a front left wheel and a rear right wheel of the vehicle, while the other pressurizing chamber is connected to brake cylinders of hydraulically operated brakes for a front right wheel and a rear left wheel of the vehicle. These brake cylinders are hereinafter referred to as "wheel brake cylinders." Thus, the braking system has two mutually independent pressure application sub-systems one of which has the front left wheel brake cylinder and the rear right wheel brake cylinder, and the other of which has the front right wheel brake cylinder and the rear left wheel brake cylinder. Since the two pressure application sub-systems are identical in construction with each other, only one of these sub-systems is illustrated in FIG. 1 and will be described below.

In each pressure application sub-system, the corresponding pressurizing chamber of the master cylinder 10 is connected to the front wheel brake cylinder 22 through a front brake cylinder passage 20. A rear brake cylinder passage 24 is connected at one end thereof to the front wheel brake cylinder passage 20 and at the other end to the rear wheel brake cylinder 30.

In the rear brake cylinder passage 24, there is provided a proportioning valve 34 (hereinafter referred to as "P valve 34"). The P valve 34 is a pressure reducing valve which operates so that the fluid pressure as generated by the master cylinder 10 (hereinafter referred to as "master cylinder pressure") is applied to the rear wheel brake cylinder 30 without reduction of the master cylinder pressure, until the master cylinder pressure reaches a predetermined threshold level, and so that the master cylinder pressure higher than the threshold level is reduced at a predetermined ratio, so that the reduced pressure is applied as the braking pressure to the rear wheel brake cylinder 30. This P valve 40 is a load-sensing proportioning valve in which the threshold level indicated above increases with an increase in the amount of load which acts on the vehicle. The construction of the load-sensing P valve 40 will be described in detail by reference to FIG. 13.

The P valve 34 is mounted on the vehicle such that the P valve 34 is connected to the portions of sprung and unsprung members of the vehicle said portions correspond to the rear wheels. The P valve 34 has a valve body 40 fixed to the vehicle body, which is a sprung member of the vehicle. In the valve body 40, there is fluid-tight and slidably receivable stepped piston 42. With the piston 42 received in the valve body 40, the space formed in the valve body 40 is divided into an input chamber 44 communicating with the master cylinder 10, and an output chamber 46 communicating with the rear wheel brake cylinder 30. These input and output chambers 44, 46 are normally held in communication with each other through a communication passage 48 formed through the piston 42. A shut-off valve 50 is disposed in the communication passage 48. The shut-off valve 50 has a valving member in the form of a ball 52, a valve seat 54, and biasing means in the form of a return spring 56 for biasing the ball 52 in a direction toward the valve seat 54. Normally, the shut-off valve 50 is held open with the ball 52 spaced apart from the valve seat 54 by a stationary valve opening member 60. When the master cylinder pressure, that is, the pressure in the input chamber 44 exceeds the threshold level of the P valve 34, the piston 42 is moved in a direction away from the valve opening member 60, and the ball 52 is eventually seated on the valve seat 54 under a biasing force of the return spring 56, whereby the communication passage 48 is closed. As a result, the input and output chambers 44, 46 are disconnected from each other. Thus, the pressure in the output chamber 44 is reduced with respect to that in the input chamber 44, at a ratio determined by the ratio of the pressure-receiving areas of the piston 42.

One of the end portions of the piston 42 on the side of the input chamber 44 extends through the valve body 40 and is exposed to the atmosphere, so that the end face of the exposed end portion of the piston 42 is held in abutting contact with a lever 64 which is pivotally connected at its proximal end to the valve body 40. The lever 64 is bifurcated at an intermediate portion, and has two distal end portions. One of these distal end portions is connected to the valve body 40 through biasing means in the form of an adjusting spring 66, while the other distal end portion is connected to the unsprung member (e.g., rear axle) of the vehicle through a main spring 68. This main spring 68 functions as force generating means which generates a force that varies with the amount of relative displacement between the portions of the sprung and unsprung members of the vehicle, which portions correspond to the rear wheels. According to this arrangement, the lever 64 applies to the piston 42 a force which corresponds to a difference obtained by subtracting the biasing force of the main spring 68 from the biasing force of the adjusting spring 66. During the full-load run of the vehicle, the biasing force of the main spring 68 is smaller than during the minimum-load run, as a result of contraction of the main spring 68, whereby the force F which is transferred to the piston 42 through the lever 64 is increased, and the force which the ball 52 should overcome for opening the shut-off valve 50 is accordingly increased. Therefore, the threshold level of the master cylinder pressure at which the P valve 34 begins to reduce the braking pressure in the rear wheel cylinder 30 is raised as the load acting on the vehicle (i.e., the rear wheels) increases.

In a portion of the front brake cylinder passage 22 between the front wheel brake cylinder 20 and the point of connection of the front and rear brake cylinder passages 22, 24, there is disposed a check valve device 70 having a first check valve 72 and a second check valve 74 which are disposed in parallel. The directions in which the first and second check valves 72, 74 permit flow of the brake fluid, respectively, are opposite to each other.

The first check valve 72 permits a flow of the brake fluid in the direction from the master cylinder 10 toward the front wheel brake cylinder 20. Namely, the brake fluid is permitted to flow through the first check valve 72 in the above-identified direction when the pressure of the master cylinder 10 is higher than the pressure in the front wheel brake cylinder 20 by more than a predetermined difference (valve opening pressure difference), which is not substantially zero. That is, the first check valve 72 permits the fluid flow in the above-identified direction after the pressure on the upstream side of the check valve 72 becomes higher than the pressure in the front wheel brake cylinder 20 by more than the predetermined valve opening pressure difference. The first check valve 72 inhibits a flow of the brake fluid in the direction from the front wheel brake cylinder 20 toward the master cylinder 10. The opening pressure difference of the first check valve 72 is determined, for example, by a biasing force of a spring which biases a valving member in the form of a ball used in the first check valve 72. It is noted that the purpose of the first check valve 72 is not to inhibit the flow of the brake fluid in the above-identified direction but to reduce the braking pressure in the front wheel brake cylinder 20, the first check valve 72 can be considered as a pressure reducing valve of a check valve type.

On the other hand, the second check valve 74 permits a flow of the brake fluid in the direction from the front wheel brake cylinder 20 toward the master cylinder 10, with the valve opening pressure difference being substantially zero. Since the direction of flow of the brake fluid through the second check valve 74 is opposite to that of the flow of the brake fluid through the first check valve 72, these two check valves 72, 74 cooperate to permit bidirectional flow of the brake fluid through the check valve device 70.

The check valve device 70 thus constructed provides a hysteresis in the relationship between the master cylinder pressure and the front wheel braking pressure (pressure in the front wheel brake cylinder 20). This hysteresis will be described by reference to the graph of FIG. 14.

When the master cylinder pressure is increased from zero by depression of the brake pedal 14 by the vehicle operator, the first check valve 72 is held closed until the master cylinder pressure becomes higher than the pressure in the front wheel brake cylinder 20 by more than the predetermined valve opening pressure difference. Therefore, the brake fluid is not permitted to flow from the master cylinder 10 toward the front wheel brake cylinder 20, and the front wheel braking pressure is held at zero, until the preset opening pressure difference of the first check valve 72 is exceeded. Accordingly, only the master cylinder pressure is increased from zero. In other words, the point (hereinafter referred to as "front-rear force distribution point") representing the master cylinder pressure and the front wheel braking pressure in the graph of FIG. 14 is moved from the zero point of the coordinate in the direction parallel to the horizontal axis along which the master cylinder pressure is taken.

Figure 14:
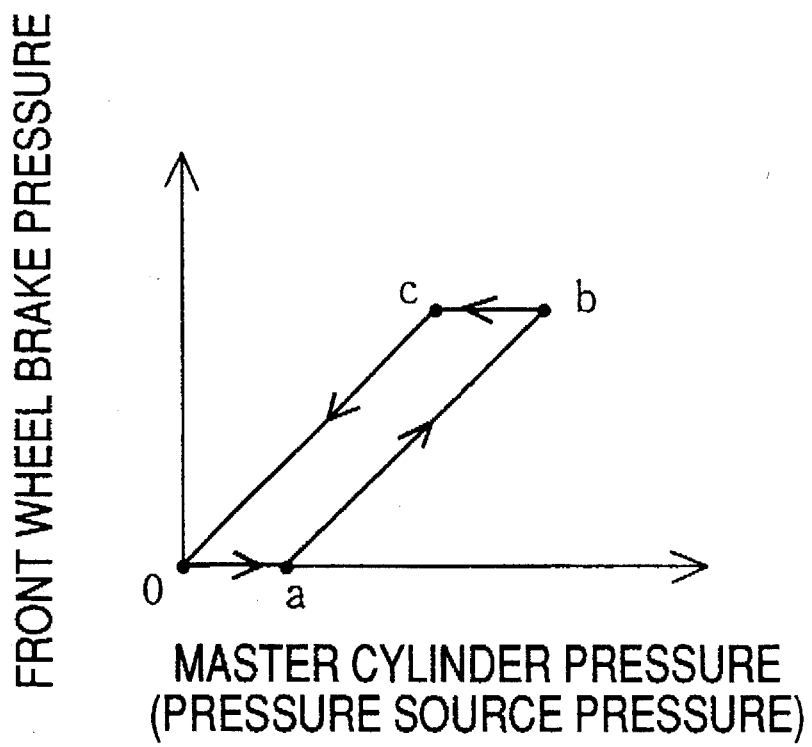
FIG. 14 is a graph indicating a pressure control characteristic of a check valve device provided in the braking system of FIG. 12.

When the opening pressure difference of the first check valve 72 is exceeded as a result of further depression of the brake pedal 14, the force distribution point is moved to point "a" indicated in FIG. 14. If the master cylinder pressure is further increased, the first check valve 72 is opened, and the brake fluid flows from the master cylinder 10 toward the front wheel brake cylinder 20, whereby the front wheel braking pressure is raised from zero as the master cylinder pressure is increased, such that the front wheel braking pressure is lower than the master cylinder pressure by the preset opening pressure difference of the first check valve 72. Consequently, the force distribution point is moved from point "a" to "b" indicated in FIG. 14.

If the brake pedal 14 is released when the master cylinder pressure corresponds to the distribution point "b", the second check valve 74 is closed inhibiting the flow of the brake fluid from the front wheel brake cylinder 20 toward the master cylinder 10 as long as the master cylinder pressure is higher than the front wheel braking pressure. Therefore, the front wheel braking pressure is held constant at the level corresponding to the force distribution point "b", while the master cylinder pressure is lowered to a level corresponding to a force distribution point "c" indicated in FIG. 14.

When the master cylinder pressure is further reduced to a level lower than the front wheel braking pressure, the second check valve 74 is opened permitting the brake fluid to flow from the front wheel brake cylinder 20 toward the master cylinder 10, causing the front wheel braking pressure to be lowered as the master cylinder pressure is lowered. Consequently, the force distribution point is moved from "c" to the zero point.

Figure 13:
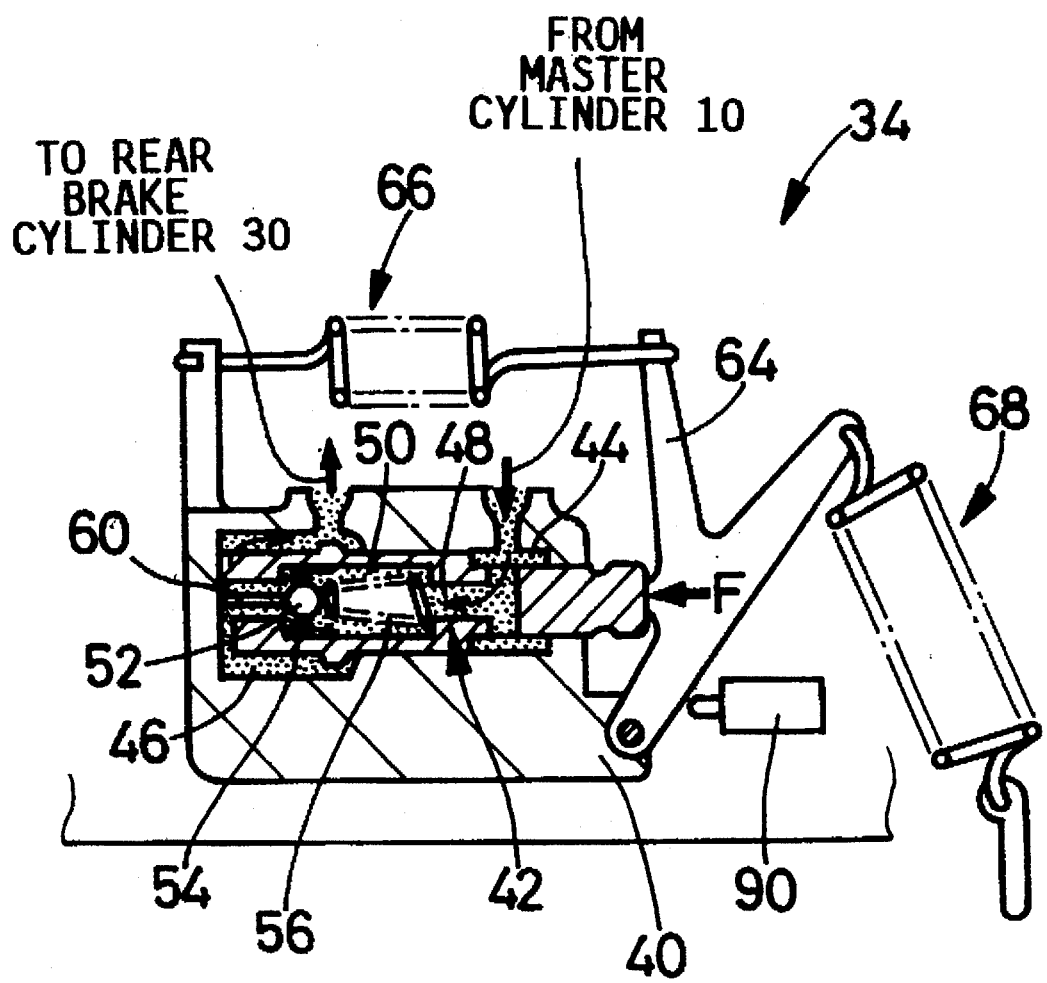
FIG. 13 is a fragmentary front elevational view in cross section of a proportioning valve provided in the braking system of FIG. 12.

Referring back to FIG. 12, a solenoid-operated shut-off valve 80 is disposed in parallel with the check valve device 70. This shut-off valve 80 is normally held open, thereby disabling the check valve device 70 to perform its pressure reducing function. The shut-off valve 80 is controlled by a controller 84, which principally consists of a computer incorporating a central processing unit (CPU), a read-only memory (ROM) and a random-access memory (RAM). The controller 84 is adapted to close the shut-off valve 80, for thereby enabling the pressure reducing function of the check valve device 70, when the vehicle load exceeds a predetermined value. To this end, a load-sensing switch 90 is connected to the controller 84. This load-sensing switch 90 is fixed to the sprung member of the vehicle, namely, to the vehicle body, such that the switch 90 is located near the lever 64 of the P valve 34, as indicated in FIG. 13. The switch 90 is positioned so that the switch 90 is OFF when the vehicle load is smaller than the predetermined value, and is turned ON when the vehicle load exceeds the predetermined value, that is, when the angle of counterclockwise pivoting of the lever 64 while pushing the piston 42 into the valve body 40 exceeds a predetermined value. The predetermined value of the vehicle load may be the nominal maximum load value of the vehicle (may correspond to the full-load run), or may be 80% or 60% of the nominal maximum load value, for example.

Figure 15:
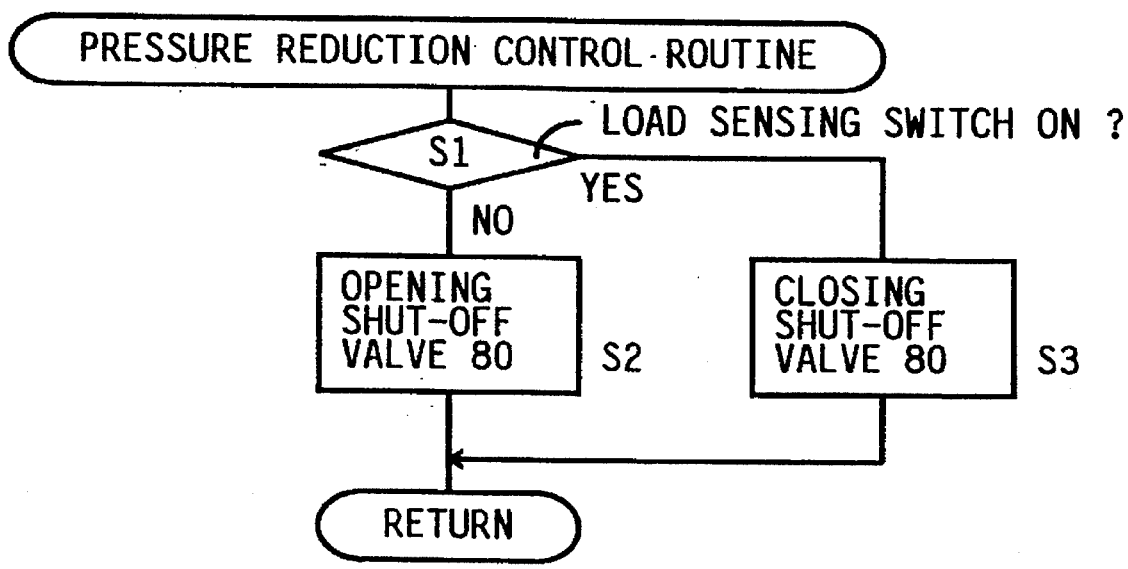
FIG. 15 is a flow chart illustrating a pressure reduction control routine executed by a computer of a controller used in the braking system of FIG. 12.

The ROM in the computer of the controller 84 stores a control program for a pressure reduction control routine as illustrated in the flow chart of FIG. 15, for controlling the solenoid-operated shut-off valve 80 so as to disable the check valve device 70 as needed. This routine is executed with a predetermined cycle time. The routine is initiated with step S1 to determine whether the load-sensing switch 90 is in the ON state. If the switch 90 is not in the ON state due to the vehicle load smaller than the predetermined value, a negative decision (NO) is obtained in step S1, and the control flow goes to step S2, in which the solenoid of the shut-off valve 80 is de-energized to open the shut-off valve 80, for disabling the check valve device 70 to perform its pressure reducing function. If the vehicle load is larger than the predetermined value and the switch 90 is in the ON state, an affirmative decision (YES) is obtained in step S1, and the control flow goes to step S3 in which the solenoid of the shut-off valve 80 is energized to close the shut-off valve 80, for enabling the check valve device 70 to perform its pressure reducing function. One cycle of execution of the pressure reduction control routine is terminated after the completion of step S2 or S3.

Referring to the graph of FIG. 16, one advantageous effect of the present braking system will be explained. For clarity, the following description refers only to operation of the braking system during the minimum-load run and the full-load run, as examples. Although not limited to minimum and full-load runs, no description of the operation of vehicle load's intermediate between the maximum and minimum values will be provided. This applies to the other embodiments of the invention described later.

When the brake pedal 14 is depressed by the vehicle operator while the load-sensing switch 90 is in the OFF state with the vehicle load smaller than the predetermined value, the master cylinder pressure is applied to the front wheel brake cylinder 220 without reduction of the master cylinder pressure by the first check valve 72. At the same time, the master cylinder pressure is applied to the rear wheel brake cylinder 30 through the P valve 34. Consequently, the front-rear force distribution point is moved from the zero point along a first basic distribution line (determined by the basic braking arrangement without the P valve 34 and check valve device 70) and a distribution line of the P valve 34 for the minimum-load run, as indicated in the graph of FIG. 16. If the vehicle operator depresses the brake pedal 14 to a position corresponding to the front wheel braking pressure that is slightly lower than the level at which the front wheels begins to be locked on the road surface, the force distribution point is moved to a point of intersection between the first basic distribution line or the distribution line of the P valve 34 for the minimum-load run and a front wheel locking line for the minimum-load run (also indicated in FIG. 16). The front wheel locking line is determined by the friction coefficient of the road surface on which the vehicle is running. In the present specific example, the point of intersection is indicated at "a". As is apparent from the graph of FIG. 16, the rear wheel braking force corresponding to the intersection point "a" is almost as large as the level represented by the ideal distribution curve for the minimum-load run, and the vehicle can be braked with the front and rear braking forces being suitably controlled.

When the vehicle is in the full-load run with the load-sensing switch 90 placed in the ON position, on the other hand, the master cylinder pressure is reduced by the first check valve 72 so that the reduced master cylinder pressure is applied to the front wheel brake cylinder 20, while the master cylinder pressure is applied to the rear wheel brake cylinder 30 through the P valve 34. In this case, the front-rear force distribution point is first moved from the zero point to point "b" in the direction parallel to the vertical axis along which the rear wheel braking force is taken in the graph FIG. 16. That is, only the rear wheel braking pressure or force is increased while the front wheel braking pressure or force is kept at zero, until the master cylinder pressure is raised to create the preset opening pressure difference of the first check valve 72.

Figure 16:
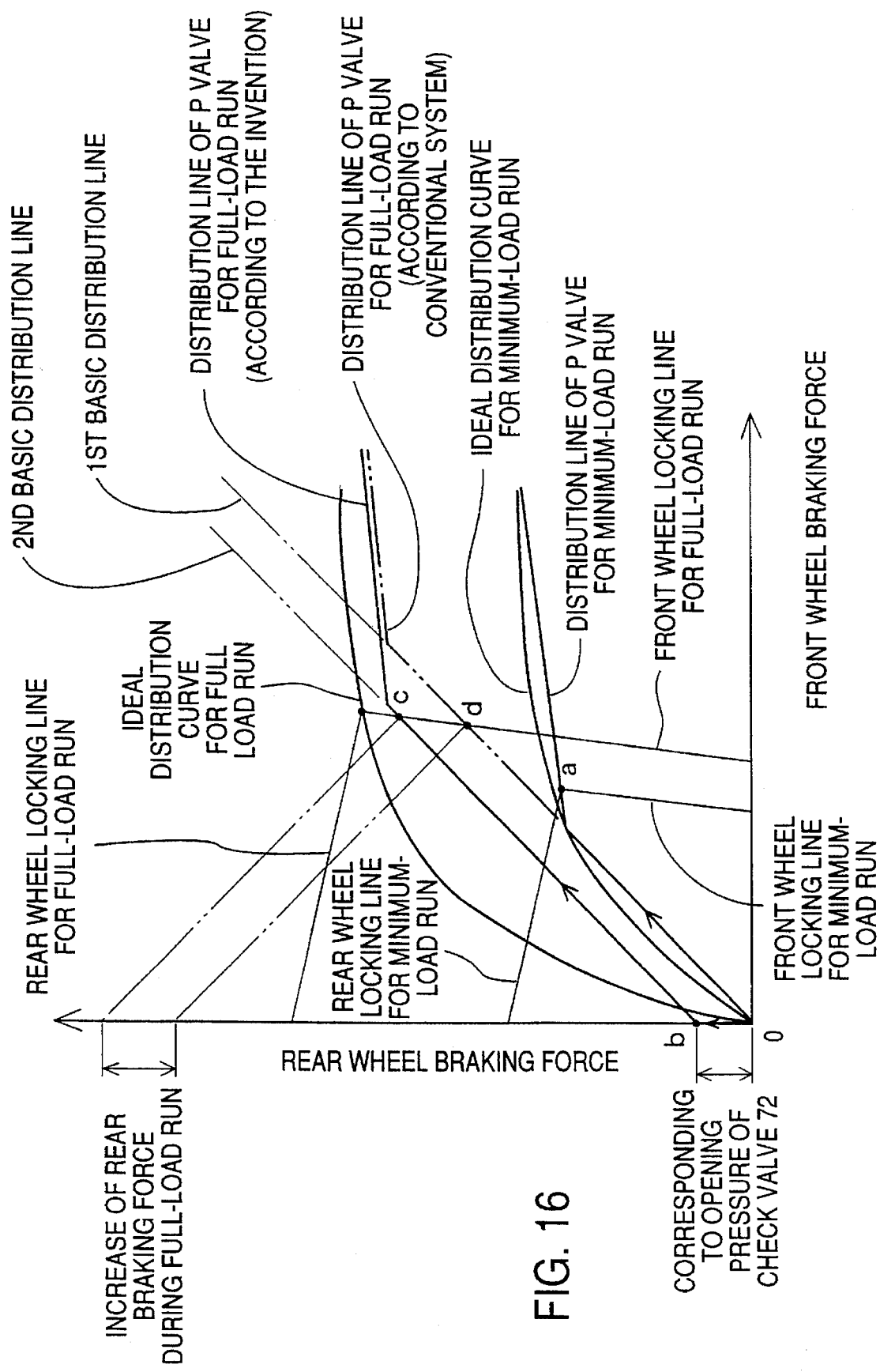
FIG. 16 is a graph explaining a relationship between braking forces of front and rear wheels as controlled in the braking system of FIG. 12.

When the master cylinder pressure has been raised to create the preset opening pressure difference of the first check valve 72, the front wheel braking pressure begins rise and the force distribution point is moved from the point "b" along a second basic distribution line (determined by the basic braking arrangement without the P valve 34 but with the check valve device 70) and a distribution line of the P valve 34 for the full-load run, as also indicated in FIG. 16. If the vehicle operator depresses the brake pedal 14 to a position corresponding to the front wheel braking pressure that is slightly lower than the level at which the front wheels begins to be locked on the road surface, the force distribution point is moved to a point of intersection between the second basic distribution line or the distribution line of the P valve 34 for the full-load run and a front wheel locking line for the full-load run (also indicated in FIG. 16). In the present specific example, the point of intersection is indicated at "c".

As described above, the present braking system is adapted such that the distribution of the front and rear wheel braking forces during the minimum-load run is controlled according to a combination of the first basic distribution line and the distribution line of the P valve 34 for the minimum-load run, while the distribution during the full-load run is controlled according to a combination of the second basic distribution line and the distribution line of the P valve 34 for the full-load run. Accordingly, the present braking system is effective to reduce the amount of deviation of the actual rear wheel braking force with respect to the ideal distribution curve during the full-load run, as compared with the conventional braking system in which the distribution line of the P valve for the full-load run is located below the corresponding distribution line of the P valve 34 according to the present invention. Consequently, the braking system according to the present embodiment is capable of producing an increased sum of the front and rear wheel braking forces (i.e., increased total braking force), which makes it possible to reduce the required braking distance of the vehicle.

In the present embodiment, the distribution line of the P valve 34 for the minimum-load run corresponds to a first distribution pattern of the front and rear wheel braking forces during the minimum-load run of the vehicle, while the distribution line of the P valve 34 for the full-load run according to the invention corresponds to a second distribution pattern of the front and rear wheel braking forces during the full-load run of the vehicle. It will be understood from the graph of FIG. 16 that the second distribution pattern defines the rear wheel braking force larger than that defined by the first distribution pattern, over the entire ranges of the front and rear wheel braking forces.

It is also noted that the rear wheel braking force defined by the second distribution pattern is larger than that defined by the first distribution pattern, by the same amount corresponding to the opening pressure difference of the first check valve 72, over the entire range between zero and the value corresponding to the threshold level of the P valve 34 during the minimum-load run. That is, the rear wheel braking force according to the second distribution pattern is raised toward the level of the ideal distribution curve (for the full-load run), with respect to that according to the first distribution pattern line, even when the rear wheel braking force is near zero. Theoretically, therefore, there is a front-rear distribution area in which the rear wheels may be locked on the road surface before the front wheels. However, the friction coefficient of the road surface on which the vehicle actually runs does not vary over the entire range between 0 and 1. In practice, the road surface may not have a friction coefficient extremely close to 0, for example, within a range of 1–0.05 which corresponds to the theoretical distribution area in which the prior locking of the rear wheels may occur. Therefore, the prior locking of the rear wheels will not actually occur if the opening pressure difference of the first check valve 72 (which determines the difference of the rear wheel braking force according to the second distribution pattern from that according to the first distribution pattern) is determined so that the rear wheel braking force according to the second distribution pattern does not exceed that according to the ideal distribution curve for the full-load run.

In the present embodiment, the opening pressure difference of the opening pressure of the first check valve 72 is preset at a value not larger than a value corresponding to the amount of increase of the rear wheel braking force according to the second distribution pattern with respect to that according to the first distribution pattern, when the second distribution pattern passes a point of simultaneous locking of the front and rear wheels on the road surface which has the practically lowest friction of coefficient value.

Upon releasing of the brake pedal 14, the brake fluid in the front wheel brake cylinder 20 is returned to the master cylinder 10 through the second check valve 74, while the brake fluid in the rear wheel brake cylinder 30 is returned to the master cylinder through the P valve 34. Thus, the brake fluid can be discharged from the front wheel brake cylinder 20 toward the master cylinder 10, irrespective of the currently selected position of the shut-off valve 80, when the brake pedal 14 is released.

It will be understood from the foregoing description of the present embodiment that the lever 64, load-sensing switch 90, shut-off valve 80 and controller 84 cooperate with each other to constitute one example of selective disabling means for selectively disabling the check valve device 70, more particularly, the first check valve 72. This selective disabling means cooperates with the check valve device 70 and the P valve 34 to constitute an example of a distribution control device for controlling the distribution of the braking forces to be applied to the front and rear wheels, according to a selected one of the first and second distribution patterns indicated above.

Referring next to FIGS. 17–22, there will be described a second embodiment of the present invention in the form of an anti-lock braking system of the X-cross type, which has various features.

Like the braking system according to the first embodiment, the braking system according to the present second embodiment is of the diagonal or X-crossing type. However, the present braking system is different from the braking system of the first embodiment, in that the present braking system is capable of effecting an anti-lock control of the braking pressures or forces of the front and rear wheels, and is adapted to use not only the master cylinder but also the fluid recirculating pump as the hydraulic pressure source. These aspects of the present embodiment will be described in detail.

Figure 17:
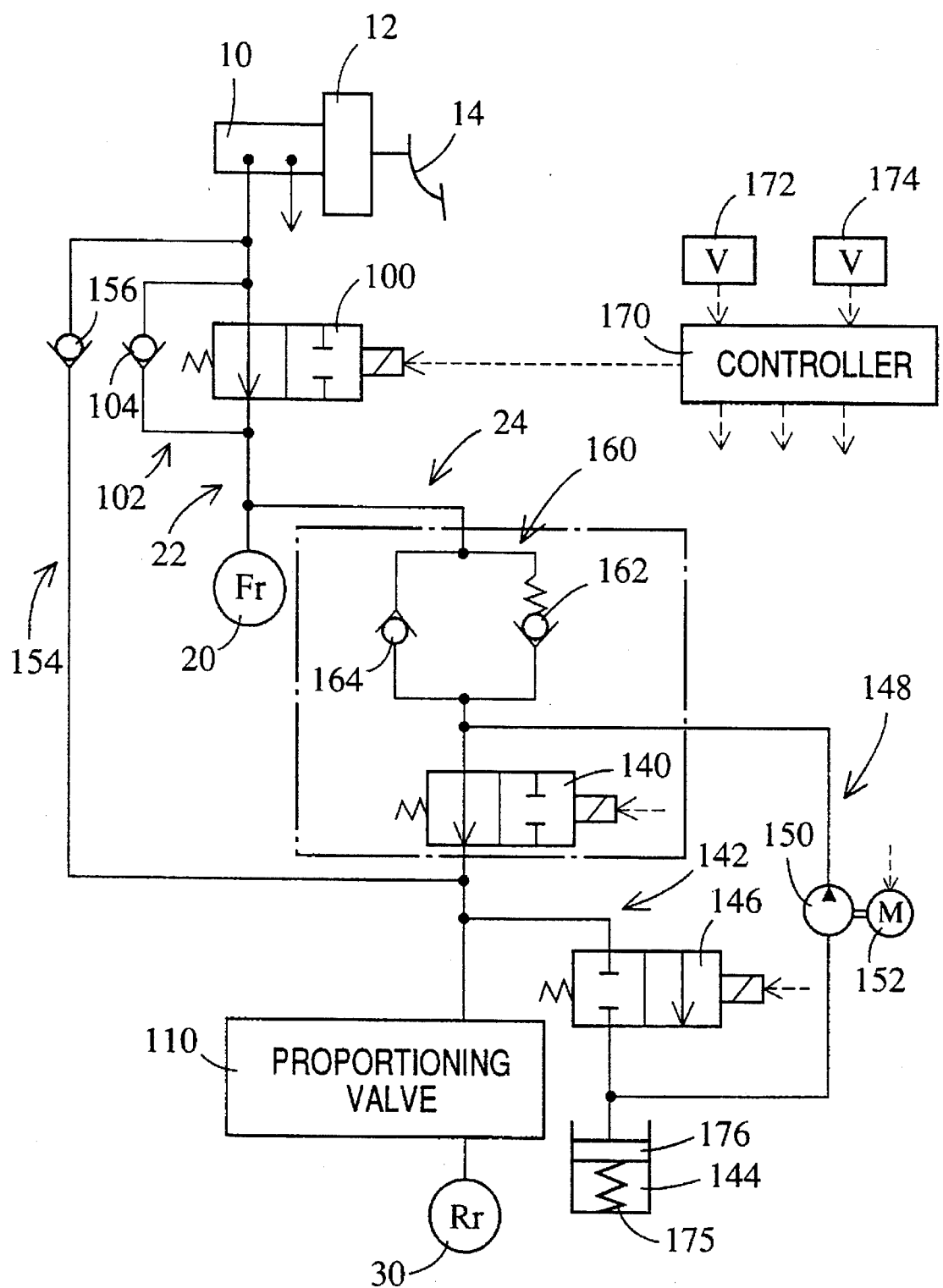
FIG. 17 is a schematic view of an anti-lock braking system according to another embodiment of this invention.

As shown in FIG. 17, a normally-open first solenoid-operated shut-off valve 100 is disposed in a portion of the front brake cylinder passage 22 between the master cylinder 10 and the point of connection of the front and rear brake cylinder passages 22, 24. Further, a by-pass return passage 102 is provided in parallel with the first shut-off valve 100, so as to by-pass the shut-off valve 100. The by-pass return passage 102 is provided with a check valve 104, which inhibits a flow of the brake fluid in a direction from the master cylinder 10 toward the front wheel brake cylinder 20, and permits a flow of the brake fluid in the reverse direction with the valve opening pressure difference being substantially zero.

A proportioning valve or P valve 110 is provided in the rear brake cylinder passage 24. Unlike the P valve 34 used in the first embodiment, the P valve 110 is not of a load-sensing type having a variable threshold pressure for initiation of the reducing function, but of a fixed threshold type wherein the pressure reducing function is initiated at a predetermined threshold level of the master cylinder pressure. The P valve 110 will be described in detail The P valve 110 has a housing 112, which has a stepped cylinder bore 118 with a large-diameter portion 114 and a small-diameter portion 116. A stepped valve piston 124 having a large-diameter portion 120 and a small-diameter portion 122 is slidable received in the stepped cylinder bore 118. The valve piston 124 is biased by biasing means in the form of a spring 126 so that the piston 124 is normally held in a non-operated position in which the end face of the large-diameter portion 120 abuts on the bottom wall of the small-diameter portion 116 of the housing 112. Between the cylinder bore 118 and the valve piston 124, there is disposed a sealing member in the form of a cup seal 128. This cup seal 128 divides the space within the cylinder bore 118 into two sections. One of these two sections, which is on the side of the large-diameter portion 114, serves as an input chamber 130, while the other section on the side of the small-diameter portion 116 serves as an output chamber 132. The input chamber 130 is connected to the master cylinder 10, while the output chamber 132 is connected to the rear wheel brake cylinder 30.

The cup seal 128 consists of a one-way sealing portion 134 and a two-way sealing portion 136. The one-way sealing portion 134 inhibits a flow of the brake fluid in the direction from the input chamber 130 toward the output chamber 132. The one-way sealing portion 134 is in fluid-tight contact with the circumferential surface of the large-diameter portion 114 of the cylinder bore 118. The one-way sealing portion 134 permits a flow of the fluid in the direction from the output chamber 132 toward the input chamber 130 while the sealing portion 134 is spaced apart from the surface of the large-diameter portion 114. When the valve piston 124 is moved from the non-operated position of FIG. 18 to an operated position (in the right direction as seen in the figure), the shoulder surface between the large-diameter and small-diameter portions 120, 122 of the piston 124 is brought into abutting contact with the two-way sealing portion 136, thereby inhibiting flows of the fluid in the opposite directions between the input and output chambers 130, 132. When the valve piston 124 is placed in the non-operated position of FIG. 18, the two-way sealing portion 136 is unseated off the shoulder surface of the piston 124. This permits the fluid to flow between the input and output chambers 130, 132.

Figure 18:
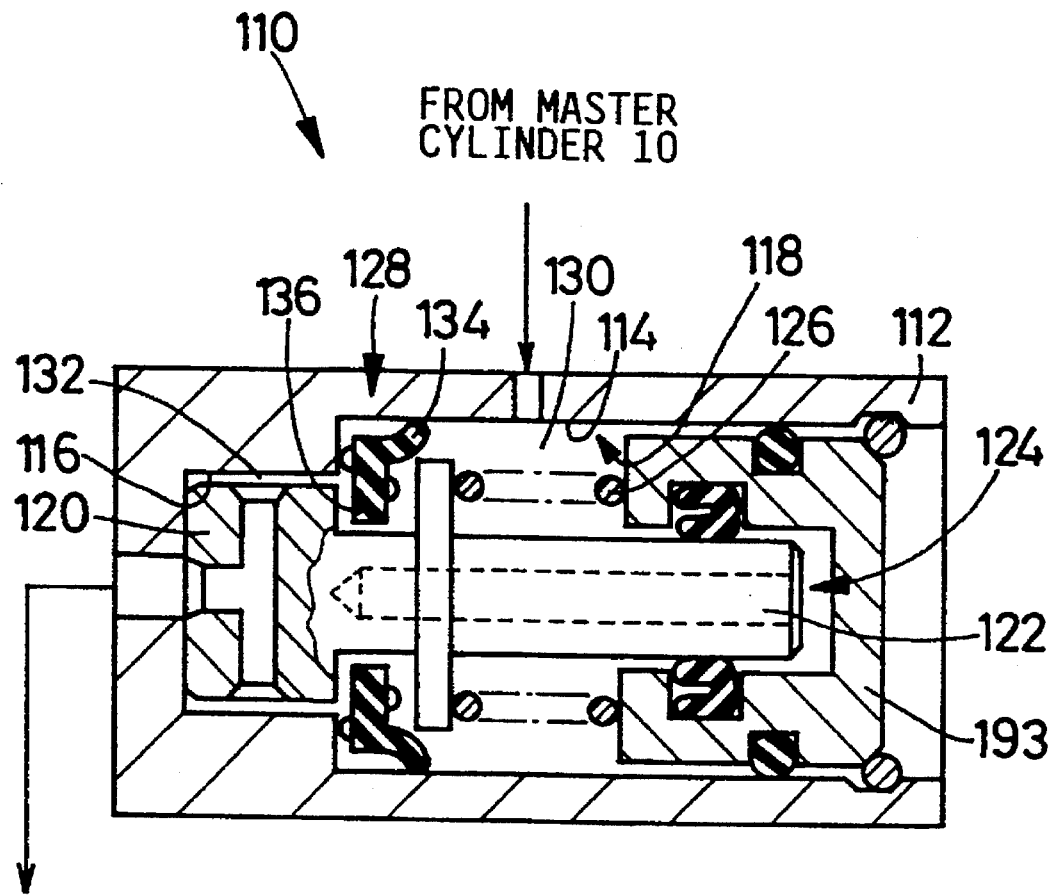
FIG. 18 is a front elevational view in cross section of a proportioning valve provided in the braking system of FIG. 17.

The cup seal 128 has an annular protrusion formed on each of the opposite surfaces which define the input and output chambers 130, 132. The annular protrusions have a semi-circular cross sectional shape as seen in FIG. 18. The annular protrusion on the side of the input chamber 130 prevents the cup seal 128 from contacting the valve piston 124 at the entire area of the surface on the side of the input chamber 130, while the annular protrusion on the side of the output chamber 132 prevents the cup seal 128 from contacting the shoulder surface between the large-diameter and small-diameter portions 120, 122 of the cylinder bore 118, at the entire area of the surface on the side of the output chamber 132.

As shown in FIG. 17, a normally-open second solenoid-operated shut-off valve 140 is disposed in a portion of the rear brake cylinder passage 24 between the P valve 110 and the point of connection of the front and rear brake cylinder passages 22, 24. A reservoir passage 142 is connected at one end thereof to a portion of the rear brake cylinder passage 24 between the P valve 110 and the second shut-off valve 140, and at the other end to a reservoir 144. A normally-closed third solenoid-operated shut-off valve 146 is provided in the reservoir passage 142. In the present second embodiment, the first shut-off valve 100 is an example of a master cylinder cut-off valve, the second shut-off valve 140 is an example of an intermediate valve, and the third shut-off valve 146 is an example of a pressure reducing valve.

A pump passage 148 is connected at one end thereof to the reservoir 144 and at the other end to the rear brake cylinder passage 24. A pump 150, which is provided in the pump passage 148, creates pressure and vacuum for the brake fluid in the reservoir 144. The pump 150 is a plunger-type driven by a motor 152 to deliver the pressurized fluid in an intermittent manner. The output, or delivery, end (the other end indicated above) of the reservoir passage 148 is connected to a portion of the rear brake cylinder passage 24 on the upstream side of the second shut-off valve 140, namely, on the side of the master cylinder 10.

A return passage 154 is connected at one end thereof to a portion of the rear brake cylinder passage 24 between the P valve 110 and the second shut-off valve 140, and at the other end to a portion of the front brake cylinder passage 22 between the master cylinder 10 and the first shut-off valve 100. A check valve 156 is provided in the return passage 154. This check valve 156 inhibits flow of the brake fluid in a direction from the master cylinder 10 toward the rear wheel brake cylinder 30 and permits flow of the fluid in the reverse direction with the valve opening pressure difference being substantially zero.

A check valve device 160 is disposed in a portion of the rear brake cylinder passage 24 between the point of connection of the rear brake cylinder passage 24 and the pump passage 148 and the point of connection of the front and rear brake cylinder passages 22, 24. Like the check valve device 70 provided in the first embodiment, the check valve device 160 includes a first check valve 162 whose opening pressure difference is not substantially zero, and a second check valve 164 whose opening pressure difference is substantially zero. The first and second check valves 162, 164 are disposed in parallel with each other and have opposite directions in which the brake fluid is permitted to flow.

However, the check valve device 160 is different from the check valve device 70 in the location and the orientation of the first and second check valves. In the first embodiment, the master cylinder 10 always serves as the hydraulic pressure source for the front and rear wheel brake cylinders 20, 30, and therefore the check valve device 70 is interposed between the master cylinder 10 and the front wheel brake cylinder 20. In the present second embodiment, on the other hand, the pump 150 serves as the hydraulic pressure source when the wheel braking pressures are controlled in the anti-lock manner, and therefore the first check valve 162 is oriented to allow the first or pressure reducing check valve 162 to serve as a check valve which permits a flow of the brake fluid in the direction from the pump 150 toward the front wheel brake cylinder 20 after the pressure of the brake fluid delivered from the pump 150 becomes higher than the pressure in the front wheel brake cylinder 20 by more than a predetermined or preset opening pressure difference of the check valve 162. The principle of operation of the pump 150 as the hydraulic pressure source will be described below in detail.

Figure 19:
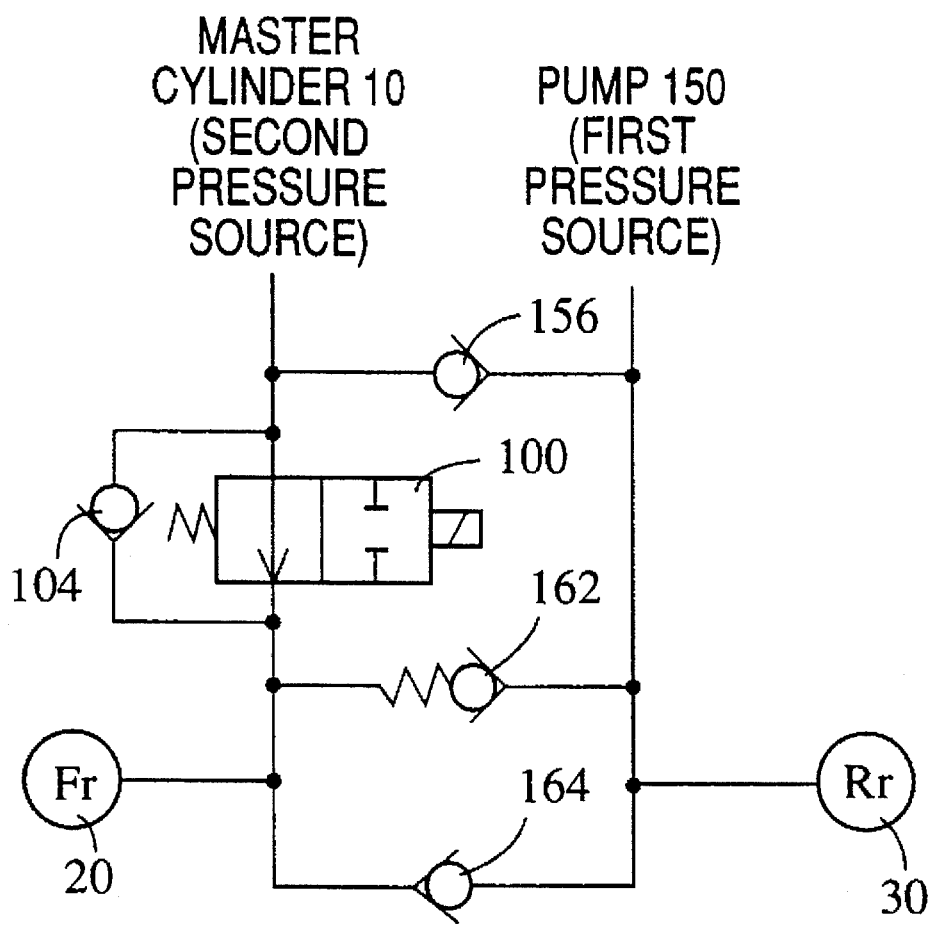
FIG. 19 is a hydraulic circuit diagram schematically showing flows of a brake fluid to and from a master cylinder, a pump and front and rear wheel brake cylinders in the braking system of FIG. 17.

FIG. 19 illustrates the flow of the brake fluid to and from the master cylinder 10, pump 150 and front and rear wheel brake cylinders 20, 30. It should be noted that FIG. 19 schematically shows a major portion of the brake fluid circuit, but ignores the provisions for both the P valve 110 and the normally-open second shut-off valve 140.

During a normal operation of the present braking system without an operation of the pump 150, the brake fluid pressurized by the master cylinder 10 is supplied to the front wheel brake cylinder 20 through the first shut-off valve 100, and to the rear wheel brake cylinder 30 through both the first shut-off valve 100 and the second check valve 164 of the check valve device 160. Since the opening pressure difference of the second check valve 166 is substantially zero, almost the same braking pressures are applied to the front and rear wheel brake cylinders 20, 30.

When the pump 150 is operated, on the other hand, the first shut-off valve 100 is closed, and the brake fluid delivered from the pump 150 is supplied to the front wheel brake cylinder 220 through the first check valve 162, and supplied to the rear wheel brake cylinder 30 without flowing through the first check valve 162. Since the opening pressure difference of the first check valve 162 is not substantially zero, the braking pressure in the front wheel brake cylinder 20 is made lower than that in the rear wheel brake cylinder 30 by an amount corresponding to the preset opening pressure difference of the first check valve 162.

The constructions of the first and second check valves 162, 164 will be described below in detail.

The solenoids of the first, second and third solenoid-operated shut-off valves 100, 140 and 146 are connected to a controller 170, which principally consist of a computer, A/D converters, and drivers. The computer includes a central processing unit (CPU), read-only memory (ROM), random-access memory (RAM) and a bus. The controller 170 selectively opens and closes the shut-off valves 100, 140, 146 as needed, depending upon the output signals of wheel speed sensors 172, 174, which represent the rotating speeds of the front and rear wheels.

The motor 152 for driving the pump 150 is also controlled by the controller 170. In principle, the motor 152 and the pump 150 are turned off when the entire volume of the brake fluid in the reservoir 144 has been pumped up by the pump 150. While the motor 152 may be operated as long as the wheel braking pressures are controlled in the anti-lock manner, the pump 150 is stopped upon evacuation of the reservoir 144 to minimize operating noise.

The evacuation of the reservoir 144 may be detected directly by a position sensor (e.g., proximity switch) adapted to detect the axial position of a piston 176 of the reservoir 144, or indirectly by a load sensor adapted to detect a load acting on the motor 152 on the basis of an electric current applied to the motor 152, or by a timer adapted to measure the time of continuous operation of the motor 152. Where evacuation is indirectly detected, the motor 152 is turned off when the detected load is lowered below a predetermined threshold value or when the measured operation time exceeds a predetermined limit.

The controller 170 may be adapted to turn off the motor 152 and stop the pump 150 when it is required to discharge the brake fluid from both of the front and rear wheel brake cylinders 20, 30 for rapidly lowering the braking pressures during an anti-lock control of the braking pressures. In this respect, it is noted that an operation of the pump 150 to deliver the pressurized fluid to the rear brake cylinder passage 24 prevents reduction in the braking pressures in both of the front and rear wheel brake cylinders 20, 30.

Further, the controller 170 may be adapted to stop the pump 150 when it is required to increase the braking pressures in the front and rear wheel brake cylinders 20, 30 by only a small amount. Since the pump 150 of the plunger type delivers the brake fluid intermittently at a certain cycle time, it is difficult to increase the braking pressures by an amount which is smaller than the amount of increase of the braking pressures by one delivery of the fluid from the pump 150. Therefore, when only a small amount of increase of the braking pressures is required, the pump 150 is stopped, and the first shut-off valve 100 is opened for a short length of time to permit the master cylinder pressure to be applied to the front and rear wheel brake cylinders 20, 30, thereby raising the braking pressures by the desired small amount.

There will next be described in detail operation of the controller 170 to control the shut-off valves 100, 140 and 146.

During braking of the vehicle, the controller 100 monitors the rotating conditions (e.g., deceleration values, slip amounts, and slip ratios) of the vehicle's individual wheels by receiving the output signals of the wheel speed sensors 172, 174, and determines whether any wheels have a locking tendency. The controller 170 controls the shut-off valves 100, 140, 146 in a selected one of seven pressure control modes as indicated in TABLE 1 below, to control the wheel brake cylinders 20, 30. These seven pressure control modes are established by respective different combinations of the open and closed states of the three shut-off valves 100, 140, 146.

TABLE 1

| Mode | States of Shut Off Valves | | | Pressure Control States of Front and Rear Brake Cylinders | |
|---|---|---|---|---|---|
| | 1 | 2 | 3 | Front | Rear |
| 1 | O | O | C | M/C Increase | M/C Increase |
| 2 | O | C | C | M/C Increase | Hold |
| 3 | O | C | O | M/C Increase | Reduction |
| 4 | C | O | C | Pump Increase | Pump Increase |
| 5 | C | C | C | Pump Increase | Hold |
| 6 | C | C | O | Pump Increase | Reduction |
| 7 | C | O | O | Reduction | Reduction |

To effect the anti-lock control of the wheel braking pressures, the controller 170 performs the following steps: (a) determining whether any one of the front and rear wheels of the two pressure application sub-systems has a locking tendency, and if it is determined that any wheel has a locking tendency, determining on the basis of the rotating condition of that wheel a pressure control command (selected from among a pressure reducing command, a pressure holding command and a pressure increasing command) which should be generated to control the braking pressure in the brake cylinder of the wheel in question; (b) then selecting one of the seven pressure control modes depending upon the determined pressure control command (pressure reducing, holding or increasing command) and depending upon whether the wheel having the locking tendency is a front or rear wheel; and (c) then controlling the pressure in the brake cylinder of the wheel in question in the selected pressure control mode. To this end, the ROM of the controller 170 stores routines for determining the pressure control commands for the individual wheels on the basis of the rotating conditions of the wheels, and routines for controlling (turning on or off) the solenoids of the respective shut-off valves 100, 140, 146 according to the determined pressure control commands.

The anti-lock pressure control operation of the present braking system will be described in detail, assuming that the front wheel associated with one of the two pressure application sub-systems has a locking tendency without a locking tendency of the rear wheel.

In this case, the pressure in the front wheel brake cylinder 20 should first be reduced. However, as is apparent from TABLE 1, the seven pressure control modes available do not include a mode for reducing only the pressure in the front wheel brake cylinder 20. Therefore, the seventh pressure control mode is selected to reduce the pressures in both of the front and rear wheel brake cylinders 20, 30.

In the seventh pressure control mode, the solenoid of the first shut-off valve 100 is turned ON to close shut-off valve 100. This disconnects the front and rear wheel brake cylinders 20, 30 from the master cylinder 10. Further, the solenoid of the third shut-off valve 146 is turned ON to open this valve 146. This reduces the pressures in the front and rear wheel brake cylinders 20, 30. Described more specifically, the front wheel brake cylinder 20 is brought into communication with the reservoir 144 through the second check valve 164, normally-open second shut-off valve 140, and now opened third shut-off valve 146, whereby the brake fluid is permitted to flow from the front wheel brake cylinder 20 to the reservoir 144. At the same time, the rear wheel brake cylinder 30 is communicated with the reservoir 144 through the P valve 110 and the opened third shut-off valve 146, and the brake fluid is permitted to flow from the rear wheel brake cylinder 30 to the reservoir 144. Thus, the braking pressures in both of the front and rear wheel brake cylinders 20, 30 are reduced in the seventh pressure control mode.

The seventh pressure control mode of operation is terminated when the locking tendency of the front wheel is eliminated or considerably reduced as a result of the reduction in the wheel brake cylinders 20, 30. Then, the pressure in the front and rear wheel brake cylinders 20, 30 are controlled in a selected one of the fourth, fifth, sixth and seventh pressure control modes, depending upon the locking tendencies of the front and rear wheels.

In the fourth pressure control mode, the first and third shut-off valves 100, 146 are both closed, while the second shut-off valve 140 is opened, so that the fluid delivered from the pump 150 is returned to the front wheel brake cylinder 20 through the first check valve 162, and to the rear wheel brake cylinder 30 through the opened second shut-off valve 140 and the P valve 110, whereby the pressures in the front and rear wheel brake cylinders 20, 30 are both increased. In this fourth pressure control mode, the pressure of the fluid delivered from the pump 150 is reduced by the first check valve 162 by the preset opening pressure difference of the check valve 162. Therefore, the braking pressure in the front wheel brake cylinder 20 is lower than the braking pressure in the rear wheel brake cylinder 30, by the opening pressure difference of the first check valve 162, when the braking pressures are increased.

In the fifth pressure control mode, the three shut-off valves 100, 140, 146 are all closed, and the pressure in the front wheel brake cylinder 20 is increased by operation of the pump 150 as in the fourth mode, while the pressure in the rear wheel brake cylinder 30 is held constant.

Figure 20:
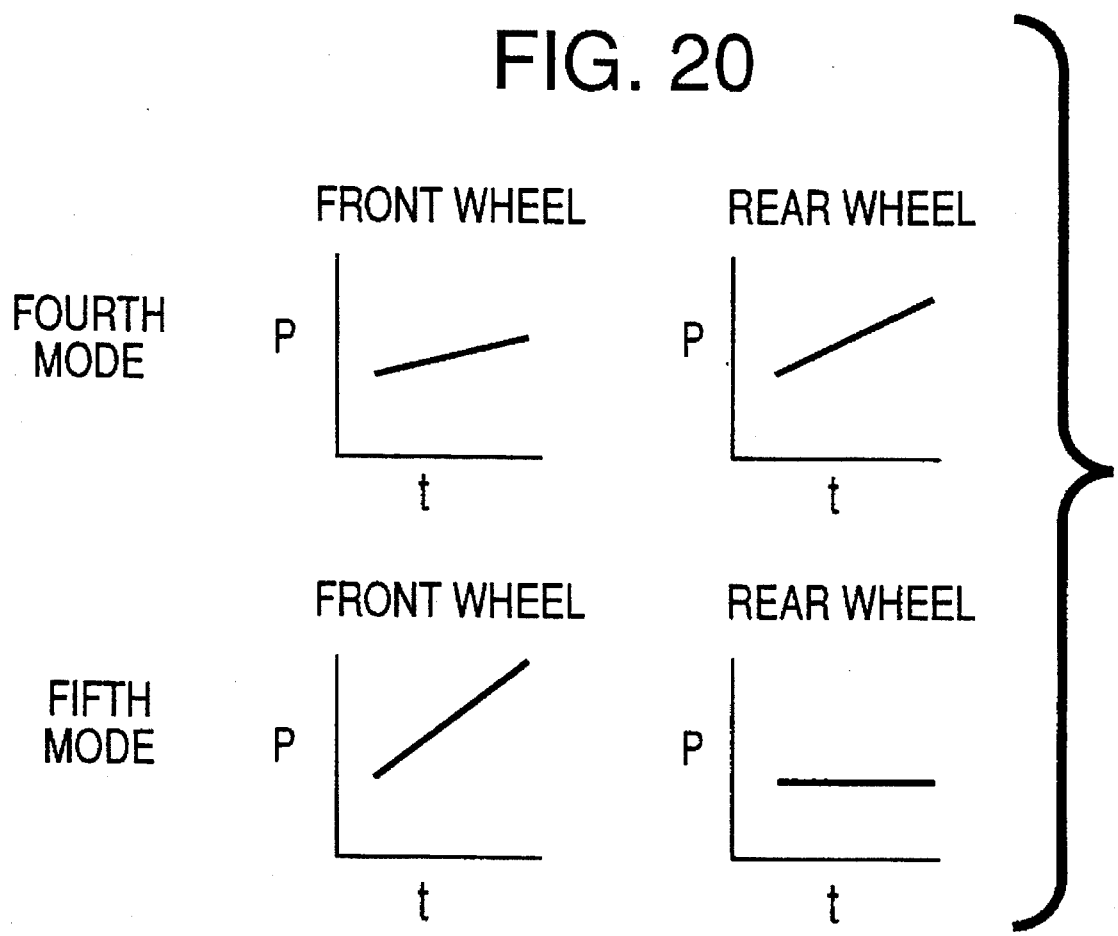
FIG. 20 is a graph illustrates the changes in the front and rear wheel brake cylinder pressures as controlled differently in an anti-lock fashion in fourth and fifth modes of operation of the braking system of FIG. 17.

In the fifth pressure control mode, the brake fluid delivered from the pump 150 is not returned to the rear wheel brake cylinder 30, but is returned only to the front wheel brake cylinder 20. In the fourth mode, on the other hand, the brake fluid from the pump 150 is also returned to the rear wheel brake cylinder 30. Accordingly, the rate of increase in the pressure in the front wheel brake cylinder 20 is higher in the fifth mode than in the fourth mode, as indicated in FIG. 20. As also shown in this figure, the pressure in the rear wheel brake cylinder 30 is increased in the fourth mode while the pressure in the same cylinder is held constant in the fifth mode.

In the sixth pressure control mode, the first and second shut-off valves 100, 140 are both closed while the third shut-off valve 146 is opened, whereby the pressure in the front wheel brake cylinder 20 is increased as in the fourth mode, while the pressure in the rear wheel brake cylinder 30 is reduced.

According to these principles the first, second, and third pressure control modes are not used for the anti-lock control of the braking pressure of the front wheel brake cylinder 20. In these three modes, the first shut-off valve 100 is opened. During the anti-lock pressure control, it is desirable to disconnect the front and rear wheel brake cylinders 20, 30 from the master cylinder, in order to reduce the delivery pressure of the pump 150 and minimize the pressure pulsation of the fluid delivered from the pump 150. However, if it becomes necessary to increase the rear wheel brake cylinder 20, 30 after the reservoir 144 is entirely evacuated with the entire volume of the fluid pumped up by the pump 150, an appropriate one of the first, second and third pressure control modes is established to increase the pressure in the wheel brake cylinder in question with the pressure generated by the master cylinder 10.

When the pressure in the front wheel brake cylinder 20 is increased by operation of the pump 150 in the fourth or fifth pressure control mode, the check valve 104 functions as a pressure relief valve to prevent the front wheel braking pressure from exceeding the master cylinder pressure.

The braking system operates with front wheel locking tendency without rear wheel locking tendency. As will be described below, the braking system also operates with a locking tendency of the rear wheel without a locking tendency of the front wheel.

In this case, it is necessary to first reduce the pressure in the rear wheel brake cylinder 30. To this end, the braking system is first placed in the third pressure control mode wherein the first and third shut-off valve 100, 146 are opened while the second shut-off valve 140 is closed, whereby substantially no anti-lock pressure control is effected with respect to the pressure in the front wheel brake cylinder 20. That is, the pressure in the front wheel brake cylinder 20 is increased by the pressure generated by the master cylinder 10, while the pressure in the rear wheel brake cylinder 30 is reduced through the opened third shut-off valve 146.

Subsequently, the first through seventh pressure control modes are selectively established by the controller 170 as needed. While the front wheel does not have a locking tendency, the first, second and third pressure control modes are selectively established, and only the pressure in the rear wheel brake cylinder is controlled in the anti-lock manner. If the front wheel as well as the rear wheel has a locking tendency, or if only the front wheel has a locking tendency with the locking tendency of the rear wheel being eliminated, the front and rear wheel braking pressures or the front wheel braking pressure is/are controlled in the anti-lock manner as in the case where the front wheel has a locking tendency without a locking tendency of the rear wheel.

The rear wheel has a locking tendency without a locking tendency of the front wheel if the front wheel lies on an area of an uneven friction-coefficient road surface which area has a relatively high friction coefficient, while the rear wheel lies on an area of the road surface having a relatively low friction coefficient. In this case, it is preferable to maximize the front wheel braking pressure while preventing the locking of the front wheel, so that the relatively high friction coefficient of the road surface area is utilized by the front wheel to reduce the braking distance of the vehicle. On the other hand, it is preferable to maximize the cornering force acting on the rear wheel, for improving the steering or directional stability of the vehicle. In other words, it is desired that the braking system be capable of increasing the front wheel braking pressure without increasing the rear wheel braking pressure, or capable of reducing the rear wheel braking pressure without increasing the front wheel braking pressure. In the present second embodiment, the fifth or sixth pressure control mode is established to increase the front wheel braking pressure without an increase in the rear wheel braking pressure, and the sixth pressure control mode is established to reduce the rear wheel braking pressure without a decrease in the front wheel braking pressure. Thus, the present embodiment assures not only reduction in the required braking distance of the vehicle but also an improvement of the steering stability of the vehicle in the case of braking of the vehicle while the front wheel is on the high friction-coefficient area of an uneven friction-coefficient road surface while the rear wheel is on the low friction-coefficient area.

An advantageous effect of the anti-lock braking system according to the second embodiment will be described by reference to the graph of FIG. 21.

In a normal braking of the vehicle initiated by depression of the brake pedal 14 by the vehicle driver, the master cylinder 10 rather than the pump 150 functions as the pressure source, and the master cylinder pressure is applied to the front wheel brake cylinder 20, irrespective of the existence of the check valve device 160. Accordingly, the front-rear force distribution point is moved from the zero point of the coordinate system of the graph of FIG. 21, along a first basic distribution line and along a distribution line of the P valve 110 for the minimum-load run of the vehicle.

Figure 21:
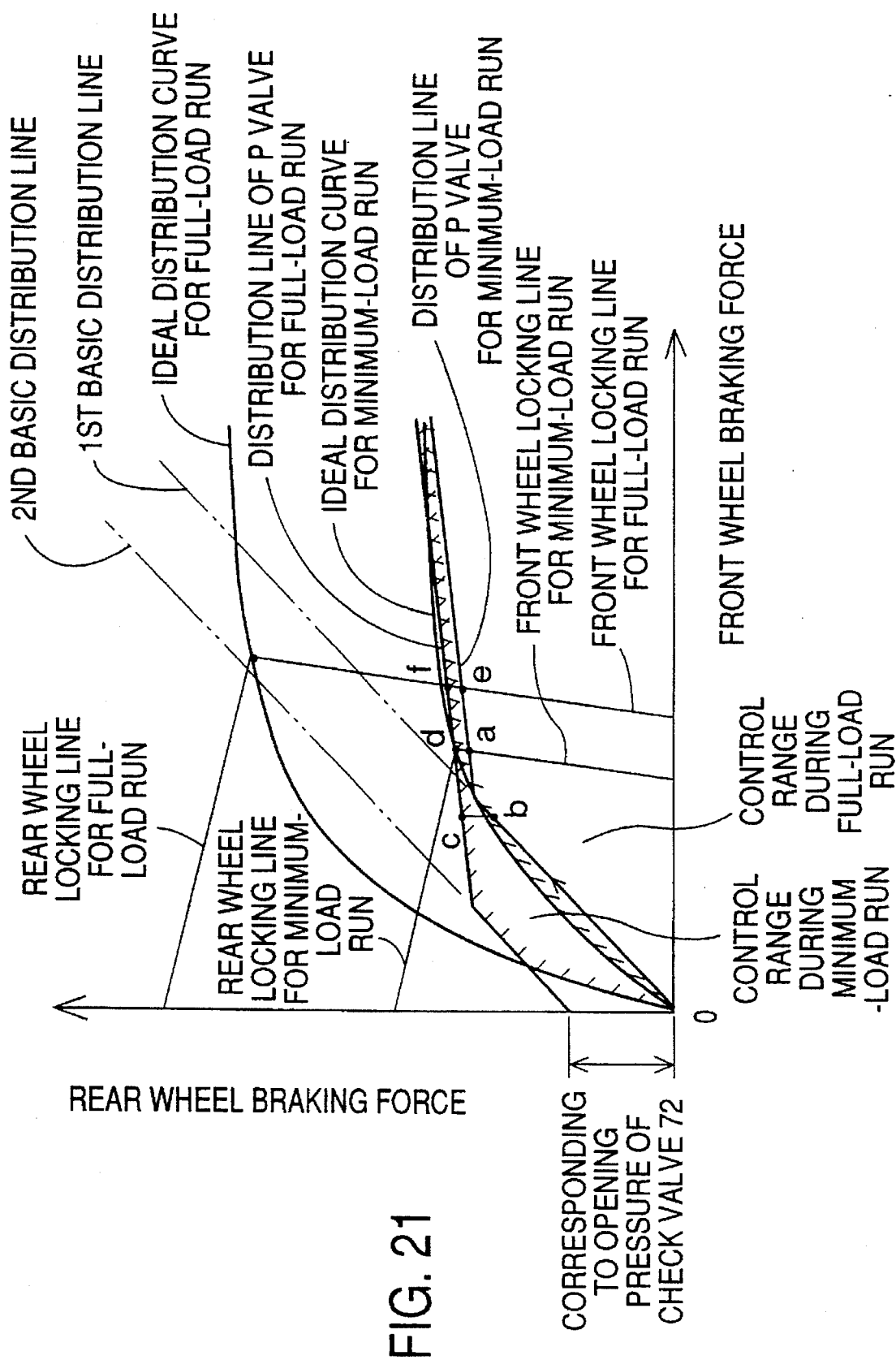
FIG. 21 is a graph of a relationship between the braking forces of the front and rear wheels as controlled in the braking system of FIG. 17.

If the vehicle is in the minimum-load run (one form of a vehicle run with a relatively small load), the force distribution point reaches a point "a" as indicated in FIG. 21, when the depression force acting on the brake pedal 14 has been increased to increase the front wheel braking pressure to a level slightly lower than a level at which the front wheel begins to be locked on the road surface. When the anti-lock control of the front wheel braking pressure is started due to an excessive degree of locking of the front wheel as a result of a further increase in the depression force of the brake pedal 14, both the front wheel braking pressure and the rear wheel braking pressure are reduced in the seventh pressure control mode. Consequently, the force distribution point is moved from the point "a" in the left direction, as indicated in the graph of FIG. 21, to a point which lies on the first basic distribution line or the distribution line of the P valve 110 for the minimum-load run. In this specific example, the force distribution point is moved to point "b". The above explanation is based on an assumption that the brake pedal 14 is held depressed and the master cylinder pressure is continuously increased even after the first reduction of the front and rear wheel braking pressures is started, namely, an assumption that the delivery pressure of the pump 150 is increased from the level at the time of start of the first reduction of the wheel braking pressures.

If the fourth pressure control mode of operation is initiated to increase the front and rear wheel braking pressures as a result of elimination of the locking tendency of the front wheel, the brake fluid delivered from the pump 150 is supplied to the front wheel brake cylinder 20, with the pressure reduction corresponding to the opening pressure difference of the first check valve 162. However, the brake fluid delivered from the pump 150 is supplied to the rear wheel brake cylinder 30, without the pressure reduction. It is noted that some volume of brake fluid has been stored in the reservoir 144 by the time the locking tendency of the front wheel has been eliminated when (i.e., the fourth pressure control mode of operation is initiated). After the delivery of the brake fluid from the pump 150 is started, the front wheel braking pressure and force are held constant and only the rear wheel braking pressure and force are increased, until the first check valve 162 is opened. Accordingly, the force distribution point is moved from the point "b" in the positive direction along the vertical axis of the graph of FIG. 21 (along which the rear wheel braking force is taken), to a point which lies on a second basic distribution line or a distribution line of the P valve 110 for the full-load run. In this specific example, the pressure distribution point is moved to point "c". Subsequently, the force distribution point is moved from point "c", along the distribution line of the P valve 110 for the full-load run, in the direction of increasing the rear wheel braking force, and eventually reaches point "d" of intersection between a rear wheel locking line for the minimum-load run and the distribution line of the P valve 110 for the full-load run. Then, the rear wheel braking pressure is controlled in the anti-lock manner so as to eliminate the locking tendency of the rear wheel.

If the vehicle is in the full-load run (one form of a vehicle run with a relatively large load), the front-rear force distribution point is moved to point "e" as indicated in FIG. 21, when the depression force acting on the brake pedal 14 is increased to increase the front wheel braking force to a level slightly lower than the wheel locking level. A further increase in the brake pedal depression force will cause initiation of control of the front wheel braking pressure in the anti-lock manner. As a result, the force distribution point is moved to point "b" as indicated above.

When the fourth pressure control mode of operation is initiated to increase the front and rear wheel braking pressures as a result of elimination of the locking tendency of the front wheel, the force distribution point is moved from point "b" in the positive direction of the vertical axis to point "c" as in the above case. With a further increase in the front and rear wheel braking pressures by operation of the pump 150, the force distribution point is further moved from point "c" along the distribution line of the P valve 110 for the full-load run, and eventually reaches point "f" of intersection between the distribution line of the P valve 110 for the full-load run and a front wheel locking line for the full-load run. Thereafter, the anti-lock control is effected to eliminate the locking tendency of the front wheel.

In the present second embodiment, the actual distribution of the front and rear wheel braking forces is controlled, during the normal pressure control operation (without the anti-lock control of the braking pressures), according to a combination of the first basic distribution line and the distribution line of the P valve 110 for the minimum-load run, irrespective of whether the vehicle is in the minimum-load run or full-load run. During the anti-lock pressure control operation with the vehicle in the minimum-load run, on the other hand, the actual distribution of the front and rear wheel braking forces is generally controlled according to the ideal distribution curve for the minimum-load run, and more precisely, according to a portion of the ideal distribution curve for the minimum-load run which is located below (in FIG. 21) the distribution line of the P valve 110 for the full-load run, and a portion of the distribution line of the P valve 110 for the full-load run which is located below the ideal distribution curve for the minimum-load run. During the anti-lock pressure control operation with the vehicle in the full-load run, the actual distribution is generally controlled according to the distribution line of the P valve for the full-load run, and more precisely, according to a portion of the ideal distribution curve for the full-load run which is located below the distribution line of the P valve for the full-load run, and a portion of the distribution line of the P valve for the full-load run which is located below the ideal distribution curve for the full-load run.

In the present second embodiment, therefore, the sum of the front and rear wheel braking forces or the total wheel braking force during the full-load vehicle run is increased with respect to that in the conventional braking system in which the anti-lock pressure control operation is effected according to the first basic distribution line even during the full-load vehicle run. Accordingly, the required braking distance of the vehicle can be reduced in the present braking system. It will also be understood from the graph of FIG. 21 that the rear wheel braking pressure or force during the full-load vehicle run can be effectively increased to thereby reduce the required vehicle braking distance, even when the ideal rear braking force is smaller than the threshold level of the P valve 110, for example, when the fully-loaded vehicle is abruptly braked on a snow-covered road surface or other road surface having a low friction coefficient.

In the present embodiment, the distribution of the front and rear wheel braking forces during the normal pressure control operation and during the anti-lock pressure control operation and the minimum-load vehicle run corresponds to the first distribution pattern, while the distribution of the front and rear wheel braking forces during the anti-lock pressure control operation and the full-load vehicle run corresponds to the second distribution pattern. The second distribution pattern defines the rear wheel braking force larger than that defined by the first distribution pattern, over the entire ranges of the front and rear wheel braking forces.

In the present second embodiment, the opening pressure difference of the first check valve 162 is larger than that of the first check valve 72 provided in the first embodiment of FIG. 12. Described more particularly, the opening pressure difference of the first check valve 162 is determined or preset so that the second basic distribution line can intersect the rear wheel locking line which is determined for the full-load vehicle run on a road surface having a low friction coefficient (about 0.3), such as a road surface covered by compressed snow. In other words, the opening pressure difference of the first check valve 162 is a relatively high value, so that the rear wheel would be locked on such low friction-coefficient road surface upon excessive depression of the brake pedal 14 during the full-load vehicle run while the rear wheel braking pressure is lower than the threshold level of the P valve 110, if the rear wheel braking pressure was not controlled in the anti-lock manner. In practice, however, early locking of the rear wheel upon excessive depression of the brake pedal under such conditions is prevented or restricted by the anti-lock pressure control operation.

Namely, the present embodiment adapts the anti-lock pressure control operation to effectively combine with rear wheel braking pressures higher than front wheel braking pressures that result from the opening pressure difference of the first check valve 162. This results in an actual front-rear force distribution pattern that is sufficiently close to the ideal distribution curve for the full-load run, even while the rear wheel braking pressure is lower than the threshold level of the P valve 110. In addition, the required vehicle braking distance can be significantly reduced during the full-load vehicle run.

Thus, the anti-lock braking system according to the second embodiment is capable of reducing the required vehicle braking distance during the full-load run, not only during braking with a relatively large braking force on a relatively high friction-coefficient road surface, but also during braking with a relatively small braking force on a relatively low friction-coefficient road surface. For effectively reducing the required braking distance during the full-load vehicle run with a relatively large braking force, it is essential that the master cylinder pressure be increased even after the initiation of the anti-lock pressure control, so that the maximum amount of increase in the front and rear wheel braking pressures is sufficiently large. For this reason, the required braking distance during the full-load vehicle run with a relatively large braking force cannot always be effectively reduced. To effectively reduce the required braking distance during the full-load vehicle run with a relatively small braking force, on the other hand, the master cylinder pressure need not be increased even after the initiation of the anti-lock pressure control. Therefore, the required braking distance during the full-load vehicle run with a relatively small braking force can always be effectively reduced.

Figure 22:
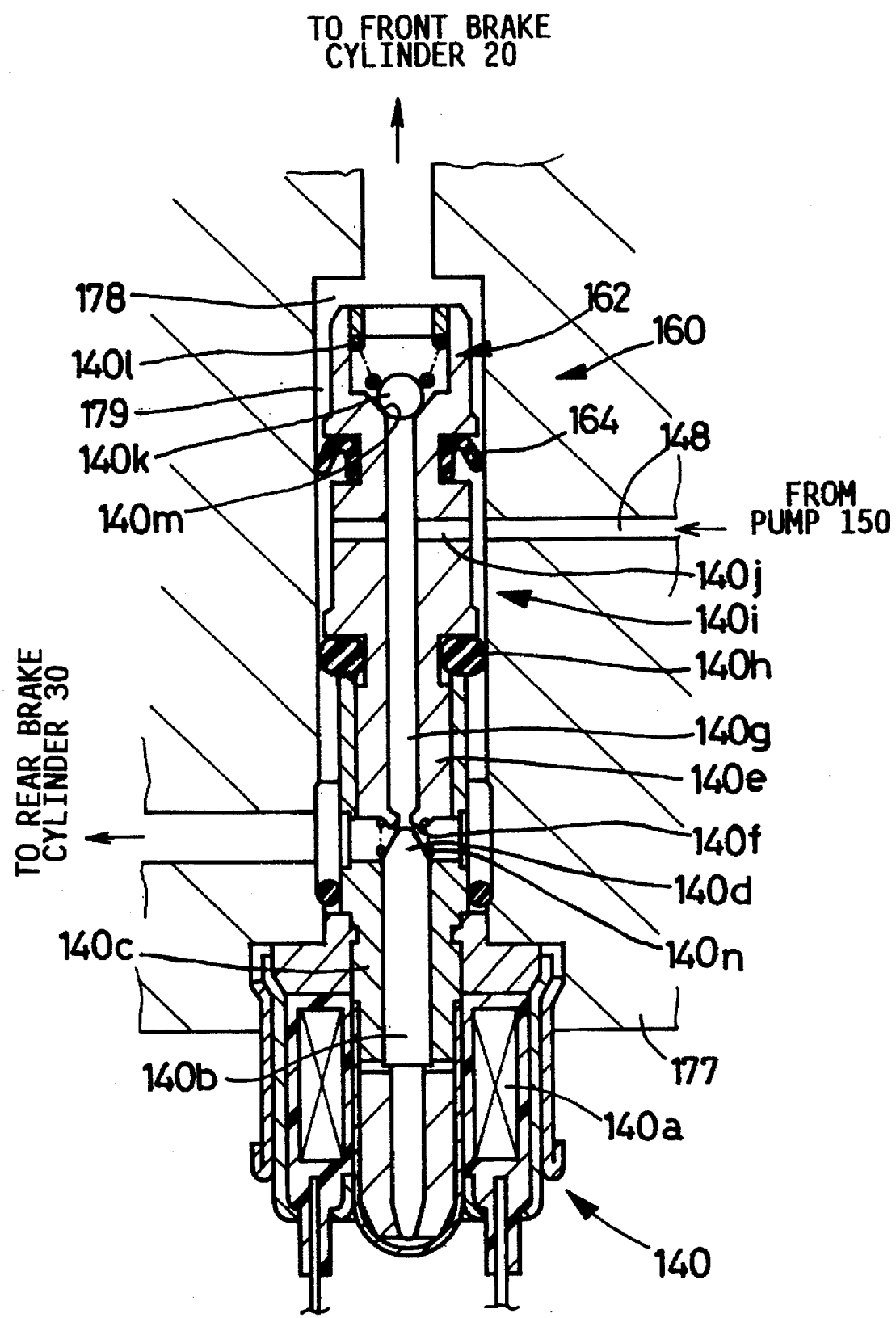
FIG. 22 is a front elevational cross-section view showing details of construction of a check valve device and a second shut-off valve which are provided in the embodiment of FIG. 17.

Referring next to FIG. 22, the construction of the check valve device 160 will be discussed. In the present embodiment, the check valve device 160 and the second shut-off valve 140 are constructed as a unit, as indicated in FIG. 17 by a square block delineated as a one-dot dashed line. This reduces the required number of components and the overall size of the unit.

The second shut-off valve 140 is provided in a housing 177. As well known in the art, the second shut-off valve 140 includes a solenoid 140a and a drive member 140b that consists of a rod extending through the solenoid 140a in concentric relation with the solenoid 140a. The drive member 140b is supported by a stationary support member 140c in the form of a sleeve, wherein the drive member 140b is slidably movable in the longitudinal direction relative to the support member 140c. The drive member 140b has a partially spherical upper end portion 140d (as seen in FIG. 22) which serves as a valve member, while a valve seat member 140e that consists of a sleeve is fixed concentrically to the support member 140c. The valve seat member 140e has an annular valve seat 140f at the end opposite to the valve member (upper end portion) 140d. The valve seat 140f cooperates with the valve member 140d to constitute a shut-off valve. The valve seat member 140e has a central communication passage 140g formed therethrough in the longitudinal direction. The communication passage 140g is open at the valve seat 140f.

The housing 177 indicated above also has a passage 178 having a circular cross section for connecting the front wheel brake cylinder 20 and the rear wheel brake cylinder 30 (P valve 110). The valve seat member 140e is fixedly disposed in the passage 178 such that the valve seat member 140e is concentric with the passage 178 and such that there is left an annular gap between the valve seat member 140e and the circumferential surface of the passage 178. This annular gap functions as an annular passage 179 concentric with the central communication passage 140g formed through the valve seat member 140e.

Within the annular passage 179, there is disposed a one-way sealing member in the form of a cup seal which serves as the second check valve 164, and a two-way sealing member in the form of an O-ring 140h. The cup seal (second check valve) and the O-ring 140h are arranged in the order of description in the direction from the front wheel brake cylinder 20 toward the rear wheel brake cylinder 30. The cup seal and O-ring 140i divide the annular passage 179 into a first portion on the side of the front wheel brake cylinder 20, a second portion on the side of the rear wheel brake cylinder 30, and a third intermediate portion on 140i between the first and second portions. The intermediate portion 140i is connected to the output or delivery end of the pump passage 148. The valve seat member 140e has a passage 140j for fluid communication between the communication passage 140g and the annular passage 179. In a portion of the communication passage 140g between the point of connection to the passage 140j and the end of the passage 140g on the side of the front wheel brake cylinder 20, there exists the first check valve 162 that comprises of a check valve with a spring-biased ball 140k. The ball 140k is normally held seated on a circular valve seat 140m (also formed on the valve seat member 140e) under a biasing action of biasing means in the form of a spring 140l.

In the check valve device 160 constructed as described above, the first check valve 162 inhibits a flow of the brake fluid in the direction from the front wheel brake cylinder 20 toward the intermediate portion 140i of the annular passage 179. However, the second check valve 164 permits a flow of the brake fluid into the intermediate portion 140i with the opening pressure difference being substantially zero. Further, the first check valve 162 permits brake fluid flow in the direction from the intermediate portion 140i toward the front wheel brake cylinder 20, when the pressure in the intermediate portion 140i is higher than the pressure in the front wheel brake cylinder 20 by more than a preset opening pressure difference of the first check valve 162. This opening pressure difference is determined by a biasing force of the spring 140l. The second check valve 164 always inhibits fluid flow from the intermediate portion 140i toward the front wheel brake cylinder 20. The fluid flow between the intermediate portion 140i and the rear wheel brake cylinder 30 are controlled by the second shut-off valve 140 only. In FIG. 22, reference sign 140n denotes a spring as biasing means for biasing the valve member 140d in the direction away from the valve seat 140f.

In the present check valve device 160, the central communication passage 140g in which the first check valve 162 is provided, and the annular passage 179 in which the second check valve 164 is provided are formed concentrically with each other, whereby the overall dimension of the check valve device 160 in the radial or diametric direction of the valve seat member 140e can be reduced to minimize the size of the braking system equipped with the check valve device 160.

Further, the valve seat member 140e, having the valve seats 140f and 140m, also serves as a means for defining the communication passage 140g and annular passage 179, and further functions to support the first and second check valves 162, 164. This arrangement is effective to minimize the number of the required components and the size of the braking system as a whole.

It will be understood from the above description of the present second embodiment that the check valve device 160, controller 170, and P valve 110 cooperate to constitute an example of the distribution control device for controlling the distribution of the braking forces to be applied to the front and rear wheels, according to a selected one of the first and second distribution patterns. It will also be understood that the passage 178 includes a portion which serves as a portion of the rear brake cylinder passage 24 between the point of connection to the front brake cylinder passage 24 and the point of connect on to the pump passage 148, and that the central communication passage 140g and the annular passage 179 serve respectively as two concentric and mutually independent passages one of which has a circular cross section and the other of which has an annular cross section.

It is further noted that the P valve 110 is disposed outside a hydraulic circuit which includes the first, second, and third shut-off valves 100, 140, 146, reservoir 144 and pump 150. This arrangement makes it possible to manufacture the P valve 110 separately from an integral brake unit, which includes the shut-off valves 100, 140, 146, reservoir 144, and pump 150 accommodated in a single common housing. Thus, the size and weight of the brake unit can be reduced. Where the P valve 110 and the brake unit are manufactured separately from each other, it is a common practice to install the brake unit near the vehicle's engine, more precisely, near the master cylinder 10, and locate the P valve at a portion of the vehicle body where the a conduit providing the rear brake cylinder passage 24 is supported, or near the brake, which includes the rear wheel brake cylinder 30.

Referring next to FIGS. 23–26(b), a third embodiment of the present invention will be described. The third embodiment is different from the second embodiment only in the manner in which the second shut-off valve 140 is controlled by the controller 170.

Figure 26A:
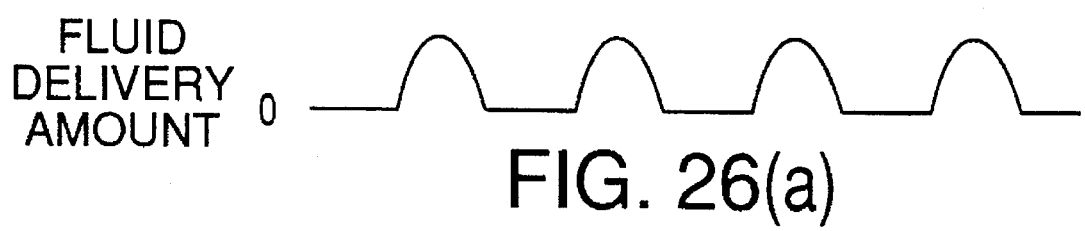
FIG. 26 is a graph explaining a relationship between intermittent fluid delivery of a pump used in the braking system of FIG. 17 and energization and de-energization of the solenoid of the second shut-off valve.

In the fourth pressure control mode, the pressure in the front wheel brake cylinder 20 is increased at a relatively slow rate while the pressure in the rear wheel brake cylinder 30 is increased at a relatively rapid rate (indicated in FIG. 20). In this fourth mode, the rear wheel braking pressure is increased by operation of the pump 150. In this respect, the pump 150 does not deliver the pressurized brake fluid continuously but delivers the fluid intermittently, as indicated in FIG. 26(a). Therefore, if the second shut-off valve 140 is held open in the fourth pressure control mode for a period longer than the delivery period of the pump 150, the entire amount of the fluid delivered by each delivery action of the pump 150 is supplied to the rear wheel brake cylinder 30, unless the first check valve 162 is opened by the delivery pressure of the pump 150. On the other hand, the diameter of the rear wheel brake cylinder 30 is usually smaller than that of the front wheel brake cylinder 20. Accordingly, when the same amount of brake fluid is supplied to the front and rear wheel brake cylinders 20, 30, the pressure in the rear wheel brake cylinder 30 is more sensitively increased. Therefore, continuous control of the wheel braking pressures in the fourth mode, with the second shut-off valve 140 held open, will result in an excessively rapid increase in the rear wheel braking pressure. This will lead to a undesirable reduction in the control stability of the rear wheel braking pressure due to an overshoot of the pressure rise.

In the light of the above drawback, the braking system according to the present third embodiment has a duty-cycle pressure control mode in which the second shut-off valve 140 is alternately turned on and off with a controlled duty cycle while the first and third shut-off valves 100, 146 are held closed. This duty-cycle pressure control mode is considered to be a compromise between the fourth mode (for slow increase of the front wheel braking pressure and rapid increase of the rear wheel braking pressure) and the fifth mode (for rapid increase of the front wheel braking pressure and holding of the rear wheel braking pressure).

The duty cycle of the solenoid of the second shut-off valve 140 in the duty-cycle pressure control mode is not a fixed value but is variable for continuous variation of the increase rates of the front and rear wheel braking pressures.

In the duty-cycle pressure control mode, the tendency to increase the rear wheel braking pressure is increased if the characteristic of the fourth pressure control mode is dominant over that of the fifth pressure control mode; while the tendency toward increasing the front wheel braking pressure is increased if the characteristic of the fifth mode is dominant over that of the fourth mode. Therefore, the duty-cycle pressure control mode, wherein the duty cycle of the second shut-off valve 140 can be continuously changed, provides a high desire of stability without an excessively high rate of increase in the rear wheel braking pressure. In addition, it assures adequate control of the distribution of the front and rear wheel braking pressures, namely, adequate control of distribution of the braking forces to be applied to the front and rear wheels.

Figure 23:
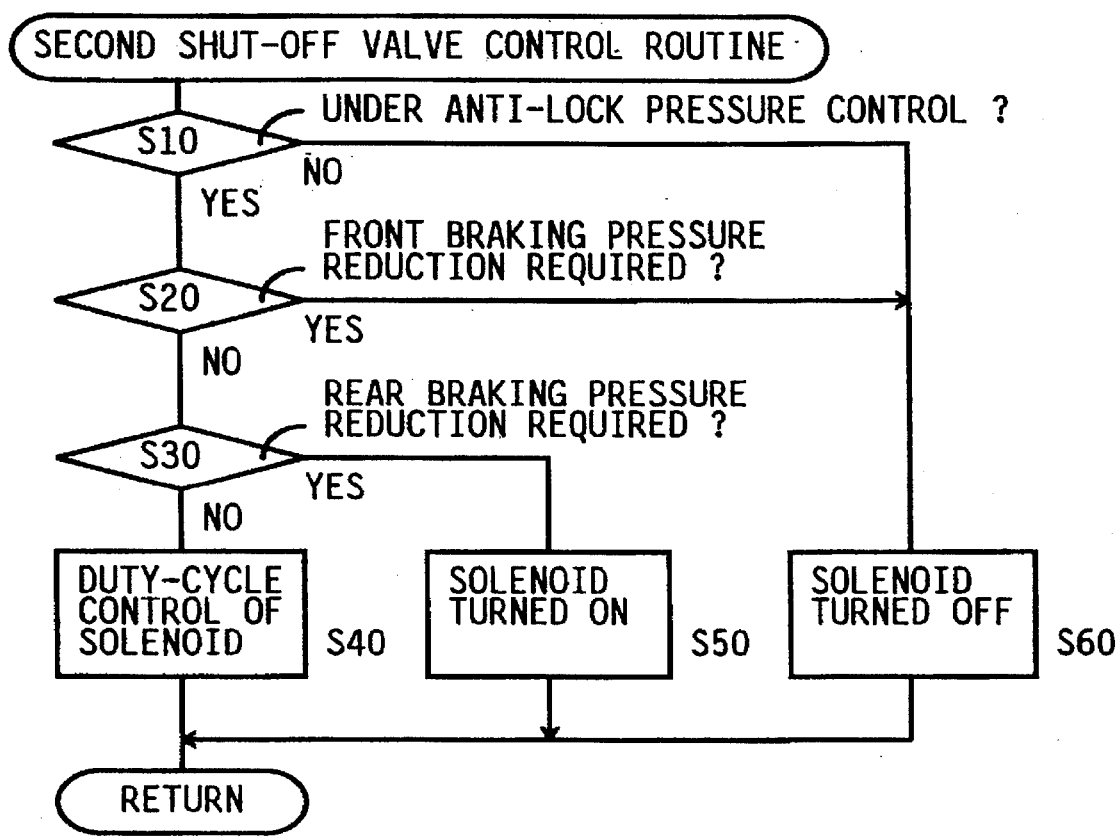
FIG. 23 is a flow chart illustrating a routine of a computer controller used in the braking system of FIG. 17, and controls the second shut-off valve.
Figure 24:
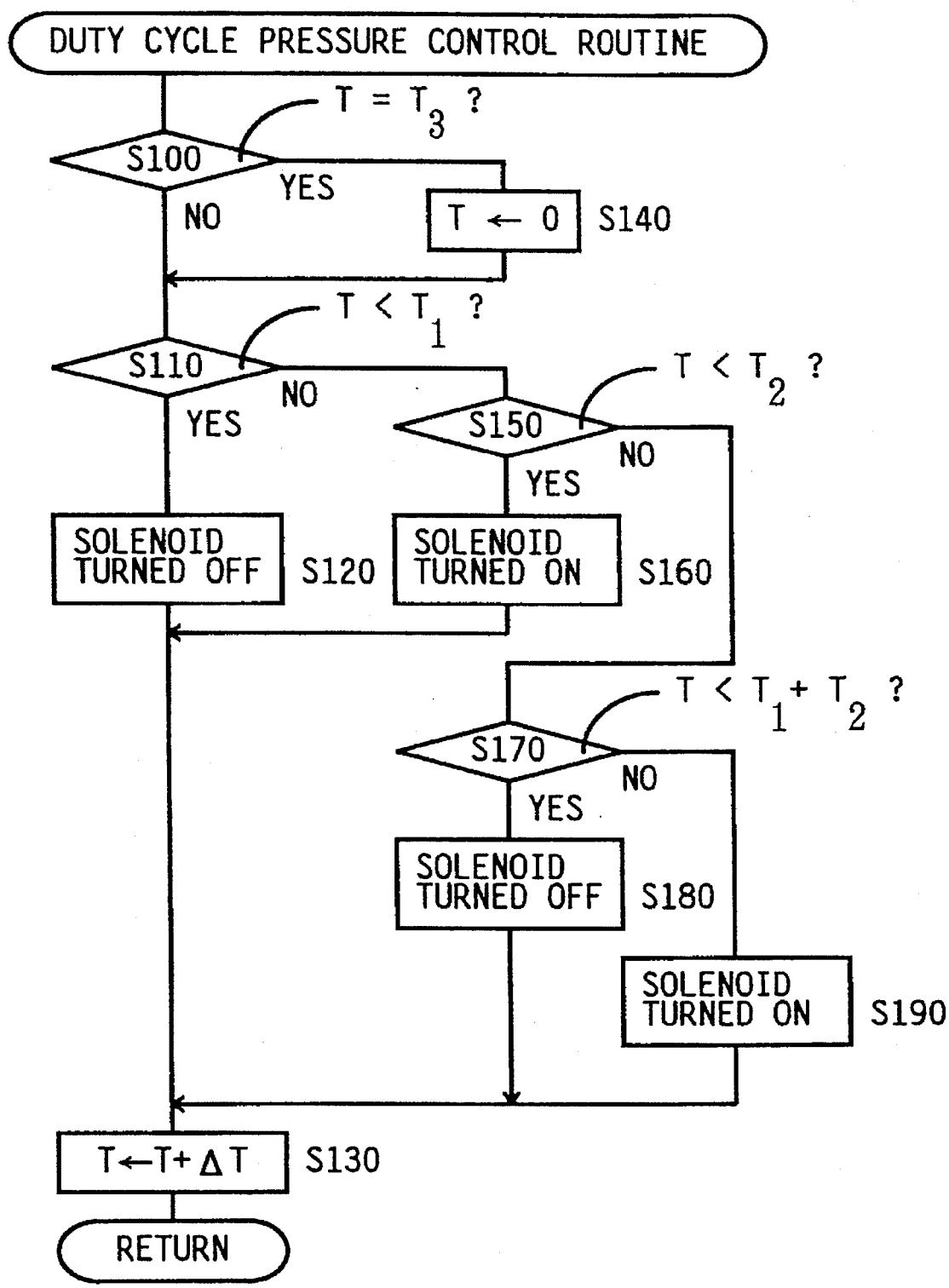
FIG. 24 is a flow chart illustrating a sub-routine executed in step $40 of the routine of FIG. 23.
Figure 25:
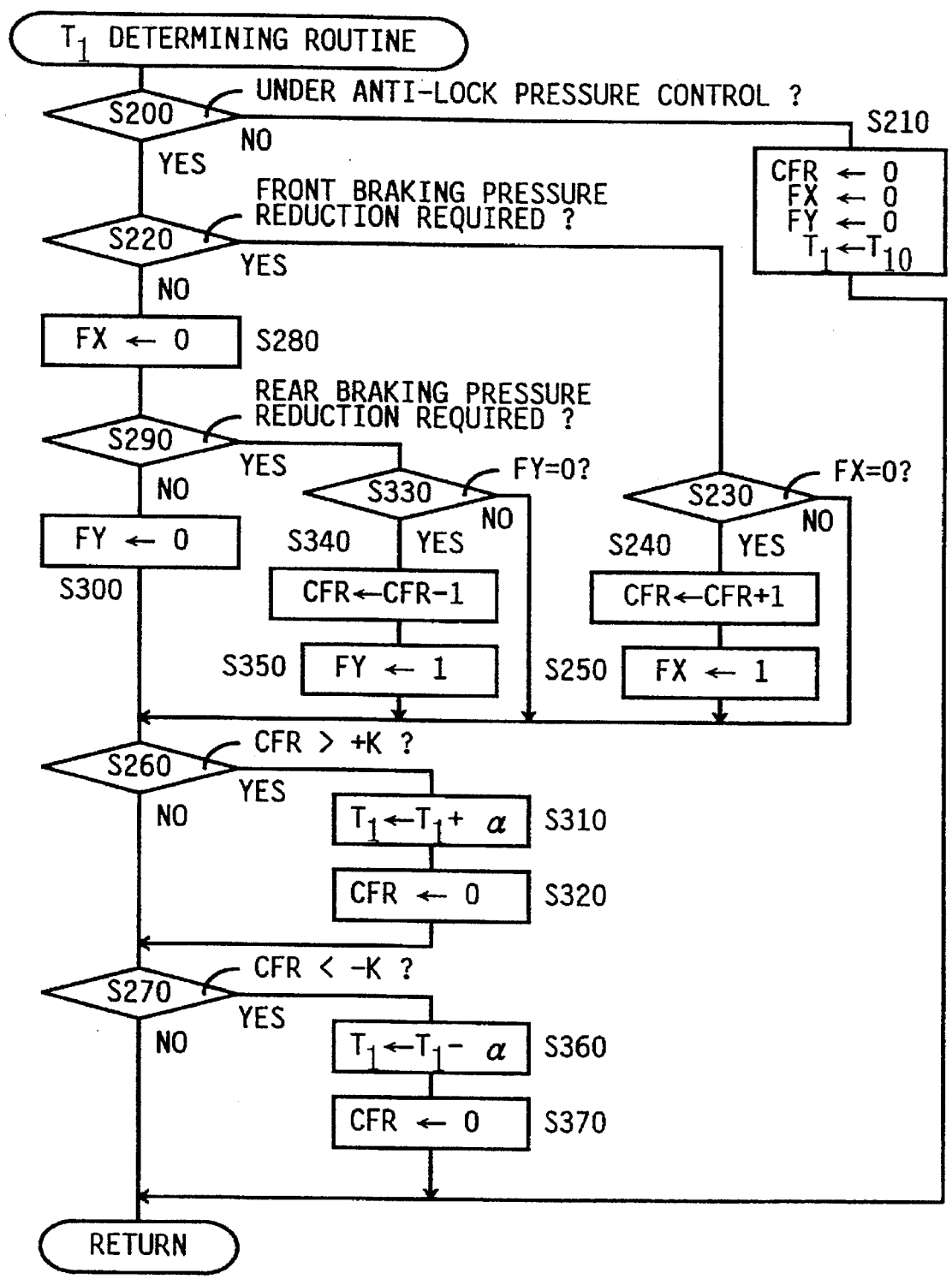
FIG. 25 is a flow chart illustrating a routine executed by the computer for determining an OFF time $T_1$ of the solenoid of the second shut-off valve.

In the present third embodiment, the ROM of the controller 170 stores routines for controlling the second shut-off valve 140, as illustrated in the flow charts of FIGS. 23–25. The flow chart of FIG. 23 illustrates the routine for controlling the solenoid of the second shut-off valve 140. The flow chart of FIG. 24 illustrates a sub-routine executed in step S40 of the routine of FIG. 23. The flow chart of FIG. 25 illustrates the routine for determining an OFF time $T_1$ of the solenoid.

These routines will be first briefly explained.

Figure 26B:
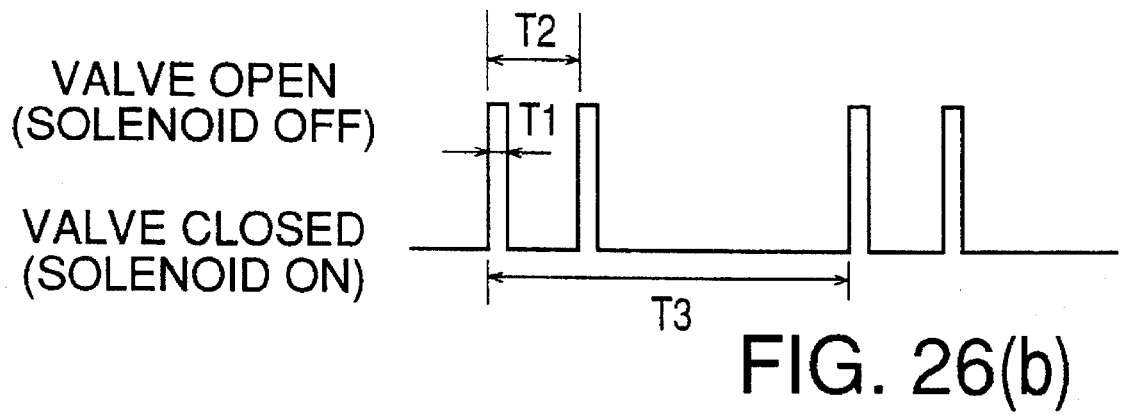

To assure an increase in the pressure in the rear wheel brake cylinder 30 due to operation of the pump 150, it is necessary to open the second shut-off valve 140 just when the pressurized brake fluid is delivered from the pump 150 and supplied to the rear wheel brake cylinder 30. In the present embodiment, the second shut-off valve 140 is open while its solenoid is held de-energized or OFF, namely, while the de-energization pulse is present. However, it is difficult to generate the de-energization pulses in synchronization with the intermittent delivery actions of the pump 150, respectively. The pump 150 has an operation cycle time consisting of the delivery time and the non-delivery time, which are substantially the same. The present embodiment is further adapted to allow pairs of adjacent de-energization pulses to be generated with a cycle time $T_3$, as indicated in FIG. 26(b). Each de-energization pulse has the width corresponding to the OFF time $T_1$ of the solenoid of the second shut-off valve 140 during which the valve 140 is held open. The two adjacent de-energization pulses have an interval $T_2$ which includes the solenoid OFF time $T_1$, (also indicated in FIG. 26(b). This pulse interval $T_2$ is made equal to the delivery time of the pump 150, which is one half of the operation cycle time of the pump 150. According to this arrangement, the solenoid OFF time $T_1$ (open time of the shut-off valve 140) produced by one of the two de-energization pulses of each pair is usually held within the delivery time of the corresponding delivery time of the pump 150, even when the generation of the pair of de-energization pulses is not precisely timed with the delivery action of the pump 150 in its intermittent delivery operation. In this example shown in FIG. 26(b), the entirety of the OFF time $T_1$ of the former de-energization pulse occurs within the corresponding delivery time of the pump 150. However, the OFF times $T_1$ of the two de-energization pulses may partially overlap the corresponding delivery times of the pump 150. In addition, the total time during which the second shut-off valve 140 is open by the two pulses is equal to $T_1$.

Although it is possible to generate the de-energization pulse for each delivery action or time of the pump 150, this arrangement is not desirable since the solenoid of the second shut-off valve 140 should be turned off and on for each delivery action of the pump 150, and the valve 140 should have a high response to the generation of the de-energization pulses. Further, this arrangement tends to cause a rapid increase in the rear wheel braking pressure. In view of these facts, the present embodiment utilizes pairs of de-energization pulses that are generated with the cycle time $T_3$, which is two times the operation cycle time of the pump 150. That is, each pair of de-energization pulses is generated each time the pump 150 performs two adjacent delivery actions. Accordingly, during the cycle time $T_3$, the pressurized brake fluid delivered from the pump 150 is supplied to the front wheel brake cylinder 20 for a time period $T_3 - 2T_1$, and is supplied to the rear wheel brake cylinder 30 for a time period $T_1$. Therefore, the ratio of the amounts of the fluid supplied from the pump 150 to the front and rear wheel brake cylinders 20, 30 is proportional to $(T_3 - 2T_1)/T_1$.

As the ratio $(T_3 - 2T_1)/T_1$ increases, the rate of increase in the front wheel braking pressure increases while the rate of increase in the rear wheel braking pressure decreases, whereby he braking force acting on the front wheel increases while the braking source acting on the rear wheel decreases. Thus, a relationship exits between the ratio of the amounts of the brake fluid supply from the pump 150 to the front and rear wheel brake cylinders 20, 30, and the ratio of the braking pressures or forces of the front and rear wheels. Namely, the ratios of the front and rear wheel braking pressures and forces increase with an increase in the ratio of the amounts of the fluid supply from the pump 150 to the front and rear wheel brake cylinders 20, 30.

Accordingly, the ratio of the braking forces of the front and rear wheels can be varied by changing the ratio of the amounts of the fluid supply from the pump 150 to the front and rear wheel brake cylinders 20, 30. The latter ratio can be changed by changing either the solenoid OFF time $T_1$ (open time) of the second shut-off valve 140 or the cycle time $T_3$ at which the successive pairs of de-energization pulses are generated, or both. If the solenoid OFF time $T_1$ is increased, for example, the ratio of the amount of fluid supply to the front wheel brake cylinder 20 to that to the rear wheel brake cylinder 30 is reduced, and the ratio of the braking force of the front wheel to that of the rear wheel is accordingly reduced. If the solenoid OFF time $T_1$ is reduced, the ratio of the amount of fluid supply to the front wheel brake cylinder 20 to that of the rear wheel brake cylinder 30 is increased, and the ratio of the braking force of the front wheel to that of the rear wheel is accordingly increased. If the cycle time $T_3$ is increased, the ratio of the fluid supply amounts of the front and rear wheel brake cylinders 20, 30 is increased, and the ratio of the braking forces of the front and rear wheels is accordingly increased. If the cycle time $T_3$ is reduced, the ratios of the fluid supply amounts of the front and rear wheel brake cylinders 20, 30 and the braking forces of the front and rear wheels are reduced.

In the present third embodiment, only the solenoid OFF time $T_1$ of the second shut-off valve 140 is increased or reduced to continuously change the duty cycle of the shut-off valve 140, which is the ratio of the open time to the closed time of the shut-off valve 140.

Further, in the present embodiment, the solenoid OFF time $T_1$ is determined on the basis of the numbers of reductions and increases of the front and rear wheel braking pressures. To this end, the controller 170 is provided with a pressure reduction counter CFR which is incremented when the front wheel braking pressure is reduced once, and decremented when the rear wheel braking pressure is reduced once. The content of this pressure reduction counter CFR indicates a relationship between the pressure reduction frequencies of the front and rear wheel brake cylinders 20, 30. The solenoid OFF time $T_1$ (width of each de-energization pulse) is increased by a predetermined constant value $\alpha$ each time the counter CFR value exceeds a positive threshold value +K, and decreased by the value $\alpha$ each time the counter CFR value becomes smaller than a negative threshold value −K. The OFF time $T_1$ is variable within a range between 0 and $T_3$.

If the reduction of the front wheel braking pressure is relatively frequent (if the front wheel brake cylinder 20 has exhibited a relatively high tendency of pressure reduction), the CFR value exceeds the positive threshold value +K, and the OFF time or open time $T_1$ of the second shut-off valve 140 is increased, whereby the amount of fluid supply from the pump 150 to the front wheel brake cylinder 20 is reduced to reduce the rate of increase in the front wheel braking pressure which thereby reduces the braking force applied to the front wheel. On the other hand, an increase in the amount of the fluid supply from the pump 150 to the rear wheel brake cylinder 30 increases the rate of increase in the rear wheel braking pressure, which corresponds to increased braking force applied to the rear wheel. In this case, therefore, the braking function of the front wheel is reduced while that of the rear wheel is increased.

If the reduction of the rear wheel braking pressure is relatively the CFR value becomes smaller than the negative threshold value −K, and the OFF time or open time $T_1$ of the second shut-off valve 140 is reduced, whereby an increase in the amount of the fluid supply from the pump 150 to the front wheel brake cylinder 20 increases the rate of increase in the front wheel braking pressure, which corresponds to braking force applied to the font wheel. On the other hand, the fluid supply from the pump 150 to the rear wheel brake cylinder 30 is inhibited to hold the rear wheel braking pressure at the present level for thereby maintaining the braking force presently acting on the rear wheel. In this case, therefore, the braking function of the front wheel is increased while an increase in the braking function of the rear wheel is inhibited.

It will be understood that the present third embodiment is adapted such that the duty cycle of the solenoid of the third shut-off valve 140 is changed on the basis of at least one of the pressure reducing tendencies (pressure reducing hystereses) of the front and rear wheel brake cylinders 20, 30, by changing the solenoid OFF time $T_1$ (width of the de-energization pulse of the second shut-off valve 140) on the basis of the content of the pressure reducing counter CFR.

Referring to the flow charts of FIGS. 23 and 24, there will next be described in detail the routine for controlling the second shut-off valve 140. In this routine, the second shut-off valve 140 is controlled not only in the duty-cycle mode but also in the other pressure control modes, as explained below.

The present routine of FIG. 23 for controlling the second shut-off valve 140 is executed at a predetermined time interval. The routine is initiated with step S10 to determine whether the braking system is in the process of the anti-lock pressure control. This is determined based on the flags provided in the RAM of the controller 170. If a negative decision (NO) is obtained in step S10, the control flow goes to step S60 in which a signal is generated to de-energized or turn OFF the solenoid of the second shut-off valve 140, to hold the valve 140 in the open state. Thus, one cycle of the present routine is terminated.

If the anti-lock pressure control of the braking system is commenced during repetitive execution of the routine, an affirmative decision (YES) is obtained in step S10, and the control flow goes to step S20 to determine whether it is necessary to reduce the front wheel braking pressure. This determination is made based on a flag stored in the RAM. If an affirmative decision (YES) is obtained step S20, the control flow goes to step S60 to turn OFF the solenoid of the second shut-off valve 140 for opening the valve 140. To reduce the front wheel braking pressure, the second shut-off valve 140 should be opened in the seventh pressure control mode as described above. In this seventh mode, the pressures in both of the front and rear wheel brake cylinders 20, 30 are reduced.

If a negative decision (NO) is obtained in step S20, the control flow goes to step S30 to determine whether it is necessary to reduce the rear wheel braking pressure. This step S30 is provided to determine whether the pressure reduction is required for only the rear wheel brake cylinder 30. If an affirmative decision (YES) is obtained in step S30, the control flow goes to step S50 to energize or turn ON the solenoid of the shut-off valve 140 for closing the valve 140. In this case, only the rear wheel braking pressure is reduced regardless of the front wheel braking pressure.

If no pressure reduction is required for not only the front wheel brake cylinder 20 but also the rear wheel brake cylinder 30, a negative decision (NO) is obtained in step S30, and step S40 is implemented to control the second shut-off valve 140 in the duty-cycle pressure control mode. In the preceding embodiment, the fourth or fifth pressure control mode is selected in this situation. In the present embodiment, the duty-cycle pressure control mode is selected rather than the fourth or fifth mode.

In theory, the duty-cycle pressure control mode of operation is also performed in the first or second pressure control mode indicated in TABLE 1. In practice, however, the first and second modes are rarely selected during the anti-lock pressure control operation. In this sense, the duty-cycle pressure control mode is used as an alternative to the fourth or fifth mode.

The sub-routine for controlling the second shut-off valve 140 in the duty-cycle pressure control mode is illustrated in detail in the flow chart of FIG. 24. In this sub-routine, step S100 is initially implemented to: read out the cycle time $T_3$ (which is a predetermined constant) from the ROM of the controller 170; read out from the RAM of the controller 170 a time lapse T from the start of the present cycle in which a pair of de-energization pulses each defining the solenoid OFF time $T_1$ is generated; and determine whether the time lapse T has reached the predetermined cycle time $T_3$. Namely, step S100 is provided to determine whether the predetermined cycle time $T_3$ has passed. If a negative decision (NO) is obtained in step S100, step S110 is implemented to: read out the presently effective solenoid OFF time $T_1$ from the RAM; and determine whether the time lapse T is shorter than the solenoid OFF time $T_1$. The solenoid OFF time $T_1$ is determined by a routine illustrated in the flow of FIG. 25 as described below, and stored in the RAM. If an affirmative decision (YES) is obtained in step S110, the control flow goes to step S120 to turn OFF the solenoid of the shut-off valve 140 for opening the valve 140. Namely, the first one of the pair of de-energization pulses in question is generated. Then, step S130 is implemented to increment the time lapse T by a predetermined value $\Delta T$. Thus, one cycle of execution of the sub-routine of FIG. 24 is terminated, and the control flow goes back to the main routine of FIG. 23. The sub-routine of FIG. 24 is executed each time step S40 of the main routine of FIG. 23 is executed. The following description refers to the situation where step S40 of the main routine of FIG. 23 or the sub-routine of FIG. 24 is repeatedly implemented without implementation of steps S50 and S60.

When the time lapse T has reached the solenoid OFF time $T_1$ as a result of repeated execution of the sub-routine of FIG. 24, an affirmative decision (YES) is obtained in step S110, and the control flow goes to step S150 to read out the predetermined pulse interval $T_2$ from the ROM of the controller 170, and determine whether the time lapse T is shorter than the pulse interval $T_2$. If an affirmative decision (YES) is obtained in step S150, the control flow goes to step S160 in which the solenoid of the second shut-off valve 140 is turned ON to close the valve 140. That is, the first de-energization pulse is terminated and replaced by an energization pulse which energizes or turn ON the solenoid. Step S160 is followed by step S130.

If the time lapse T has reached pulse interval $T_2$ during the repeated execution of the sub-routine of FIG. 24, a negative decision (NO) is obtained in step S150, and the control flow goes to step S170 to determine whether the time lapse T is shorter than a sum of the solenoid OFF time $T_1$ and the pulse interval $T_2$. If an affirmative decision (YES) is obtained in step S170, step S180 is implemented to turn OFF the solenoid of the shut-off valve 140 to open the valve 140. Namely, the second one of the pair of de-energization pulses in question is generated. Then, the control flow goes to step S130.

If the time lapse T has reached the sum of $(T_1+T_2)$ during the repeated execution of the sub-routine of FIG. 24, a negative decision (NO) is obtained in step S170, and the control flow goes to step S190 to turn ON the solenoid of the shut-off valve 140 to close the valve 140. Thus, the second de-energization pulse is terminated. Then, the control flow goes to step S130.

When the time lapse T increases to the predetermined cycle time $T_3$ as a result of the repeated execution of the sub-routine of FIG. 24, an affirmative decision (YES) is obtained in step S100, and step S140 is implemented to reset the time lapse for starting the next cycle of generation of a pair of de-energization pulses.

With the sub-routine of FIG. 24 executed repeatedly, the second shut-off valve 140 is controlled (opened and closed) by successive pairs of de-energization pulses which are generated periodically with the cycle time $T_3$, such that the two de-energization pulses of each pair have the pulse interval $T_2$, and each pulse has a width corresponding to the solenoid OFF time $T_1$ of the second shut-off valve 140, as indicated in FIG. 26(b).

The duty cycle of the second shut-off valve 140 is controlled by determining the solenoid OFF time $T_1$ according to the routine of FIG. 25, which will be described in detail.

The routine of FIG. 25 is executed at a predetermined interval. The routine is initiated with step S200 to determine whether the braking system is in the of the anti-lock pressure control. If a negative decision (NO) is obtained in step S200, the control flow goes to step S210 to reset the content of the pressure reduction counter CFR and flags FX and FY and also rest the solenoid OFF time $T_1$ to a predetermined initial value $T_{10}$ The content of the counter CFR, the values of the flags FX, FY and the OFF time $T_1$ are stored in the RAM of the controller 170. The functions of the flags FX, FY will be described. One cycle of execution of the routine of FIG. 25 is terminated with step S210.

If the anti-lock pressure control is commenced during repeated execution of the routine of FIG. 25, an affirmative decision (YES) is obtained in step S200, and the control flow goes to step S220 to determine whether it is required to reduce the front wheel braking pressure. If an affirmative decision (YES) is obtained in step S220, step S230 is implemented to determine whether the flag FX is set at "0". If an affirmative decision (YES) is obtained in step S230, the control flow goes to step S240 to increment the pressure reduction counter CFR, and then step S240 the flag FX to "1".

Step S250 is followed by step S260 to determine whether the content of the counter CFR is larger than the positive threshold value +K. If an affirmative decision (YES) is obtained in step S260, step S310 is implemented to increase the solenoid OFF time $T_1$ by a predetermined value a, and store the increased OFF time $T_1$ in the RAM. Step S310 is followed by step S320 to reset the pressure reduction counter CFR to zero.

Then, step S270 is implemented to determine whether the content of the counter CFR is smaller than the negative threshold value −K. If a negative decision (NO) is obtained in step S270, the present cycle of execution of the routine of FIG. 25 is terminated.

If reduction of the front wheel braking pressure is still required in the next cycle, an affirmative decision (YES) is obtained in step S220, and a negative decision (NO) is obtained in step S230, since the flag FX has been set at "1". Consequently, the control flow goes to step S260 while skipping steps S240 and S250. Thus, the flag FX is provided to increment the pressure reduction counter CFR only once during repeated execution of the present routine while the reduction of the front wheel braking pressure is continuously required. In other words, the flag FX functions to increment the counter CFR only once for generation of each command to reduce the front wheel braking pressure. If the reduction of the front wheel braking pressure is no more required, a negative decision (NO) is obtained in step S220, and the control flow goes to step S280 to reset the flag FX to zero. Then, step S290 and the following steps S300, S330, S340 and S350 are implemented for decrementing the counter CFR. Steps S290, S300, S330, S340 and S350 for the rear wheel brake cylinder 30 are equivalent to steps S220, S280, S230, S240 and S250 for the front wheel brake cylinder 20.

Then, step S260 is implemented to determine whether the content of the counter CFR is larger than the positive threshold value +K. If a negative decision (NO) is obtained in step S260, step S270 is implemented to determine whether the content of the counter CFR is smaller than the negative threshold value −K. If a negative decision (NO) is obtained in step S270, the present cycle of execution of the routine of FIG. 25 is terminated. If an affirmative decision (YES) is obtained in step S270, the control flow goes to step S360 to read out the solenoid OFF time T$_1$ from the RAM of the controller 170, and reduce the solenoid OFF time T$_1$ by the predetermined value a. Step S360 is followed by step S370 in which the counter CFR is reset to zero, and one cycle of execution of the routine of FIG. 25 is terminated.

It will be understood from the above explanation of the present third embodiment that the check valve device 160 functions as a pressure reduction control device, which cooperates with the controller 170 and P valve 100 to comprise the distribution control device for controlling the distribution of the braking forces of the front and rear wheels, according to one of the first and second distribution patterns. It will also be understood that the portions of the controller 170 assigned to implement step S40 of the routine of FIG. 23 (namely, sub-routine of FIG. 24 for controlling the second shut-off valve 140 in the duty-cycle pressure control mode) and the routine of FIG. 25 for determining the solenoid OFF time T$_1$ function as means for changing the duty cycle of the shut-off valve 140 on the basis of the numbers of the pressure reductions which have been required for the wheel brake cylinders 20, 30.

Figure 27:
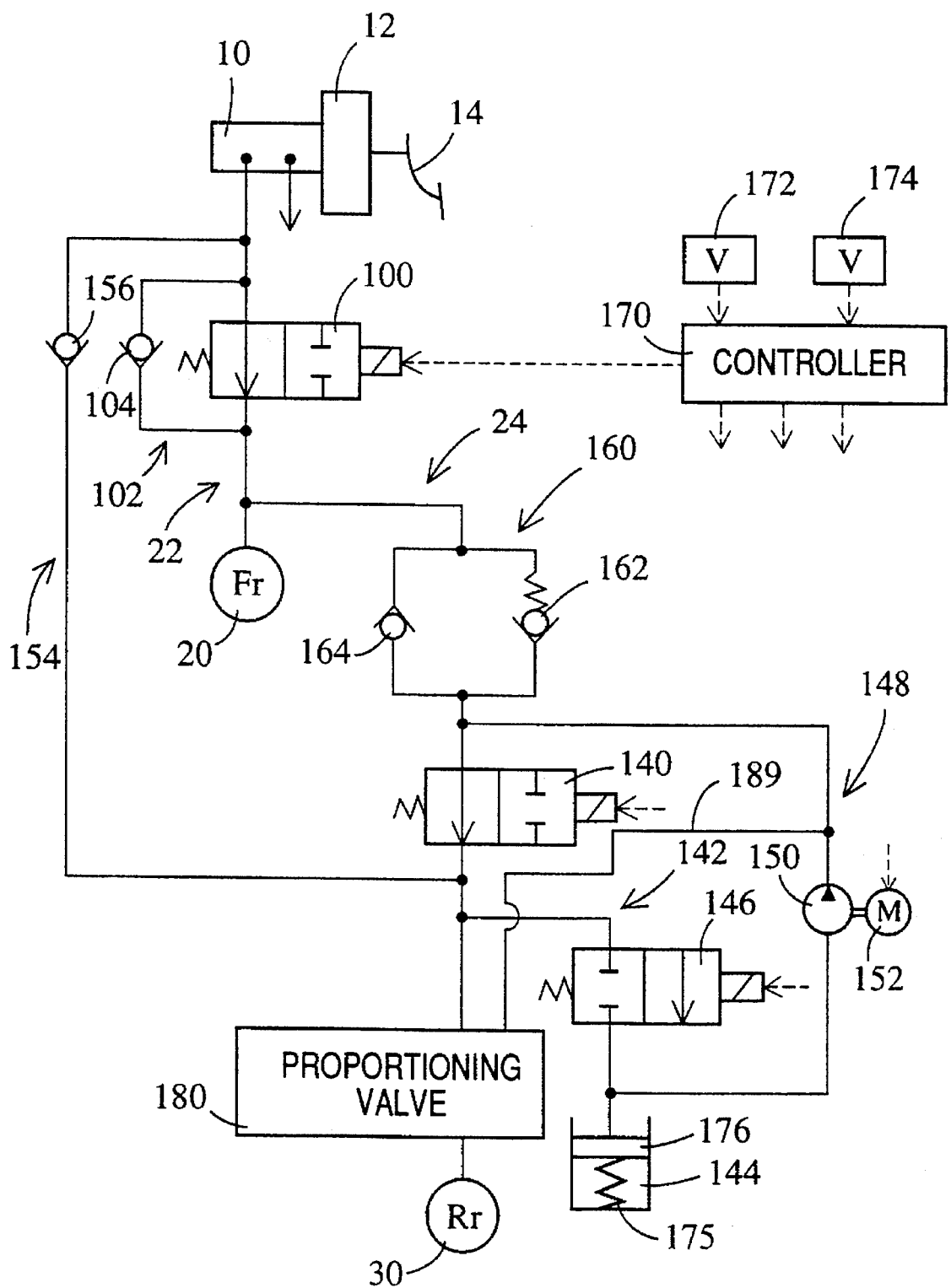
FIG. 27 is a schematic view showing an anti-lock braking system according to a further embodiment of the present invention.
Figure 28:
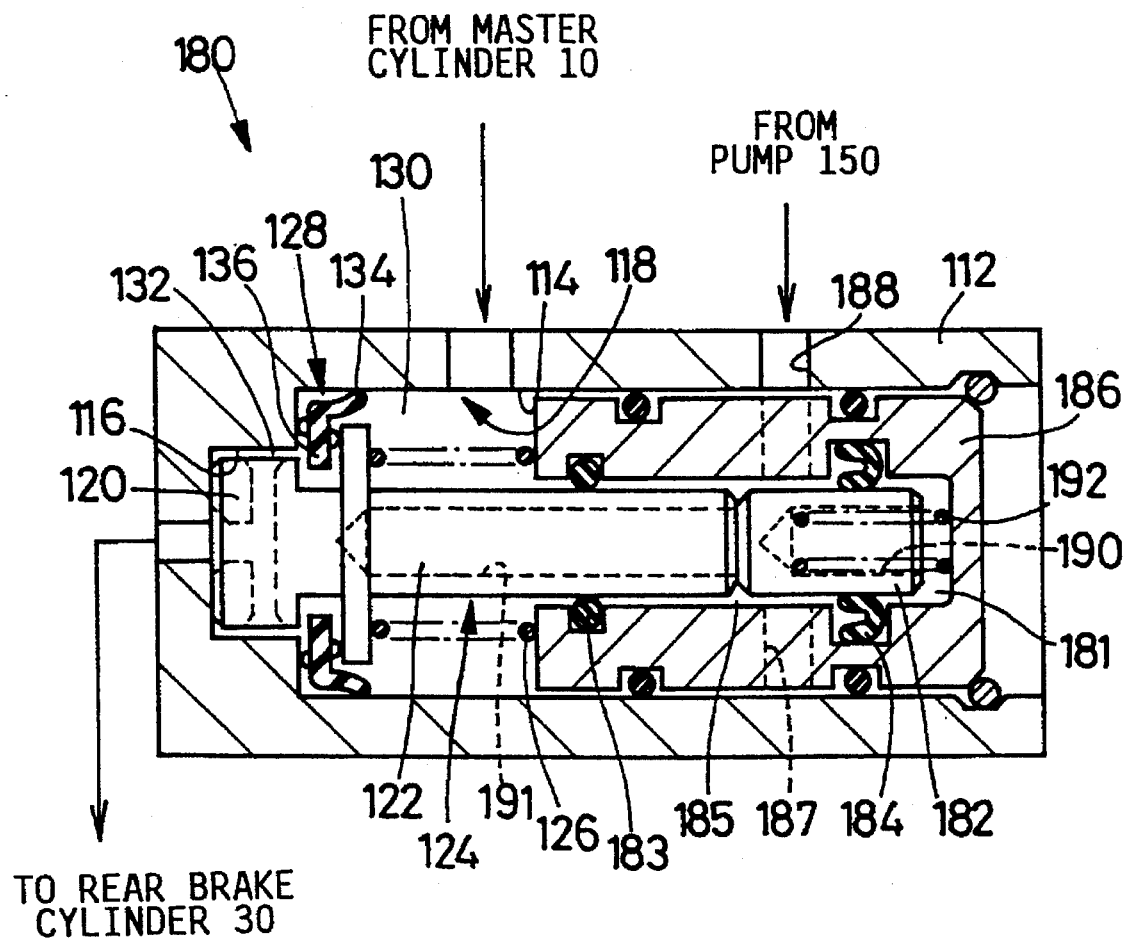
FIG. 28 is a front elevational cross-section of a proportioning valve used in the braking system of FIG. 27.

Referring next to FIGS. 27 and 28, there will be described a fourth embodiment of the present invention.

The present fourth embodiment is different from the second embodiment only in the construction of the P valve and the connection of the P valve to the pump 150. In the second embodiment of FIG. 17, the output or delivery end of the pump passage 148 is connected to a portion of the rear brake cylinder passage 24 which is upstream of the second shut-off valve 140 and the P valve 110, so that the brake fluid delivered from the pump 150 is supplied to the rear wheel brake cylinder 30 through the shut-off valve 140 and the P valve 110. In this arrangement, the braking pressure in the rear wheel brake cylinder 30 is influenced by the pressure reducing function of the P valve 110 even during the anti-lock pressure control operation. This arrangement does not permit the rear wheel braking pressure to be increased to a sufficiently high level. In view of this drawback, the present fourth embodiment uses a P valve 180 which is directly connected to the pump 150, as shown in FIG. 28.

The construction of the P valve 180 will be described by reference to FIG. 28. Since the P valve 180 is basically similar to the P valve 110, only a difference of the P valve 180 from the P valve 110 will be described. The same reference numerals as used in FIG. 18 will be used to identify the corresponding components of the P valve 180, which will not be described in the interest of simplification.

The P valve 180 is designed so that it does not function during the anti-lock pressure control operation. Namely, the P valve 180 is adapted to receive the delivery pressure of the pump 150 during the anti-lock pressure control, which inhibits the valve piston 124 from performing a pressure reducing function, that is, prevents the valve piston 124 from being seated on the cup seal 128.

Described in detail, the small-diameter portion 122 of the valve piston 124 is not directly exposed to an air chamber 181, but an auxiliary piston 182 fixed to the small-diameter portion 122 is exposed to the air chamber 181. A two-way sealing member in the form of an O-ring 183 forms a fluid-tight fit with the small-diameter portion 122, while a one-way sealing member in the form of a cup seal 184 forms a fluid-tight fit with the auxiliary piston 182. The O-ring 183 and the cup seal 184 define a pump pressure chamber 185 therebetween. The pump pressure chamber 185 is connected to the delivery or output side of the pump 150 through a communication passage 187 formed through a plug 186, a communication passage 188 formed through the housing 112, and a fluid passage 189, which is connected to the pump passage 148 as shown in FIG. 28.

The auxiliary piston 182 has a center blind hole 190 open on its end face and exposed to the air chamber 181, such that the blind hole 190 forms a part of the air chamber 181. In other words, the blind hole 190 is formed to increase the volume of the air chamber 181, so that the volume of the air chamber 181 can be easily reduced when the valve piston 124 operates to perform its pressure reducing function. Since the same valve piston 124 as used in the P valve of FIG. 18 is used in the present P valve 180, the small-diameter portion 122 has a central blind hole 191, but this blind hole 191 is not essential in the present embodiment.

The auxiliary piston 182 is normally held in abutting contact with the valve piston 124 by a biasing means in the form of a spring 192. The opening pressure difference of the P valve 180 is determined by the biasing forces of both of the springs 126 and 192.

The 0-ring 183 functions to inhibit not only a flow of the brake fluid in a direction from the input chamber 130 toward the pump pressure chamber 185, but also a flow of the brake fluid n the opposite direction.

In the anti-lock braking system provided with the P valve 180 constructed as described above, the brake fluid delivered from the pump 150 to increase the rear wheel braking pressure during the anti-lock pressure control is supplied to the rear wheel brake cylinder 30 through the second shut-off valve 140 and the P valve 180. At this time, the P valve 180 does not function to reduce the pressure of the fluid received from the pump 150. Explained more particularly, the auxiliary piston 182 is moved in a direction (in the right direction as seen in FIG. 28) that causes reduction in the volume of the air chamber 181, whereby the auxiliary piston 182 is brought into contact with the bottom of the air chamber 181. At the same time, the valve piston 124 is moved in the opposite direction (in the left direction as seen in FIG. 28) so that the large-diameter portion 120 is brought into contact with the bottom of the housing 112. Although the shoulder surface of the bottomed valve piston 124 is in fluid-tight contact with the cup seal 128, the protrusions provided on the cup seal 128 as described above with respect to the P valve 110 permit the flow of the fluid between the input and output chambers 130, 132. As a result, the P valve 180 simply functions as part of the rear brake cylinder passage Therefore, the braking pressure in the rear wheel brake cylinder 30 can be increased to a level at which the check valve 156 is opened, namely, to the pressure in the master cylinder 10. Thus, the rear wheel braking pressure can be increased to a sufficiently high level, and the friction coefficient of the road surface on which the rear wheel lies can be effectively used to brake the vehicle, even in the presence of the P valve 180.

Referring to the graph of FIG. 29, there will be described an advantageous effect of the present fourth embodiment of the invention.

Figure 29:
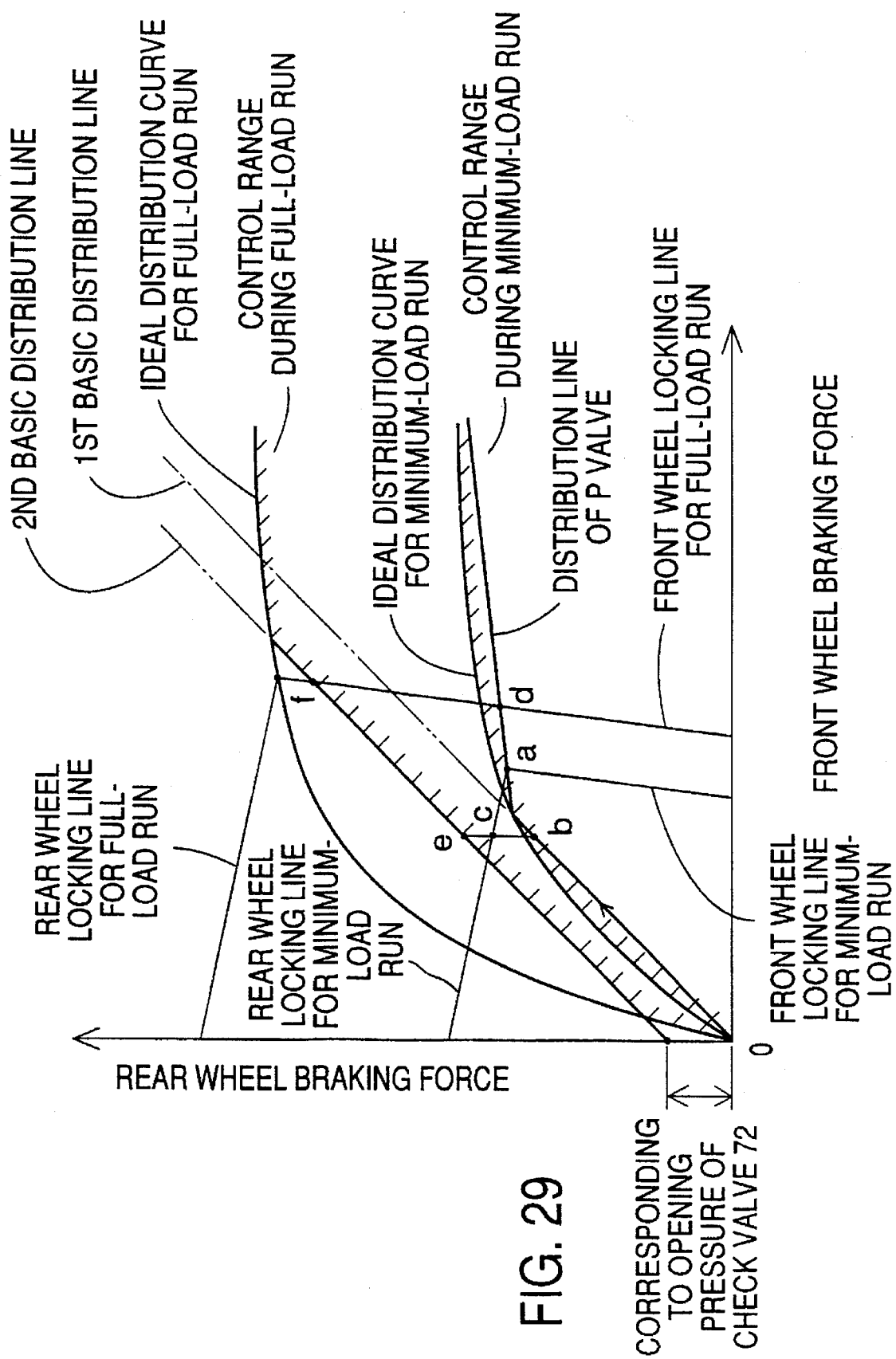
FIG. 29 is a graph detailing the relationship between the braking forces of the front and rear wheels as controlled in the braking system of FIG. 27.

When the depression force acting on the brake pedal 14 is increased from zero in a normal braking condition without an anti-lock pressure control, the front-rear force distribution point is moved from the zero point of the coordinate system of the graph of FIG. 29, along a first basic distribution line (which is determined by the basic braking arrangement without the shut-off valves 100, 140, 146 and the first check valve 162). If the depression force on the brake pedal 14 is further increased during the minimum-load run of the vehicle, the force distribution point is further moved to point "a" of intersection between a distribution line of the P valve 180 and a front wheel locking line for the minimum-load run, as indicated in FIG. 29.

If anti-lock control is commenced in this condition to reduce both of the front and rear wheel braking pressures in the seventh pressure control mode, the force distribution point is moved to point "b'". If the fourth pressure control mode is established to reduce the front and rear wheel braking pressures as a result of elimination of the locking tendency of the front wheel, the front wheel braking pressure is held constant until the first check valve 172 is opened, and is then increased. Accordingly, the force distribution point is moved from point "b" in a direction parallel to the vertical axis of the graph of FIG. 29, which direction causes an increase in the rear wheel braking force. Since the P valve 180 is disabled while the rear wheel braking force is increased by operation of the pump 150, the force distribution point is then moved to point "c" which lies on a rear wheel locking line for the minimum-load run. As a result, the anti-lock control of the rear wheel braking pressure is initiated to eliminate the locking tendency of the rear wheel.

If the force distribution point is moved to point "d", indicated in FIG. 29, during a normal braking operation with the vehicle placed in the full-load run, the anti-lock control of the front wheel braking pressure is initiated, and the force distribution point is then moved to point "b" as a result of the anti-lock pressure control. If the locking tendency of the front wheel is subsequently eliminated, the force distribution point is moved from point "b", via point "c", to point "e" lying on a second basic distribution line, since the P valve 180 is disabled. The second basic distribution line is determined by the basic braking arrangement which includes the check valve device 160 (first check valve 162) but does not include the P valve 180. Then, the force distribution point is moved along the second basic line, in a direction that causes the rear wheel braking pressure to increase. Eventually, the force distribution line reaches point "f", the intersection between the second basic distribution line and a front wheel locking line for the full-load run. Then, the front wheel braking pressure is controlled in the anti-lock manner to avoid the locking tendency of the front wheel.

In the present fourth embodiment, the actual distribution of the front and rear wheel braking forces is controlled, during the normal pressure control operation (without the anti-lock control of the braking pressures), according to the distribution line of the P valve 180, irrespective of whether the vehicle is in the minimum-load run or full-load run. During the anti-lock pressure control operation with the vehicle in the minimum-load run, on the other hand, the actual distribution of the front and rear wheel braking forces is controlled according to a distribution pattern which is sufficiently similar and close to the ideal distribution curve for the minimum-load run. During the anti-lock pressure control operation with the vehicle in the full-load run, the actual distribution of the front and rear wheel braking forces controlled according to a portion of the ideal distribution curve for the full-load run which is located below (in FIG. 29) the second basic distribution line, and a portion of the second basic distribution line which is located below the ideal distribution curve for the full-load run. In the present embodiment, therefore, the rear wheel braking pressure during the full-load vehicle run can be further increased, whereby the total braking force of the vehicle can be increased, and the required vehicle braking distance can be reduced. It will also be understood from the graph of FIG. 29 that the rear wheel braking pressure or force during the full-load vehicle run can be effectively increased to thereby reduce the required vehicle braking distance, even when the ideal rear braking force is smaller than the threshold level of the P valve 180.

In the present embodiment, the distribution of the front and rear wheel braking forces during normal pressure control operation and anti-lock pressure control operation in combination with the minimum-load vehicle run correspond to the first distribution pattern, while the distribution of the front and rear wheel braking forces during the anti-lock pressure control operation in combination with the full-load vehicle run corresponds to the second distribution pattern. The second distribution pattern defines the rear wheel braking force larger than that defined by the first distribution pattern, over the entire range of the rear wheel braking force.

Like the braking system according to the second embodiment, the anti-lock braking system according to the fourth embodiment is capable of reducing the required vehicle braking distance during the full-load run, not only during braking with a relatively large braking force on a relatively high friction-coefficient road surface, but also during braking with a relatively small braking force on a relatively low friction-coefficient road surface. As indicated above with respect to the second embodiment, the required braking distance during the full-load vehicle run with a relatively large braking force cannot always be effectively reduced, but the required braking distance during the full-load vehicle run with a relatively small braking force can always be effectively reduced.

In the present fourth embodiment, the check valve device 160 functions as the pressure reduction control device, which cooperates with the controller 170 and P valve 180 to constitute the distribution control device for controlling the distribution of the braking forces of the front and rear wheels, according to a selected one of the first and second distribution patterns. Further, the portions of the controller 170 assigned to implement step S40 of FIG. 23 (sub-routine of FIG. 24) and the routine of FIG. 25 function as the means for changing the duty cycle of the shut-off valve 140 on the basis of the numbers of the pressure reductions which have been required for the front and rear wheel brake cylinders.

Figure 30:
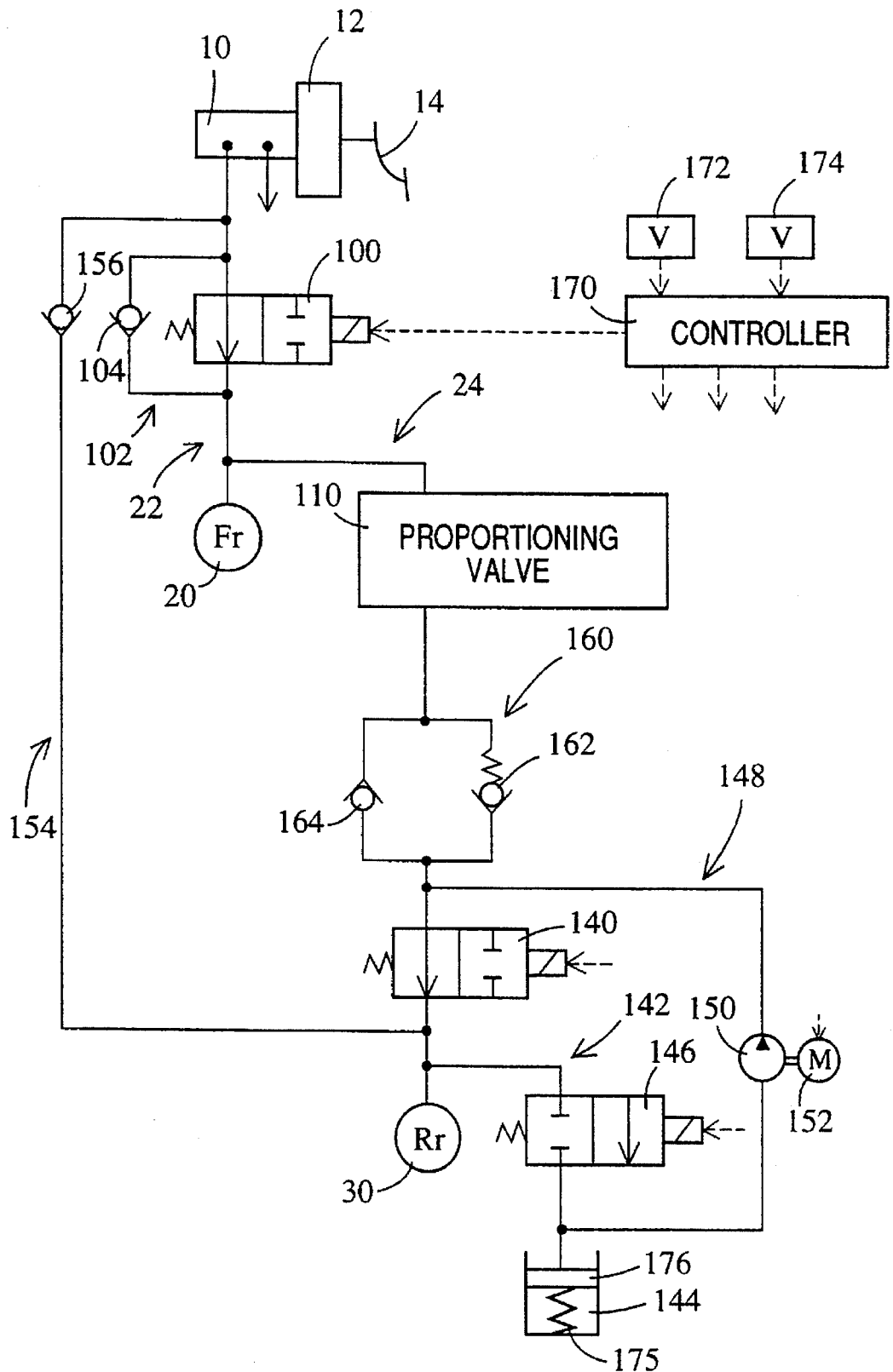
FIG. 30 is a schematic view showing a yet further embodiment of the anti-lock braking system of this invention.

A fifth embodiment of this invention will be described by reference to FIG. 30.

Like the anti-lock braking system according to the preceding fourth embodiment, the anti-lock braking system according to the present embodiment is also designed to be able to increase the rear wheel braking pressure to the level of the master cylinder pressure during the anti-lock pressure control, even in the presence of the P valve. In the fourth embodiment of FIG. 27, the P valve 180 is located between the rear wheel brake cylinder 30 and the second shut-off valve 140 as in the second embodiment of FIG. 17, but the P valve 180 is provided with means for disabling its pressure reducing function. In the present embodiment of FIG. 30, the P valve 110 as used in the second embodiment is used, but this P valve 110 is located upstream of the check valve device 160.

Described in detail, the P valve 110 constructed as shown in FIG. 18 is disposed in a portion of the rear brake cylinder passage 24 of the point of connection between the front and rear brake cylinder passages 22, 24 and the check valve device 160. Thus, the delivery or output end of the pump passage 148 is located downstream of the P valve 110, so that the brake fluid delivered from the pump 150 during the anti-lock pressure control is supplied to the rear wheel brake cylinder 30 without passing through the P valve 110. Accordingly, the rear wheel braking pressure which is increased by operation of the pump 150 is not influenced by the pressure reducing function of the P valve 110. In the present fifth embodiment in which the P valve 110 is disposed between the front wheel brake cylinder 20 and the pump 150, the brake fluid delivered from the pump 150 during the anti-lock pressure control is first supplied to the output chamber 132 of the P valve 110 as shown in FIG. 18. As a result, the output pressure of the P valve 110 is increased, and the valve piston 124 is brought into abutting contact with the bottom of the plug 193, which constitutes a part of the housing 112. Subsequently, only the output pressure of the P valve is increased while the input pressure is held constant. When the output pressure of the P valve 110 exceeds the input pressure, the one-way sealing portion 134 of the cup seal 128 is opened, and the brake fluid is permitted to flow in the direction from the output chamber 132 toward the input chamber 130, through a gap between the one-way sealing portion 134 and the cylinder bore 118, whereby the brake fluid delivered from the pump 150 is supplied to the front wheel brake cylinder 20 through the P valve 110. Thus, the front wheel braking pressure is increased by operation of the pump 150.

In the present fifth embodiment, the check valve device 160 functions as the pressure reduction control device, which cooperates with the controller 170 and P valve 110 to constitute the distribution control device for controlling the distribution of the braking forces of the front and rear wheels, according to a selected one of the first and second distribution patterns. Further, the portions of the controller 170 assigned to implement the sub-routine of FIG. 24 and the routine of FIG. 25 function as the means for changing the duty cycle of the shut-off valve 140 on the basis of the observed number of the pressure reductions which have been required for the front and rear wheel brake cylinders.

In the detailed descriptions of the several embodiments, the opening pressure difference of the first check valve 72, 162 is fixed. However, the opening pressure difference may be variable to allow the opening pressure difference to increase with an increase in the vehicle load or in the friction coefficient of the road surface.

While the preferred embodiments of the present invention have been described in detail by reference to the accompanying drawings, it should be understood that the present invention may also exists with various changes, modifications, and improvements, which may occur to those skilled in the art, without departing from the scope of the invention defined in the following claims.

What is claimed is:

1. A braking system for braking a motor vehicle by operation of a front and a rear brake for a front and a rear wheel of the vehicle, respectively, said braking system comprising:

a distribution control device to control a distribution of a front wheel braking force and a rear wheel braking force which are produced by said front and rear brakes, respectively, and which are applied to said front and rear wheels, said distribution control device controlling said distribution according to a selected one of a first distribution pattern and a second distribution pattern, each of said first and second distributin patterns being a relationship between said front and rear wheel braking forces such that said rear wheel braking force defined by said second distribution pattern is larger than that defined by said first distribution pattern at least when the front and rear wheel braking forces are smaller than respective predetermined values, and when at least said rear wheel braking force is being increased.

2. A braking system according to claim 1, further comprising a hydraulic pressure source for pressuring a working fluid, and wherein said front and rear brakes include, respectively, a front and rear wheel brake cylinder which are supplied with the working fluid pressurized by said hydraulic pressure source, and wherein said distribution control device comprises:

(a) a check valve disposed between said front wheel brake cylinder and said hydraulic pressure source, said check valve permitting a flow of the fluid in a first direction from said pressure source towards said front wheel brake cylinder after the pressure generated by said pressure source becomes higher than the pressure in said front wheel brake cylinder by more than a predetermined difference, whereby the pressure of the fluid to be applied to said front wheel brake cylinder through said check valve is reduced with respect to the pressure generated by said pressure source, said check valve inhibiting a flow of the fluid in a second direction opposite to said first direction; and (b) selective disabling means for selectively disabling said check valve to prevent functioning of said check valve to reduce the pressure to be applied to said front wheel brake cylinder.

3. A braking system according to claim 1, wherein said distribution control device controls said distribution of said front and rear wheel braking forces according to said first distribution pattern when a load acting on the vehicle is smaller than a predetermined load value, and according to said second distribution pattern when said load is not smaller than said predetermined load value.

4. A braking system according to claim 1 of a diagonal or X-crossing type for a four-wheel motor vehicle, having two pressure application sub-systems which are respectively connected to two mutually independent pressurizing chambers of a master cylinder, each of said two pressure application sub-systems including:

(a) a front brake cylinder passage connecting a corresponding one of said two pressurizing chambers of said master cylinder and a front wheel brake cylinder of said front brake, (b) a rear brake cylinder passage connecting said front brake cylinder passage and a rear wheel brake cylinder of said rear brake, (c) a master cylinder cut valve in the form of a normally-open shut-off valve disposed in a portion of said front brake cylinder passage between said master cylinder and a point of connection of said front and rear brake cylinder passages, (d) a reservoir passage connected at one of opposite ends thereof to said rear brake cylinder passage, (e) a reservoir connected to the other end of said reservoir passage, (f) a pressure reducing valve in the form of a normally-closed shut-off valve disposed in said reservoir passage, (g) a pump passage connected at one of opposite ends thereof to said reservoir and at the other end to at least one of said front and rear brake cylinder passages, (h) a pump disposed in said pump passage for delivering a working fluid from said reservoir to a portion of said each pressure application sub-system, and (i) a controller operable in an anti-lock pressure control mode for controlling said master cylinder cut valve, said pressure reducing valve and said pump to effect and anti-lock pressure control operation for controlling pressures of said fluid in said front and rear wheel brake cylinders in anti-lock manner, and wherein said distribution control device comprises said controller, and a pressure reduction control device disposed in a portion of said each pressure application sub-system which is other than the portion between said master cylinder and the connection of said front and rear brake cylinder passages, said pressure reduction control device applying to said front wheel brake cylinder the pressure as generated by a first hydraulic pressure source in the form of said master cylinder, to thereby establish said first distribution pattern, when said controller is not placed in said anti-lock pressure control mode, said controller and said pressure reduction control device cooperating to establish said second distribution pattern such that the pressure generated by a second hydraulic pressure source which consists of at least one of said master cylinder and said pump is reduced by said pressure reduction control device and is then applied to said front wheel brake cylinder, when said controller is placed in said anti-lock pressure control mode.

5. A braking system according to claim 1 of a diagonal or X-crossing type for a four-wheel motor vehicle, having two pressure application sub-systems which are respectively connected to two mutually independent pressurizing chambers of a master cylinder, each of said two pressure application sub-systems including:

(a) a front brake cylinder passage connecting a corresponding one of said two pressurizing chambers of said master cylinder and a front wheel brake cylinder of said front brake, (b) a rear brake cylinder passage connecting said front brake cylinder passage and a rear wheel brake cylinder of said rear brake, (c) a master cylinder cut valve in the form of a normally-open shut-off valve disposed in a portion of said front brake cylinder passage between said master cylinder and a point of connection of said front and rear brake cylinder passages, said master cylinder cut valve being closed when the braking system is in an anti-lock pressure control mode, and opened when the braking system is not in said anti-lock pressure control mode, (d) an intermediate valve in the form of a normally-open shut-off valve disposed in said rear brake cylinder passage, (e) a reservoir passage connected at one of opposite ends thereof to a portion of said rear brake cylinder passage between said intermediate valve and said rear wheel brake cylinder, (f) a reservoir connected to the other end of said reservoir passage, (g) a pressure reducing valve in the form of a normally-closed shut-off valve disposed in said reservoir passage, (h) a pump passage connected at one of opposite ends thereof to said reservoir and at the other end to a portion of said rear brake cylinder passage between said intermediate valve and a point of connection of said front and rear brake cylinder passages, (i) a pump disposed in said pump passage for delivering a working fluid from said reservoir to a portion of said each pressure application sub-system, and (j) a controller operable in an anti-lock pressure control mode for controlling said master cylinder cut valve, said intermediate valve, said pressure reducing valve and said pump to effect an anti-lock pressure control operation for controlling pressures of said fluid in said front and rear wheel brake cylinders in an anti-lock manner, and wherein said distribution control device comprises said controller, and a check valve device disposed in a portion of said rear brake cylinder passage between the point of connection of said front and rear brake cylinder passages and a point of connection of said rear brake cylinder passage and said pump passage, said check valve device comprising a first check valve and a second check valve, said first check valve permitting a flow of the fluid therethrough in a first direction from said pump toward said front wheel brake cylinder after the pressure generated by the pump becomes higher than the pressure in said front wheel brake cylinder by more than a predetermined difference, and inhibiting a flow of the fluid therethrough in a second direction opposite to said first direction, said second check valve permitting a flow of the fluid therethrough in said second direction and permitting a flow of the fluid therethrough in said first direction.

6. A braking system according to claim wherein at least a part of said portion of said rear brake cylinder passage between the point of connection of said front and rear brake cylinder passages and the point of connection of said rear brake cylinder passage and said pump passage consists of a first and a second passage which are concentric with and mutually independent of each other and which have a circular and an annular cross sectional shape, respectively, said first check valve being disposed in one of said first and second passages while said second check valve being disposed in the other of said first and second passages.

7. A braking system according to claim 5, wherein said distribution control device further comprises:

(a) a proportioning valve disposed in said rear brake cylinder passage and including a valve piston which is operated to apply to said rear brake cylinder the pressure as generated by said master cylinder or said pump as a hydraulic pressure source when the pressure as generated by said hydraulic pressure source is lower than a predetermined threshold level, and to reduce the pressure as generated by said hydraulic pressure source and apply the reduced pressure to said rear wheel brake cylinder after the pressure as generated by said hydraulic pressure source exceeds said predetermined threshold level, and (b) a disabling device for disabling said proportioning valve to prevent functioning of said proportioning valve to reduce the pressure to be applied to said rear wheel brake cylinder when the pressure in said rear wheel brake cylinder is increased.

8. A braking system according to claim 7, wherein said disabling device comprises means for applying the pressure generated by said pump to said valve piston of said proportioning valve in a direction opposite to a direction in which the valve piston is moved to reduce the pressure generated by said pump, whereby the proportioning valve is disabled when the pressure in said rear wheel brake cylinder is increased.

9. A braking system according to claim 5, wherein said controller has a plurality of pressure control modes which are selectively established to control said master cylinder cut valve, said intermediate valve and said pressure reducing valve in said anti-lock manner, said plurality of pressure control modes including:

(1) a mode in which said intermediate valve and said pressure reducing valve are both open while said master cylinder cut valve is closed, to reduce the pressures in both of said front and rear wheel brake cylinders, (2) a mode in which said master cylinder cut valve and said intermediate valve are both closed while said pressure reducing valve is open, to increase the pressure in said front wheel brake cylinder by operation of said pump, and reduce the pressure in said rear wheel brake cylinder, and (3) a duty-cycle pressure control mode in which said master cylinder cut valve and said pressure reducing valves are both closed while said intermediate valve is alternately closed and opened to increase the pressures in said front and rear wheel brake cylinders by operation of said pump.

10. A braking system according to claim 9, wherein said controller comprises means for changing a duty cycle of the intermediate valve in said duty-cycle pressure control mode.

11. A braking system according to claim 10, wherein said means for changing the duty cycle of said intermediate valve changes said duty cycle on the basis of at least one of pressure reducing tendency of said front wheel brake cylinder and pressure reducing tendency of said rear wheel brake cylinder, which tendencies have been exhibited in said anti-lock pressure control operation under the control of said controller.

12. A braking system according to claim 1, further comprising a hydraulic pressure source for pressuring a working fluid, and wherein said front and rear brakes include, respectively, a front and rear wheel brake cylinder which are supplied with the working fluid pressurized by said hydraulic pressure source, and wherein said distribution control device comprises:

(a) a check valve disposed between said front wheel brake cylinder and said hydraulic pressure source, said check valve permitting a flow of the fluid in a first direction from said pressure source towards said front wheel brake cylinder after the pressure generated by said pressure source becomes higher than the pressure in said front wheel brake cylinder by more than a predetermined difference, whereby the pressure of the fluid to be applied to said front wheel brake cylinder through said check valve is reduced with respect to the pressure generated by said pressure source, said check valve inhibiting a flow of the fluid in a second direction opposite to said first direction; and (b) selective disabling means for selectively disabling said check valve to prevent functioning of said check valve to reduce the pressure to be applied to said front wheel brake cylinder;

(c) a load-sensing proportioning valve disposed between said hydraulic pressure source and said rear wheel brake cylinder, said load-sensing proportioning valve including a load-sensing proportioning valve applying to said load acting on the vehicle, said load-sensing proportioning valve applying to said rear wheel brake cylinder the pressure generated by said pressure source when said pressure generated by said pressure source is lower than a threshold level, and reducing said pressure generated by said pressure source and applying the reduced pressure to said rear wheel brake cylinder after said pressure generated by said pressure source exceeds said threshold level, said threshold level increasing as said load detected by said load-sensing member increases, said selective disabling means disabling said check valve when said load detected by said load-sensing member is smaller than a predetermined load value, whereby said distribution control device controls said distribution of said front and rear wheel braking forces according to said first distribution pattern when said load detected by said load-sensing member is smaller than said predetermined load value, and according to said second distribution pattern when said load is not smaller than said predetermined load value.

13. A braking system according to claim 12, wherein said selective disabling means comprises:

(a) a by-pass passage which is in parallel connection with said check valve and which by-passes said check valve;

(b) a solenoid-operated shut-off valve disposed in said by-pass passage;

(c) a load-sensing switch responsive to said load-sensing member and generating a first signal when said load detected by said load sensing member is smaller than said predetermined load value and a second signal when said load detected by said load sensing member is not smaller than said predetermined load value; and (d) a controller opening said shut-off valve in response to said first signal to thereby disable said check valve, and closing said shut-off valve in response to said second signal to thereby enable said check valve to reduce the pressure to be applied to said rear wheel brake cylinder with respect to the pressure generated by said pressure source.

14. A braking system according to claim 1, wherein said distribution control device selects said second distribution pattern in at least one of a first condition in which a load acting on the vehicle is larger than a predetermined load value, and a second condition in which the braking system is operated in an anti-lock pressure control mode.

15. A braking system according to claim 1, wherein said front and rear brakes include, respectively, a front wheel brake cylinder and a rear wheel brake cylinder which are supplied with a pressurized working fluid, and wherein said distribution control device selectively establishes said first and second distribution patterns of said front and rear wheel braking forces by controlling a front wheel braking pressure in said front brake cylinder and a rear wheel braking pressure in said rear wheel brake cylinder, and wherein said first distribution pattern of said front and rear wheel braking forces is established by a first distribution pattern of said front and rear wheel braking pressures in which said front and rear wheel braking pressures change such that said front and rear wheel braking pressures are equal to each other, while said second distribution pattern of said front and rear wheel braking forces is established by a second distribution pattern of said front and rear wheel braking pressures in which said front and rear wheel braking pressures change such that said rear wheel braking pressure is higher than said front wheel braking pressure.

16. A braking system for braking a motor vehicle by operation of a front and rear brake for a front and a rear wheel of the vehicle, respectively, said braking system comprising:

a distribution control device to control a distribution of a front wheel braking force and a rear wheel braking force which are produced by said front and rear brakes, respectively, and which are applied to said front and rear wheels, said distribution control device controlling said distribution according to a selected one of a first distribution pattern and a second distribution pattern, each of said first and second distribution patterns being a relationship between said front and rear wheel braking forces such that said rear wheel braking force defined by said second distribution pattern is larger than that defined by said first distribution pattern at least when said rear wheel braking force is being increased.

17. A braking system according to claim 16, wherein said distribution control device selects said second distribution pattern in at least one of a first condition in which a load acting on a vehicle is larger than a predetermined load value, and a second condition in which the braking system is operated in an anti-lock pressure control mode.

18. A braking system according to claim 17 of a diagonal or X-crossing type for a four-wheel motor vehicle, having two pressure application sub-systems which are connected to respective two mutually independent pressurizing chambers of a master cylinder, each of said two pressure application sub-systems including:

(a) a front brake cylinder passage connecting a corresponding one of said two pressurizing chambers of said master cylinder and a front wheel brake cylinder of said front brake, (b) a rear brake cylinder passage connecting said front brake cylinder passage and a rear wheel brake cylinder of said rear brake (c) a master cylinder cut valve in the from of a normally-open shut-off valve disposed in a portion of said front brake cylinder passage between said master cylinder and a point of connection of said front and rear brake cylinder passages, said master cylinder cut valve being closed when the braking system is in an anti-lock pressure control mode, and opened when the braking system is not in said anti-lock pressure control mode, (d) an intermediate valve in the form of a normally-open shut-off valve disposed in said rear brake cylinder passage, (e) a reservoir passage connected at one of opposite ends thereof to a portion of said rear brake cylinder passage between said intermediate valve and said rear wheel brake cylinder, (f) a reservoir connected to the other end of said reservoir passage, (g) a pressure reducing valve in the form of a normally-closed shut-off valve disposed in said reservoir passage, (h) a pump passage connected at one of opposite ends thereof to said reservoir and at the other end to a portion of said rear brake cylinder passage between said intermediate valve and a point of connection of said front and rear brake cylinder passages, (i) a pump disposed in said pump passage for delivering a working fluid from said reservoir to a portion of said each pressure application sub-systems, and (j) a controller operable in said anti-lock pressure control mode for controlling said master cylinder cut valve, said intermediate valve, said pressure reducing valve and said pump to effect an anti-lock pressure control operation for controlling pressures of said fluid in said front and rear wheel brake cylinders in an anti-lock manner, and wherein said distribution control device comprises said controller, and a check valve device disposed in a portion of said rear brake cylinder passage between the point of connection of said front and rear brake cylinder passages and a point of connection of said rear brake cylinder passage and said pump passage, said check valve device comprising a first check valve and a second check valve, said first check valve permitting a flow of the fluid therethrough in a first direction from said pump toward said front wheel brake cylinder after the pressure generated by the pump becomes higher than the pressure in said front wheel brake cylinder by more than a predetermined difference, and inhibiting a flow of the fluid therethrough in a second direction opposite to said first direction, said second check valve permitting a flow of the fluid therethrough in said second direction and inhibiting a flow of the fluid therethrough in said first direction.

19. A braking system of a diagonal or X-crossing type for braking a four-wheel motor vehicle by operation of a front and a rear brake for a front and a rear wheel of the vehicle, respectively, said braking system including two pressure application sub-systems which are connected to respective two mutually independent pressurizing chambers of a master cylinder, each of said two pressure application sub-systems comprising:

(a) a front brake cylinder passage connecting a corresponding one of said two pressurizing chambers of said master cylinder and a front wheel brake cylinder of said front brake;

(b) a rear brake cylinder passage connecting said front brake cylinder passage and a rear wheel brake cylinder of said rear brake;

(c) a master cylinder cut valve in the form of a normally-open shut-off valve disposed in a portion of said front brake cylinder passage between said master cylinder and a point of connection of said front and rear brake cylinder passages, said master cylinder cut valve being closed when the braking system is in an anti-lock pressure control mode, and opened when the braking system is not in said anti-lock pressure control mode;

(d) an intermediate valve in the form of a normally-open shut-off valve disposed in said rear brake cylinder passage;

(e) a reservoir passage connected at one of opposite ends thereof to a portion of said rear brake cylinder passage between said intermediate valve and said rear wheel brake cylinder;

(f) a reservoir connected to the other end of said reservoir passage;

(g) a pressure reducing valve in the form of a normally-closed shut-off valve disposed in said reservoir passage;

(h) a pump passage connected at one of opposite ends thereof to said reservoir and at the other end to a portion of said rear brake cylinder passage between said intermediate valve and a point of connection of said front and rear brake cylinder passages;

(i) a pump disposed in said pump passage for delivering a working fluid from said reservoir to a portion of said each pressure application sub-system;

(j) a controller operable in said anti-lock pressure control mode for controlling said master cylinder cut valve, said intermediate valve, said pressure reducing valve and said pump to effect an anti-lock pressure control operation for controlling pressures of said fluid in said front and rear wheel brake cylinders in an anti-lock manner; and (k) a check valve device disposed in a portion of said rear brake cylinder passage between the point of connection of said front and rear brake cylinder passages and a point of connection of said rear brake cylinder passage and said pump passage, said check valve device comprising a first check valve and a second check valve, said first check valve permitting a flow of the fluid therethrough in a first direction from said pump toward said front wheel brake cylinder after the pressure generated by the pump becomes higher than the pressure in said front wheel brake cylinder by more than a predetermined difference, and inhibiting a flow of the fluid therethrough in a second direction opposite to said first direction, said second check valve permitting a flow of the fluid therethrough in said second direction and inhibiting a flow of the fluid therethrough in said first direction.

* * * * *